(12) United States Patent
Shreeshreemal et al.

(10) Patent No.: US 11,430,439 B2
(45) Date of Patent: Aug. 30, 2022

(54) SYSTEM AND METHOD FOR PROVIDING ASSISTANCE IN A LIVE CONVERSATION

(71) Applicant: Samsung Electronics Co., Ltd., Gyeonggi-do (KR)

(72) Inventors: Ritesh Shreeshreemal, Noida (IN); Gaurav Chaurasia, Noida (IN)

(73) Assignee: Samsung Electronics Co., Ltd

( * ) Notice: Subject to any disclaimer, the term of this patent is extended or adjusted under 35 U.S.C. 154(b) by 119 days.

(21) Appl. No.: 16/935,605

(22) Filed: Jul. 22, 2020

(65) Prior Publication Data
US 2021/0056968 A1 Feb. 25, 2021

(30) Foreign Application Priority Data
Aug. 22, 2019 (IN) .............................. 201911033883

(51) Int. Cl.
*G10L 15/22* (2006.01)
*G06N 20/00* (2019.01)
(Continued)

(52) U.S. Cl.
CPC ................ *G10L 15/22* (2013.01); *G06N 5/04* (2013.01); *G06N 20/00* (2019.01); *G10L 15/063* (2013.01);
(Continued)

(58) Field of Classification Search
CPC ....... G10L 15/22; G10L 15/063; G10L 15/16; G10L 15/1815; G10L 15/30; G10L 2015/223; G06N 20/00; G06N 5/04
See application file for complete search history.

(56) References Cited

U.S. PATENT DOCUMENTS 9,172,747 B2 10/2015 Walters et al.
9,318,108 B2 4/2016 Gruber et al.
(Continued)

FOREIGN PATENT DOCUMENTS

KR 1020150085145 7/2015
KR 1020180054408 5/2018

OTHER PUBLICATIONS

International Search Report dated Dec. 22, 2020 issued in counterpart application No. PCT/KR2020/007123, 3 pages.
(Continued)

*Primary Examiner* — Michael Colucci
(74) *Attorney, Agent, or Firm* — The Farrell Law Firm, P.C.

(57) ABSTRACT

Method for providing assistance in conversation including recognizing, by recognition module, conversation between primary user and at least one secondary user, identifying, by recognition module, first and second context data for primary user and at least one secondary user based on conversation; generating, by response generation module, at least one response on behalf of primary user based on at least one of second context data derived from at least one secondary user, and first context data; analyzing, by determining module, at least one action of primary user in at least one response on second context data; determining, by determining module, intervening situation in conversation based on at least one action; selecting, by intervening response module, intervening response from at least one response for determined intervening situation based on at least one action; and delivering, by response delivery module, intervening response to at least one secondary user during determined intervening situation.

15 Claims, 35 Drawing Sheets

(51) Int. Cl.
*G10L 15/30* (2013.01)
*G10L 15/16* (2006.01)
*G10L 15/18* (2013.01)
*G10L 15/06* (2013.01)
*G06N 5/04* (2006.01)

(52) U.S. Cl.
CPC .......... *G10L 15/16* (2013.01); *G10L 15/1815* (2013.01); *G10L 15/30* (2013.01); *G10L 2015/223* (2013.01)

(56) References Cited

U.S. PATENT DOCUMENTS

| | | |
|---|---|---|
| 9,741,338 B2 | 8/2017 | Bangalore |
| 10,096,319 B1 | 10/2018 | Jin et al. |
| 10,176,167 B2 | 1/2019 | Evermann |
| 10,176,808 B1 | 1/2019 | Lovitt et al. |
| 10,594,757 B1* | 3/2020 | Shevchenko ......... H04L 67/306 |
| 11,017,001 B2 | 5/2021 | Newell et al. |
| 2004/0172252 A1 | 9/2004 | Aoki et al. |
| 2006/0247919 A1* | 11/2006 | Specht .................... H04K 1/02 |
| | | 704/201 |
| 2008/0096533 A1 | 4/2008 | Manfredi et al. |
| 2015/0149177 A1* | 5/2015 | Kalns .................. G10L 15/1822 |
| | | 704/257 |
| 2015/0162000 A1 | 6/2015 | Di Censo et al. |
| 2015/0186156 A1 | 7/2015 | Brown et al. |
| 2015/0199340 A1 | 7/2015 | Kwon et al. |
| 2016/0335532 A1 | 11/2016 | Sanghavi et al. |
| 2017/0324868 A1 | 11/2017 | Tamblyn et al. |
| 2017/0358296 A1 | 12/2017 | Segalis et al. |
| 2018/0322380 A1 | 11/2018 | Aggarwal |
| 2019/0197430 A1* | 6/2019 | Arditi .................... G16H 50/20 |
| 2019/0311331 A1* | 10/2019 | Steinhoff ................ G10L 15/08 |
| 2020/0050788 A1* | 2/2020 | Feuz ...................... G10L 15/22 |
| 2020/0274877 A1* | 8/2020 | Kwatra .................. H04L 43/04 |
| 2021/0049296 A1* | 2/2021 | Blandin ............. G06F 21/6236 |

OTHER PUBLICATIONS

Indian Examination Report dated Apr. 26, 2021 issued in counterpart application No. 201911033883, 7 pages.

* cited by examiner

SYSTEM AND METHOD FOR PROVIDING ASSISTANCE IN A LIVE CONVERSATION

CROSS-REFERENCE TO RELATED APPLICATION(S)

This application is based on and claims priority under 35 U.S.C. § 119 to Indian Patent Application No. 201911033883, filed on Aug. 22, 2019, in the Indian Intellectual Property Office, the disclosure of which is incorporated by reference herein in its entirety.

BACKGROUND

1. Field

The present disclosure relates generally to providing digital assistance, and, more particularly, to a system and a method for providing assistance in a live conversation.

2. Description of Related Art

A virtual assistant (VA), also called an artificial intelligence (AI) assistant, or a digital assistant, understands natural language voice commands of users, and completes tasks for users based on the commands. The VA uses natural language processing (NLP) techniques to match user text or a voice input to executable commands. The VA also uses AI techniques, which include machine learning techniques. Nowadays, most of the smartphones, speakers, televisions, wearable devices, home appliances, and computers, in the market, have VAs. VAs which are available in the market, are Bixby®, SIRI®, Cortana®, Google Assistant®, AVIC®, and the like.

Typically, a VA is equipped with AI, adaptive machine learning, prescriptive/predictive analytics, conversational speech recognition, NLP, emotion detection, context modelling, knowledge acquisition, topic tracking, dialog management and evaluation, response generation, and similar techniques. A VA may handle data security and categorize data into multiple privacy levels. A VA is getting more intelligent, efficient, and may handle complex tasks. A user with the help of a VA completes day to day tasks, and seeks information from various sources. However, improved capabilities of a VA are not utilized properly. For example, many owners of VAs do not use a voice assistant feature. Further, users are mainly using VAs through an explicit voice command input to execute a particular pre-defined task. With advancement in technology, it is possible to develop capabilities, where the VAs may identify user intent and a command for a task. Since, VAs are equipped with capabilities like AI and NLP, these capabilities may be used to add value to in-person conversation between two persons.

Another disadvantage is a lack of initiative in VAs. VAs are largely responsive, such as the VAs sitting silently or occasionally piping up with a pre-programmed conversational gambit, until a user issues a fresh command or a query. The user must give an explicit command with required information to the VAs to get the required task done.

A VA may respond on receiving an explicit command from a user. For example, Ms. P (i.e. a user) gives a command to a VA, "Hey, what is the time?". The VA automatically responds to Ms. P, "It's 4 p.m.". In a command based conversation between a primary user and a VA, the VA uses purpose context and conversation context of only the primary user to generate a response. In another example, the VA is not involved in a conversation between a primary user and a secondary user. As another example, Mr. P (i.e., a primary user) and Ms. S (i.e., a secondary user) are having an in-person conversation. In this case, the VA is not involved in the conversation. The VA enabled speaker of Mr. P is sitting idle when Mr. P has not responded, Mr. P has not completed a sentence and is stuck in between conversation, or Mr. P is looking for facts and figures for supporting his statement, therefore the conversation has become boring. The VA could not help Mr. P in the in-person conversation.

A conversation takes physical and mental effort. Users frequently need support during a conversation, as they cannot remember all the facts and figures precisely. Many times, users do not know the correct way and the correct information to respond to the other user according to a situation. Occasionally, users are stuck in speaking a sentence and look for a word to complete the sentence. Moreover, when users talk on a topic, which is not in their field of expertise, they cannot provide strong facts to support their point. If the language of a conversation is not a user's native language, then it takes thought and effort to remember and form words and sentences in a specific language. Many times, conversations are not interesting as they lack information, interesting facts, and proper ambiance. Sometimes, users want to initiate a conversation but do not know how to start the conversation. Thus, there is a need of a conversation companion, who can support users during in-person conversation with another person.

To overcome the above issues during a conversation, a VA may help the user(s). The VA of each user has all of the information of the owner or associated user, and the VA also maintains a personal history of the user. The VA continuously learns from the user, and knows how the user would respond in different situations, with different people. The VA also knows the way the user reacts in different scenarios. The VA knows about the user's interest, tone, volume of choice, and talking style for all types of conversations. The VA knows the knowledge curve of the user and, hence, knows the user's level of expertise for any topic. The VA also has access to the Internet from where the VA could fetch relevant additional information. With the advancement in technology, there is more than adequate storage space with fast processing power at a very fast data speed, available for the VA. Since, it is the VA who knows the user, the VA may easily fit in the role of conversation companion for the user.

Generally, a user's expectation for a conversation companion are: the VA should speak only when the user needs help, when the VA's intervention adds value to the conversation, correctly identify an intervening situation, handle private information with care and disclose information only to the right people, add only appropriate personalized content in the conversation, identify if a user's answer must be augmented with additional content, add content at an appropriate time, adds content in a proper tone, volume and voice as per the on-going/live conversation, use connected devices to show content related to an on-going/live conversation, stop speaking when the user wants the VA to stop speaking, provide content to initiate, carry-on, and conclude the conversation as per the user's need, augment/repeat a sentence by adding synonyms/adjective/punch line or translate/tone up or down the sentence, automatically setup ambiance according to the conversation, etc. To provide all of these features, continuous training on a large data set is required. Further, training by the user is also required to enable the VA to provide a personalized response for a particular user.

An issue in existing VAs is that the VA cannot correctly identify the context, situation and time, etc. For example, during an on-going conversation, if the user wants the VA to add to the conversation, then the user must give a command to the VA with required information. This may be very awkward during an on-going conversation. The VA is not helpful to a user in making a conversations informative, coherent, relevant, interesting and engaging. When a response given by the user is not precise and the VA has a better response, then the VA may not intervene in the conversation to add the better response. Another example is when a user is replying to another person, but is unable to complete a sentence due to lack of vocabulary/fact, then the VA may not intervene in the conversation to add the word/fact, which may help the user complete the sentence in a proper way. Further, when the user is saying half of an answer verbally and providing the remaining half by gestures, then the VA may not speak what the user wants to convey. Conversation style/tone of the user, changes based on situation and a person they are talking to, but conversation style/tone of VAs always remains same. Existing VAs do not understand a conversation from a point of view of intervening in the conversation to add appropriate words, sentences, sounds, music, videos, environmental settings, augmented/virtual reality content etc. These VAs also do not generate responses which consider perspective of both primary and secondary users.

With improvements in AI, machine learning and NLP, along with an increase in processing and network speed (for example, fifth generation (5G)), it is now possible to fetch and generate relevant data from the Internet, and automatically add the data to an on-going/live conversation in real time to make the conversation more meaningful.

Therefore, there is a need for a system and a method for providing assistance in a live conversation that limits the aforementioned drawbacks, that support a user during an on-going/live conversation without a user verbal command, and a system that may interpret the live conversation and determine a situation where the system may add relevant content to make the ongoing conversation more meaningful.

SUMMARY

In accordance with an aspect of the present disclosure, a method of providing assistance in a conversation is provided. The method includes recognizing, by a recognition module, the conversation between a primary user and at least one secondary user; identifying, by the recognition module, first context data and second context data for the primary user and the at least one secondary user based on the conversation; generating, by a response generation module, at least one response on behalf of the primary user based on at least one of the second context data derived from the at least one secondary user, and the first context data; analyzing, by a determining module, at least one action of the primary user during the conversation; determining, by the determining module, an intervening situation in the conversation based on the analyzed at least one action; selecting, by an intervening response module, an intervening response from the generated at least one response for the determined intervening situation based on the at least one action; and delivering, by a response delivery module, the intervening response to the at least one secondary user during the determined intervening situation.

In accordance with another aspect of the present disclosure, an electronic device associated with a primary user for providing assistance in a conversation is provided. The electronic device includes a first memory configured to store first pre-defined rules; a first processor configured to cooperate with the first memory and generate device processing commands based on the first pre-defined rules; a recognition module configured to recognize the conversation between the primary user and at least one secondary user, and identify first context data and second context data for the primary user and the at least one secondary user; a response generation module configured to cooperate with the recognition module and generate at least one response on behalf of the primary user based on at least one of the second context data derived from the at least one secondary user and the first context data; and an artificial intelligence (AI) engine.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
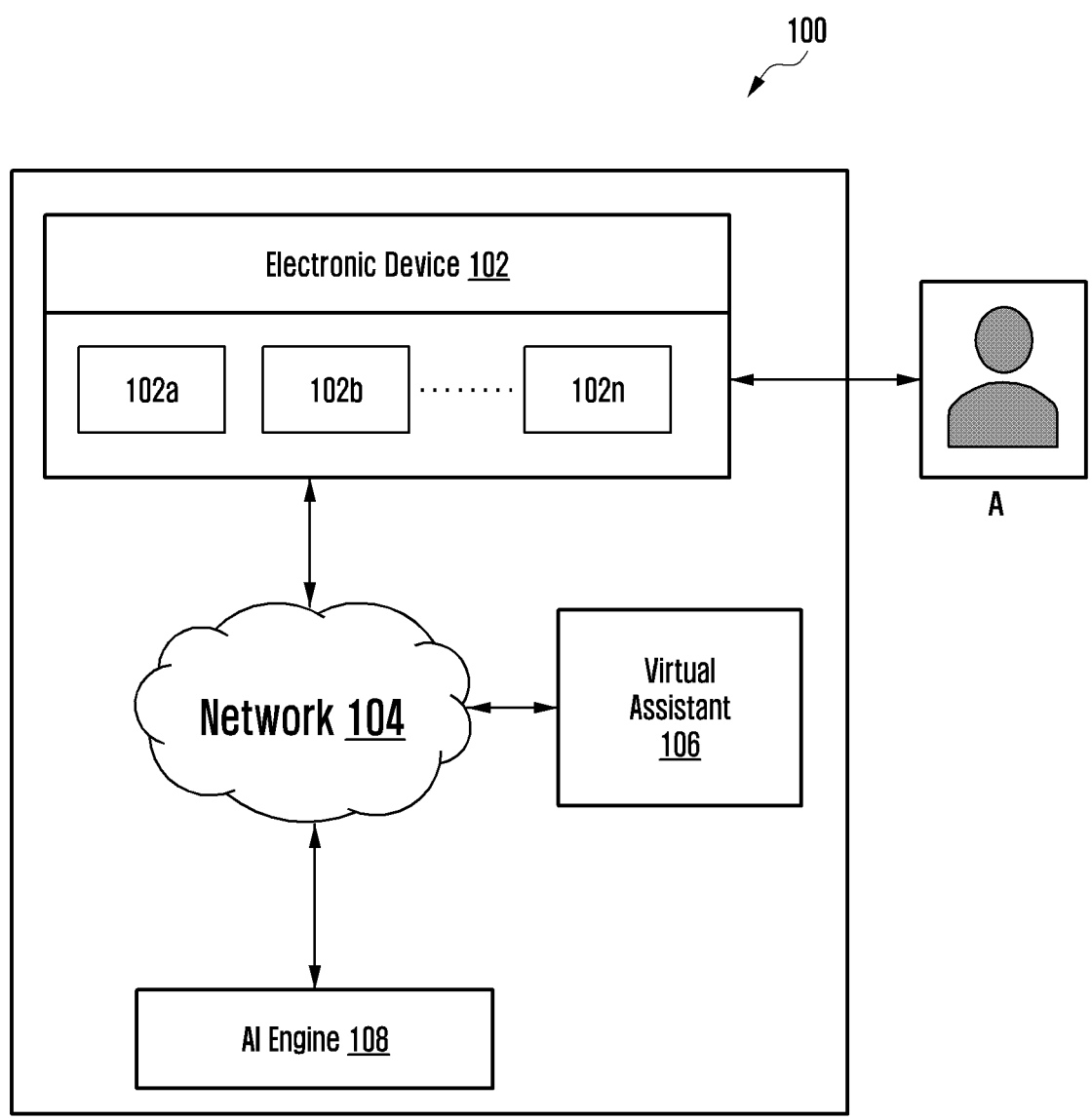
FIG. 1 is a block diagram of a system for providing assistance in a live conversation, according to an embodiment of the disclosure.

In the following description, for the purpose of explanation, certain details are set forth in order to provide an understanding of the present disclosure. It will be apparent, however, to one skilled in the art that the present disclosure may be practiced without these details. One skilled in the art will recognize that embodiments of the present disclosure, some of which are described below, may be incorporated into a number of systems.

The various embodiments of the present disclosure are related to a system and method for providing assistance in a live conversation. Furthermore, connections between components and/or modules within the accompanying drawings are not intended to be limited to direct connections. Rather, these components and modules may be modified, re-formatted or otherwise changed by intermediary components and modules.

References in the present disclosure to "one embodiment" or "an embodiment" indicate that a particular feature, structure, characteristic, or function described in connection with the embodiment is included in at least one embodiment of the disclosure. The appearances of the phrase "in one embodiment" in various places in the present disclosure do not necessarily all refer to the same embodiment.

In an embodiment, a method for providing assistance in a live conversation includes a step of recognizing, by a recognition module, the conversation between a primary user and at least one secondary user. The method includes identifying, by the recognition module, first context data and second context data for the primary user and the secondary user based on the recognized conversation. The method includes generating, by a response generation module, one or more responses on behalf of the primary user based on at least one of the second context data derived from the secondary user, and the first context data. The method includes analyzing, by a determining module, at least one action of the primary user in the response on the second context data. The method includes determining, by the determining module, an intervening situation in the conversation based on the analyzed action. The method includes selecting, by an intervening response module, an intervening response from the generated responses for the determined intervening situation based on the at least one action. The method includes delivering, by a response delivery module, the intervening response to the secondary user during the determined intervening situation.

In an embodiment, a system for providing assistance in a live conversation includes an electronic device and an AI engine. The electronic device is associated with a primary user. The electronic device includes a first memory, a first processor, a recognition module, and a response generation module. The first memory is configured to store pre-defined rules. The first processor is configured to generate device processing commands based on the pre-defined rules. The recognition module is configured to recognize the conversation between the primary user and at least one secondary user, and identify first context data and second context data for the primary user and the secondary user. The response generation module is configured to generate one or more responses on behalf of the primary user based on at least one second context data derived from the secondary user and the first context data. The AI engine includes a second memory, a second processor, a determining module, an intervening response module, and a response delivery module. The second memory is configured to store pre-defined rules. The second processor is configured to generate system processing commands based on the pre-defined rules. The determining module is configured to analyze at least one action of the primary user in the response on the second context data and determine an intervening situation in the conversation based on the analyzed action. The intervening response module is configured to select an intervening response from the generated responses for the determined intervening situation based on the at least one action. The response delivery module is configured to deliver the intervening response to the secondary user during the determined intervening situation.

In an embodiment, a method for providing assistance in a live conversation includes a step of recognizing, by a recognition module, the conversation between a primary user and at least one secondary user. The method includes identifying first context data and second context data for the primary user and the secondary user based on the recognized data. The method includes generating, by a response generation module, one or more responses on behalf of the primary user based on at least one second context data derived from the secondary user, and the first context data. The method includes generating, by a score generation module, a score for each generated response based on pre-determined parameters. The method includes analyzing, by a determining module, at least one action of the primary user in the response to the score on the second context data. The method includes determining, by the intervening situation determining module, an intervening situation in the conversation based on the analyzed action. The method includes selecting, by an intervening response module, an intervening response from the generated responses for the determined intervening situation based on the at least one action. The method includes delivering, by a response delivery module, the intervening response to the secondary user during the determined intervening situation.

In an embodiment, the first context data includes conversation context related data.

In an embodiment, the second context data includes purpose context related data.

In an embodiment, the first context data and the second context data are identified by the recognition module using at least one of a deep learning RNN technique, an AI technique, and an NLP technique.

In an embodiment, the response delivery module delivers an intervening response at a dynamic time interval.

In an embodiment, the response delivery module determines the dynamic time interval in real-time.

In an embodiment, the method includes storing, in a database, the pre-determined parameters, learning data, generated responses, intervening responses, context related data, primary user information, secondary user information, pre-defined relationship level between a primary user and one or more secondary users, intimacy categories, and past conversation details.

In an embodiment, the method includes training, by a training module, the responses using the learning data, and creating a privacy level for the primary user based on trained responses.

In an embodiment, the response generation module generates responses in the form of content including words, sentences, audio, video, environment settings, and augmented/virtual reality content.

In an embodiment, the response delivery module delivers the intervening response in the form of the content at the dynamic time interval to the secondary user.

In an embodiment, the recognition module recognizes the conversation between the primary user and the secondary user using a noise filtering technique, a speech recognition technique, a NLP technique, user profiling, and gestures of the primary user and the secondary user.

In an embodiment, the response generation module generates the one or more responses on behalf of the primary user associated with an electronic device.

In an embodiment, the response generation module generates the responses on behalf of the primary user based on the stored conversation details, previous first context data, and second context data derived from the secondary user.

In an embodiment, the method includes generating, by the response generation module, the responses on behalf of the primary user based on a current response of the primary or the secondary user, sensor data, the stored user information, and the pre-defined relationship level between the primary user and the secondary user.

In an embodiment, the method includes generating, by a score generation module, a score for each generated response based on the pre-determined parameters. The method includes analyzing, by the determining module, the action of the primary user in the response with the score on the second context data derived from the secondary user.

In an embodiment, the method includes displaying, by a display unit, an additional content in the form of an intervening response, and updating availability of the additional content to the primary user and the secondary user.

In an embodiment, the method includes generating, by a feedback generation module, feedback for the delivered intervening response, and updating the stored learning data based on the feedback. The feedback includes positive feedback, or negative feedback provided by the primary user and the secondary user.

In an embodiment, the method includes selecting, by the intervening response module, the intervening response, and adding facts, information, and multimedia content into the conversation.

In an embodiment, the method includes delivering, by the response delivery module, the intervening response to the secondary user at the dynamic time and a tone on behalf of the primary user.

In an embodiment, the method includes comparing, by the score generation module, the current response of the primary user with the generated responses, and identifying a score of the current response of the primary user.

In an embodiment, the method includes authenticating, by an authentication module, the primary user by using authentication techniques, wherein the authentication techniques include a voice recognition technique, a pattern recognition technique, a password, a fingerprint recognition technique, and a face recognition technique.

In an embodiment, the method includes detecting, by a detection module, a certain spoken word or a group of words from the live conversation.

In an embodiment, the method includes sensing, by a sensing module, the movements of the primary user, location, presence, audio, body language, and visual information of the primary user, and generating the sensor data.

In an embodiment, a system for providing assistance in a live conversation includes an electronic device and an AI engine. The electronic device is associated with a primary user. The electronic device includes a first memory, a first processor, a recognition module, and a response generation module. The first memory is configured to store pre-defined rules. The first processor is configured to generate device processing commands based on the pre-defined rules. The recognition module is configured to recognize the conversation between the primary user and at least one secondary user, and identify first context data and second context data for the primary user and the secondary user based on the recognized conversation. The response generation module is configured to generate one or more responses on behalf of the primary user based on at least one of the second context data derived from the secondary user and the first context data. The AI engine includes a second memory, a second processor, a score generation module, a determining module, an intervening response module, and a response delivery module. The second memory is configured to store pre-defined rules. The second processor is configured to generate system processing commands based on the pre-defined rules. The score generation module is configured to generate a score for each generated response based on pre-determined parameters. The determining module is configured to analyze at least one action of the primary user in the response with the score on the second context data and determine an intervening situation in the conversation. The intervening response module is configured to select an intervening response from the generated responses for the determined intervening situation based on the at least one action. The response delivery module is configured to deliver the intervening response to the secondary user during the determined intervening situation.

In an embodiment, the response delivery module is configured to deliver the intervening response at a dynamic time interval.

In an embodiment, the response delivery module is configured to determine the dynamic time interval in real-time.

In an embodiment, the AI engine includes a database. The database is configured to store the pre-determined parameters, learning data, generated responses, intervening responses, context related data, primary user information, secondary user information, a pre-defined relationship level between a primary user and one or more secondary users, intimacy categories, and past conversation details.

In an embodiment, the AI engine includes a training module. The training module is configured to train the responses using the learning data and create a privacy level for the primary user based on trained responses.

In an embodiment, the response delivery module is configured to deliver the intervening response in the form of a content at the dynamic time interval to the secondary user.

In an embodiment, the response generation module is configured to generate one or more responses on behalf of the primary user associated with the electronic device.

In an embodiment, the response generation module is configured to generate the responses on behalf of the primary user based on the stored conversation details previous first context data and second context data derived from the secondary user.

In an embodiment, the response generation module is configured to generate the responses on behalf of the primary user based on a current response of the primary or the secondary user, sensor data, the stored user information, and the pre-defined relationship level between the primary user and the secondary user.

In an embodiment, the AI engine includes a score generation module. The score generation module is configured to generate a score for each generated response based on the pre-determined parameters. The determining module is configured to analyze the action of the primary user in the response with the score on the second context data derived from the secondary user.

In an embodiment, the system includes a display unit. The display unit is configured to display an additional content in the form of an intervening response, and update availability of the additional content to the primary user and the secondary user.

In an embodiment, the AI engine includes a feedback generation module. The feedback generation module is configured to generate feedback for the delivered intervening response, and update the learning data in the database based on the feedback.

In an embodiment, the intervening response module is configured to select the intervening response and add facts, information, and multimedia content into the conversation.

In an embodiment, the response delivery module is configured to deliver the intervening response to the secondary user at the dynamic time and a tone on behalf of the primary user.

In an embodiment, the score generation module is configured to compare current response of the primary user with the generated responses, and identify a score of the current response of the primary user.

In an embodiment, the AI engine includes an authentication module. The authentication module is configured to authenticate the primary user by using authentication techniques. The authentication techniques include a voice recognition technique, a pattern recognition technique, a password, a fingerprint recognition technique, and a face recognition technique.

In an embodiment, the electronic device includes a detection module configured to detect a certain spoken word or a group of words from the live conversation.

In an embodiment, the electronic device includes a sensing module configured to sense the movements of the electronic device, location, presence, audio, body language, and visual information of the electronic device, and generate the sensed data. The sensing module includes a plurality of sensors, including an accelerometer, global positioning system (GPS) sensors, data sensors, and low energy sensors.

In an embodiment, the electronic device includes a mobile device, a smart watch, a tablet computer, an augmented reality glass, and a wristwatch.

In an embodiment, the electronic device is configured to be communicatively coupled with the AI engine in a client server arrangement.

In an embodiment, the electronic device is located at a client side and the AI engine is located at a server side in the client server arrangement.

A method for providing assistance in a live conversation includes a step of recognizing, by a VA, a conversation between a primary user and at least one secondary user. The method includes identifying, by the VA, first context data and second context data for the primary user and the secondary user based on the recognized conversation. The method includes generating, by the VA, one or more responses on behalf of the primary user based on at least one of the second context data derived from the secondary user and the first context data. The method includes analyzing, by the VA, at least one action of the primary user in the response on the second context data. The method includes determining, by the VA, an intervening situation in the conversation based on the analyzed action. The method includes selecting, by the VA, an intervening response from the generated responses for the determined intervening situation based on the at least one action. The method includes delivering, by the VA, the intervening response to the secondary user during the determined intervening situation.

In an embodiment, a system for providing assistance in a live conversation includes a VA. The VA is associated with a primary user. The VA is configured to recognize the conversation between the primary user and at least one secondary user. The VA is configured to identify first context data and second context data for the primary user and the secondary user based on the recognized conversation. The VA is configured to generate one or more responses on behalf of the primary user based on at least one of the second context data derived from the secondary user and the first context data. The VA is configured to analyze at least one action of the primary user in the response on the second context data and determine an intervening situation in the conversation based on the analyzed action. The VA is configured to select an intervening response from the generated responses for the determined intervening situation based on the at least one action. The VA is configured to deliver the intervening response to the secondary user during the determined intervening situation.

A method for providing assistance in a live conversation includes recognizing, by a VA, a conversation between a primary user and at least one secondary user. The method includes identifying, by the VA, first context data and second context data for the primary user and the secondary user based on the recognized conversation. The method includes generating, by the VA, one or more responses on behalf of the primary user based on at least one second context data derived from the secondary user, and the first context data. The method includes analyzing, by the VA, at least one action of the primary user in the response on the second context data. The method includes determining, by the VA, an intervening situation in the conversation based on the analyzed action. The method includes identifying, by the VA, at least one intimacy category of the secondary user, a privacy level, or the first context data and the context data for the determined intimacy category. The method includes determining, by the VA, to not intervene in the conversation.

In an embodiment, the method includes analyzing, by the VA, the conversation based on the identified intimacy category, the privacy level, or the first and second context data. The method includes identifying, by the VA, the analyzed conversation is a private situation. The method includes requesting, by the VA, permission from the primary user for delivering an intervening response based on identification of the private situation. The method includes receiving, by the VA, permission from the primary user for delivering the intervening response on behalf of the primary user. The method includes delivering, by the VA, the intervening response to the secondary user based on the received permission of the primary user.

FIG. 1 is a block diagram of a system 100 for providing assistance in a live conversation, according to an embodiment of the disclosure.

Referring to FIG. 1, the system 100 for providing assistance in a live conversation includes an electronic device 102, a network 104, a VA 106, and an AI engine 108). The electronic device 102 is associated with a user A. The electronic device 102 may be, but is not limited to, a personal computer 102a, a laptop computer 102b, a tablet computer, a smartphone/phone, a wristwatch/smart watch, an augmented reality device, and the like. In an embodiment, the system 100 includes a plurality of electronic devices 102a, 102b, . . . 102n associated with multiple users. The electronic device 102 is communicatively coupled with the AI engine 108 over the network 104. In one embodiment, the network 104 includes wired and wireless networks. Examples of the wired networks include a wide area network (WAN) or a local area network (LAN), a client-server network, a peer-to-peer network, and so forth. Examples of the wireless networks include wireless fidelity (Wi-Fi), a global system for mobile communications (GSM) network, and a general packet radio service (GPRS) network, an enhanced data GSM environment (EDGE) network, Institute of Electrical and Electronics Engineers (IEEE) 802.5 standard communication networks, code division multiple access (CDMA) networks, or Bluetooth™ networks.

The VA 106 is configured to cooperate with the electronic device 102 and the AI engine 108 over the network 104 to access the electronic device 102 and the AI engine 108 simultaneously, and assisting the user A in a live conversation. In an embodiment, the VA 106 is configured to provide assistance in a live conversation and add value to the conversation and enhance a user experience. In an embodiment, the system 100 is configured to perform functions using either the electronic device 102 or the VA 106. In one embodiment, the VA 106 is configured to consider the perspective of both the primary user and the secondary user in the live conversation for adding content to the conversation. In another embodiment, the system 100 is configured to perform automatic intervention in a live conversation between a primary user and one or more secondary users to add value to the conversation, without any explicit command from the primary user.

Figure 2:
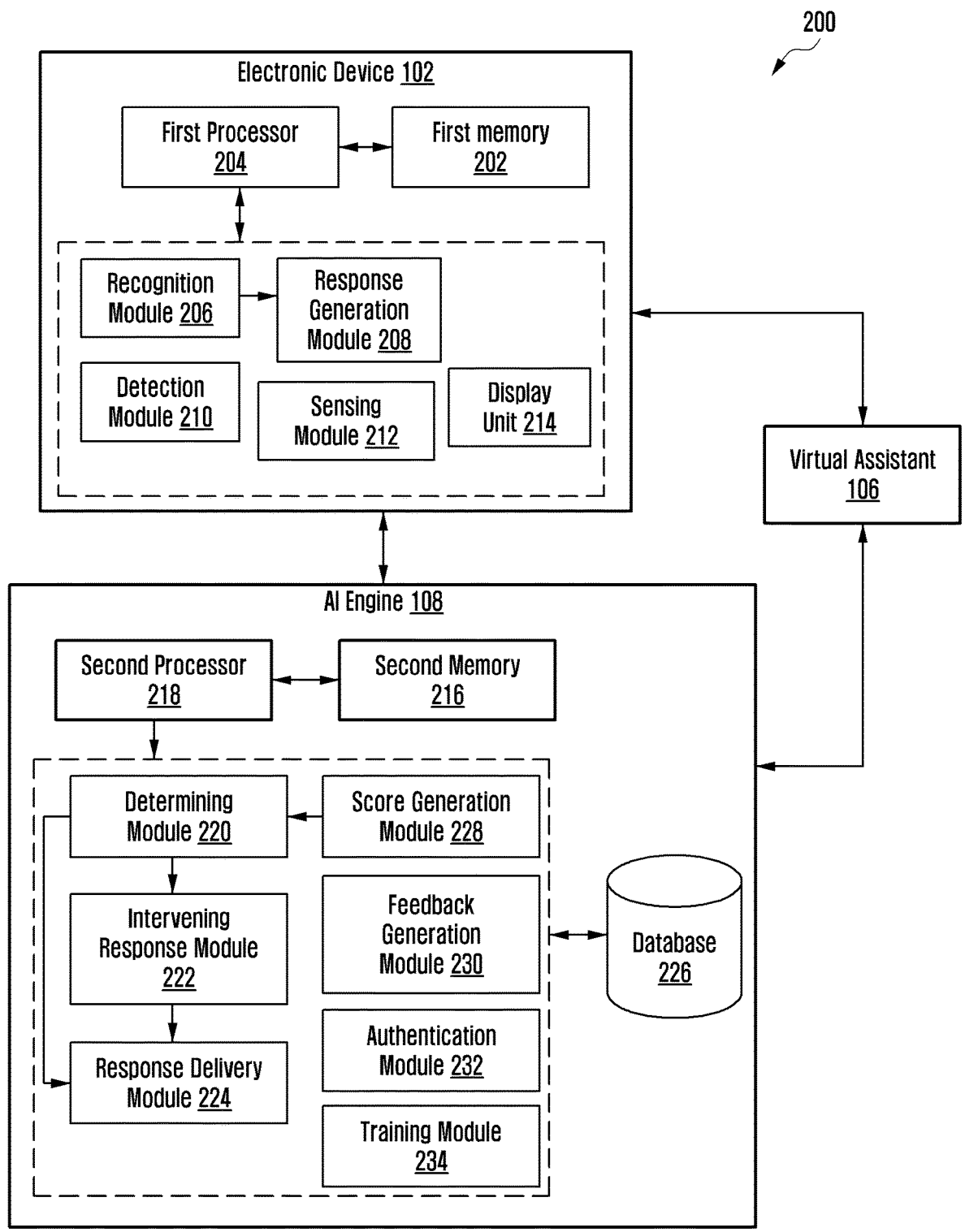
FIG. 2 is a block diagram of the system of FIG. 1 for providing assistance in a live conversation, according to an embodiment of the disclosure.

FIG. 2 is a block diagram of a system 200 for providing assistance in a live conversation of FIG. 1, according to an embodiment of the disclosure.

Referring to FIG. 2, the electronic device 102 includes a first memory 202, a first processor 204, a recognition module 206, and a response generation module 208.

The first memory 202 is configured to store pre-determined rules related to input/output peripherals of the electronic device 100. The input peripherals include a transceiver, a microphone (mic), a user interface, user inputs, and a plurality of sensors. The output peripheral includes a speaker and a display unit which displays additional content to a user. In an embodiment, the first memory 202 may include any computer-readable medium known in the art including, for example, volatile memory, such as static random-access memory (SRAM) and dynamic random-access memory (DRAM), and/or non-volatile memory, such as read only memory (ROM), erasable programmable ROM (EEPROM), flash memories, hard disks, optical disks, and magnetic tapes. The first memory 202 also includes a cache memory to work with the electronic device 102 more effectively.

The first processor 204 is configured to cooperate with the first memory 204 to receive the pre-determined rules. The first processor 204 is further configured to generate device processing commands. In an embodiment, the first processor 204 may be implemented as one or more microprocessors, microcomputers, microcontrollers, digital signal processors, central processing units, state machines, logic circuitries, and/or any devices that manipulate signals based on operational instructions. Among other capabilities, the at least one first processor 204 is configured to fetch the pre-determined rules from the first memory 204 and execute different modules of the electronic device 102.

The recognition module 206 is configured to recognize a conversation between a primary user and at least one secondary user, and identify first context data and second context data for the primary user and the secondary user. In an embodiment, the first context data includes conversation context related data, and the second context data includes purpose context related data. In an embodiment, the recognition module 206 is configured to identify the first context data, and the second context data by using at least one of a deep learning RNN technique, an AI technique, and an NLP technique. In another embodiment, the recognition module 206 is configured to recognize a conversation using a noise filtering technique, a speech recognition technique, an NLP technique, a user profiling, and gestures of the primary user and the secondary user. The gestures include a touch gesture, a shake gesture, a face expression gesture, a hand gesture, and a body gesture. In an embodiment, recognition of a conversation includes mapping a conversation with users and building a users (emotion, situation, need etc.), and situation awareness. The identification of first context data and second context data requires modelling messages and responses, along with training deep RNNs. The identification of the first context data and the second context data helps in making better predictions of the next sentence as a response to the previous sentence in the live conversation.

The response generation module 208 is configured to cooperate with the recognition module 206 to receive the identified first context data and the second context data. The response generation module 208 is further configured to generate one or more responses on behalf of the primary user based on at least one second context data derived from the secondary user, and the first context data. The generated responses may be in the form of content including words, sentences, audio, video, environment settings, and augmented/virtual reality content. In an embodiment, the response generation module 208 is configured to generate one or more responses on behalf of the primary user A associated with the electronic device 102. In an embodiment, the response generation module 208 is configured to generate the responses on behalf of the primary user based on a current response of the primary user or the secondary user, sensor data, the stored user information, and the pre-defined relationship level between the primary user and the secondary user.

In an embodiment, the electronic device 102 includes a display unit 214 configured to display an additional content in the form of an intervening response, and update the availability of the additional content to the primary user and the secondary user.

In another embodiment, the electronic device 102 includes a detection module 210. The detection module 210 is configured to detect a certain spoken word or a group of words from the live conversation. These detected words help to generate one or more responses on behalf of the primary user.

In an embodiment, the electronic device 102 includes a sensing module 212. The sensing module 212 is configured to sense the movements of the electronic device 102, location, presence, audio, body language of the primary user, and visual information of the electronic device 102, and generate sensed data. In an embodiment, the sensing module 212 includes a plurality of sensors including an accelerometer, GPS sensors, data sensors, and low energy sensors. In an embodiment, the low energy sensors include Bluetooth low energy sensors. The signals of the Bluetooth low energy sensors may be used to determine a number of users/known users in the vicinity of the VA 106. In an embodiment, the sensing module 212 is configured to sense a motion and actions of the user.

The AI engine 108 is configured to cooperate with the electronic device 102 to receive the generated responses. The AI engine 108 includes a second memory 216, a second processor 218, a determining module 220, an intervening response module 222, and a response delivery module 224.

The second memory 216 is configured to store pre-determined rules related to determining intervening situation, generating intervening responses, delivering responses, authenticating users, generating feedback, and generating scores. In an embodiment, the second memory 216 may include any non-transitory computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. The second memory 216 also includes a cache memory to work with the AI engine 108 more effectively.

The second processor 218 is configured to cooperate with the second memory 216 to receive the pre-determined rules. The second processor 218 is further configured to generate system processing commands. In an embodiment, the second processor 218 may be implemented as one or more microprocessors, microcomputers, microcontrollers, digital signal processors, central processing units, state machines, logic circuitries, and/or any devices that manipulate signals based on operational instructions. Among other capabilities, the at least one second processor 218 is configured to fetch the pre-determined rules from the second memory 216 and execute different modules of the system 100.

The determining module 220 is configured to analyze at least one action of the primary user in the response on the second context data, and determine an intervening situation in the conversation based on the analyzed action.

The intervening response module 222 is configured to cooperate with the determining module 220 to receive the determined intervening situation. The intervening response module 222 is configured to select an intervening response from the generated responses for the determined intervening situation based on the at least one analyzed action. In an embodiment, the intervening response module 222 is configured to select the intervening response, and add facts, information, and multimedia content into the conversation.

In an embodiment, every person has his/her field of expertise and may respond quickly in any conversation related to the field. For responding in conversations related to other fields, they need more time. For example, Mr. P is a postgraduate in economics. In any conversation related to economics, his responses are strong and quick. But in conversations related to legal matters, he needs time to recollect facts and takes more time before responding. In this, proper timing and tone of delivery of a prepared intervening response will make the primary user and secondary user(s) comfortable. Therefore, the intervening response module 222 is configured to select the intervening response, and add facts, information, and multimedia content into the conversation.

The response delivery module 224 is configured to cooperate with the intervening response module 222 to receive the intervening response. The response delivery module 224 is configured to deliver the intervening response to the secondary user during the determined intervening situation. In an embodiment, the response delivery module 224 is configured to deliver the intervening response at a dynamic time interval. In one embodiment, the response delivery module 224 is configured to determine the dynamic time interval in real-time. In another embodiment, the response delivery module 224 is configured to deliver the intervening response in the form of a content, at the dynamic time interval, to the secondary user. In yet another embodiment, the response delivery module 224 is configured to deliver the intervening response to the secondary user at the dynamic time and tone on behalf of the primary user.

The AI engine 108 also includes a database 226. The database 226 is configured to store the pre-determined parameters, learning data, generated responses, intervening responses, context related data, primary user information, secondary user information, pre-defined relationship level between a primary user and one or more secondary users, intimacy categories, and past conversation details. In an embodiment, the database 226 includes a look up table configured to store information. In one embodiment, the database 226 may be implemented as an enterprise database, a remote database, a local database, and the like. The database 226 may be located within the vicinity of the AI engine 108 or may be located at different geographic locations as compared to that of the AI engine 108. Further, the database 226 may be located either within the vicinity of each database 226 or may be located at different geographic locations. Furthermore, the database 226 may be implemented inside the AI engine 108 and the database 226 may be implemented as a single database.

In another embodiment, the AI engine 108 includes a training module 234. The training module 234 is configured to train the generated responses using the learning data and create a privacy level for the primary user based on the trained responses. Personalization of the VA 106 and privacy of the primary user information may be achieved by training and reviewing the responses of the primary user. In another embodiment, privacy of the primary user information may be achieved by identifying relationship level of the primary user and the secondary user in the conversation.

In another embodiment, the AI engine 108 includes a score generation module 228. The score generation module 228 is configured to generate a score for each generated response based on the pre-determined parameters. In an embodiment, the score generation module 228 is configured to compare a current response of the primary user with the generated responses and identify a score of the current response of the primary user. The score generation module 228 uses AI and NLP techniques for generating scores for each response. The determining module 220 is configured to cooperate with the score generation module 228 to receive the generated score. The determining module 220 is further configured to analyze the action of primary user in the generated response with the generated score on the second context data derived from the secondary user.

In another embodiment, the AI engine 108 includes a feedback generation module 230. The feedback generation module 230 is configured to generate feedback for the delivered intervening response, and update the learning data in the database 226 based on the feedback. The feedback includes a positive feedback or a negative feedback, and is provided by the primary and secondary users.

In another embodiment, the AI engine 108 includes an authentication module 232. The authentication module 232 is configured to authenticate the primary user by using authentication techniques. The authentication techniques include a voice recognition technique, a pattern recognition technique, a password, a fingerprint recognition technique, a face recognition technique, and the like.

In an embodiment, the system 100 includes a VA 106. The VA 106 is communicatively coupled with the electronic device 102 and the AI engine 108 to perform functionalities in the system 100. The VA 106 is associated with a primary user. The VA 106 is configured to recognize the conversation between the primary user and at least one secondary user. The VA 106 is configured to identify first context data and second context data for the primary user and the secondary user based on the recognized conversation. The VA 106 is configured to generate one or more responses on behalf of the primary user based on at least one the second context data derived from the secondary user, and the first context data. The VA 106 is configured to analyze at least one action of the primary user in the response on the second context data, and determine an intervening situation in the conversation based on the analyzed action. The VA 106 is configured to select an intervening response from the generated responses for the determined intervening situation based on the at least one action. The VA 106 is configured to deliver the intervening response to the secondary user during the determined intervening situation.

The VA 106 is configured to recognize the conversation between the primary user and the secondary user by identifying conversation context related data and purpose context related data using the deep learning RNN, AI, or NLP technique. The VA 106 is configured to generate multiple responses with a score, by using the conversation context related data and purpose context related data. The VA 106 may generate a set of relevant responses by understanding purpose context related data derived from the secondary user, the conversation context related data, and other available data. The VA 106 is also configured to provide scores to the generated responses based on various parameters. The generated response may be words, sentences, sound, music, video, environment settings, augmented/virtual reality content, and the like. In one embodiment, the VA 106 is configured to use AI and NLP techniques for generating a set of possible responses and is personalized for the primary user. Each of the individual responses includes information about parameters required for delivering the response to the secondary user, for example, tone, volume, style, mood, etc. This ensures that the response content does not violate data privacy.

The purpose context identification is a type of natural language understanding (NLU) task that facilitates understanding of the type of action conveyed in the sentences and all its participating parts. The VA is configured to identify the purpose context data using a parameter, i.e., a type of sentence. The type of sentences includes:
a) Interrogative sentences: These sentences ask questions, and a reply is required.
b) Declarative sentences: These sentences are used to state information, and may start conversation.
c) Imperative sentences: These sentences give commands or make requests, and need a response.
d) Exclamatory sentences: These sentences express emotion, and a response may or may not come.

Some of the parameters used for recognizing the conversation between the primary user and the secondary user are shown in Table 1 as follows:

TABLE 1

| Primary Parameters | Secondary Parameters |
| --- | --- |
| Personal history | Volume level of different parts of sentence |
| Category of conversation (Serious/Sad/Normal/Happy/Confidential/Formal/Casual) | Speed of speaking |
| | Etiquette followed |
| Social media profiles | User's feedback for earlier communication done by the VA 106 |
| Privacy level of information required in communication | |
| Mood of user | Interest level of the primary/secondary user in various topics |
| Previous conversation details | Experiences |
| Body language (Postures, Gestures and Expressions) | Styles of speaking |
| Engagement level in conversation | Companions during current conversation |

TABLE 1-continued

| Primary Parameters | Secondary Parameters |
| --- | --- |
| Data from various sensors | Response diversity |
| Location and Environment of conversation | Correctness of sentence |
| | Completeness of sentence |
| Tone of speaking | Language and dialect used |
| Additional tasks in parallel to the conversations (Eating/watching TV, work out etc.). | Complexity of vocabulary used |
| | Discourse coherence |
| Active ontology | |
| Relationship level between parties in communication. | |

The VA 106 is configured to recognize the conversation, and identify, the context data using NLU, context modelling, topic and domain detection, dialog management, and sentiment detection techniques.

Different context may lead to different responses. For example,
Context 1: I live in a village.
Context 2: I live in Chicago.
Input: Are you going to watch the bulls?

| | Score with | |
| --- | --- | --- |
| Response | Context 1 | Context 2 |
| I am planning to visit the farm soon. | 98.35 | 93.91 |
| I am going to watch them on TV | 94.24 | 95.35 |

In another embodiment, the VA 106 is also configured to identify an intervening situation in the conversation between the primary and secondary user using, but are not limited to, the following parameters:
a) if the primary user has not spoken within a threshold time;
b) if the primary user has not completed a sentence and is stuck in between;
c) if utterances of neutral vowel sounds (fillers like "um," "er," "ah," "aaa," etc.) are identified from the primary user;
d) if the primary user needs supporting facts for a statement;
e) if the primary user's statement has a significant deviation from a knowledge graph;
f) if the primary user is busy with another task;
g) if the primary user hesitated while speaking a response; and
h) if the secondary user is not satisfied from the primary user's response.

Further, the VA 106 is configured to select at least one response from the generated response for the intervening response and deliver the response at an appropriate time. In an embodiment, the primary user response to the VA 106 intervention in conversation may be considered to determine the quality of the VA 106 delivered response, and may be used for personalization of the VA 106. In one embodiment, conversations augmented by the VA 106 may be saved and reviewed later for feedback by the primary user.

One of the basic responsibilities of the VA 106 is to maintain privacy of the user's data. The VA 106 does not disclose any private data of a user while intervening in a conversation. The VA 106 also properly handles interventions during private situations of the user. The user's behavior in a private situation is different from the user's normal behavior. This deviation in the user's behavior may be determined using an AI based hybrid sentimental analysis technique. When a deviation in the user's behavior exceeds a threshold value, conversation may be marked as special/private. For example, some private situations where VA intervention is not desired, are as follows:

A primary user is hesitating while trying to propose to his/her friend;

The primary user's friend asks him, if he likes her or not. The primary user does not respond for a threshold time or hesitates.

The primary user is in anger/excitement and is not able to complete a sentence.

The primary user is taking time in responding while negotiating a price with a secondary user.

The primary user is whispering to the secondary user.

The primary user needs to provide his/her personal feelings/decision and not just a fact and the user is taking time to respond.

The primary user explicitly declares a situation as private and instructs the VA 106 to not intervene.

Further, some parameters that identify a situation as private are as follows, but are not limited thereto:

conversation context and purpose context (AI and NLP);

sensitive private information used in the conversation (NLP and profiling);

topic/content of the conversation is private (NLP);

a primary user's style/tone of talking is significantly different than normal day to day conversation styles (AI based hybrid sentiment analysis);

primary user's physical, emotional, intelligence parameters and contemporary conversation behavior in a certain situation (AI based hybrid sentimental analysis, user profiling); and seriousness of conversation (voice analysis, profiling and NLP).

Continuous learning of the VA 106 and the personalized training by the primary user may improve accuracy of the VA 106 in identifying private situations specific to the user, where the intervention of the VA 106 is not required, and may also help the VA 106 to identify false positives and false negatives.

The VA 106 is configured to handle private information. By default, the VA 106 cannot use any private information of the primary user while intervening during a conversation. The types of information listed below are considered private but are not limited thereto. The VA 106 needs a judgment procedure to include private information in its intervening response, such as biographical, biological, financial, medical, professional, family, political opinion, behavioural etc. The private information that may be used by the VA 106 in an intervening response may be identified using an AI model. The number of ways of identifying private information that may be used in an intervention by the VA 106 include but are not limited to:

The private information disclosed by the primary user to a particular secondary user in an earlier conversation: The VA 106 may use the private information in an intervention, only with this particular secondary user.

Any private data of the primary user that may be generated from already disclosed private information: e.g.: a user has shared his yearly salary with Mr. S in a previous communication. When Mr. S asks the user about his monthly salary, then the VA 106 calculates the user's monthly salary from the yearly salary and may use it.

If a user has explicitly instructed the VA 106 to use certain private information with a certain secondary user: The VA 106 may use this information in a conversation with this particular secondary user.

Any user information which is available in the public domain (e.g., social media, the Internet): Such information cannot be considered as private.

The VA's prepared response has private data of the primary user: The VA 106 may ask the primary user for permission to intervene in a conversation The VA 106 may use private information of the primary user only when the relationship level of the primary user with the secondary user is at an appropriate level as detected by the adaptive learned AI based multi-parameter-model. Initially, when the primary user starts using the VA conversation intervention mode, the VA 106 cannot use any private information. After sufficient learning of an AI model with sufficient data and through personalized training and review by the primary user, a confidence score of a generated response of the VA 106 may be more than a threshold value. Only after this, the VA 106 starts using the sensitive personal information during a conversation in certain scenarios.

Figure 3:
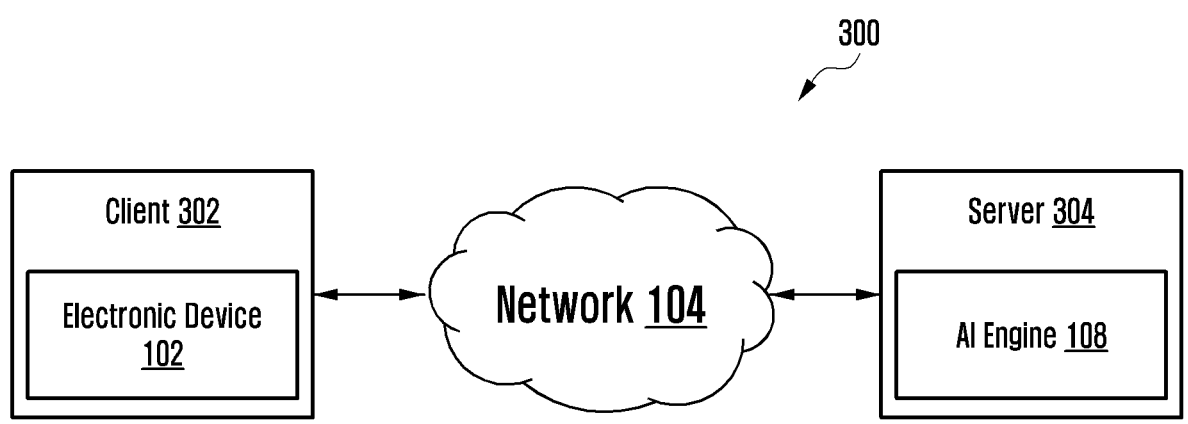
FIG. 3 is a block diagram of components of the system of FIG. 1 in a client-server arrangement, according to an embodiment of the disclosure.

FIG. 3 is a block diagram of the system of FIG. 1 in a client-server arrangement 300, according to an embodiment of the disclosure.

Referring to FIG. 3, the electronic device 102 is configured to communicatively coupled with an AI engine 108 via a network 104, in a client-server arrangement 300. In an embodiment, the electronic device 102 is located at a client 302 side, and an AI engine 108 is located at a server 304 side.

Figure 4:
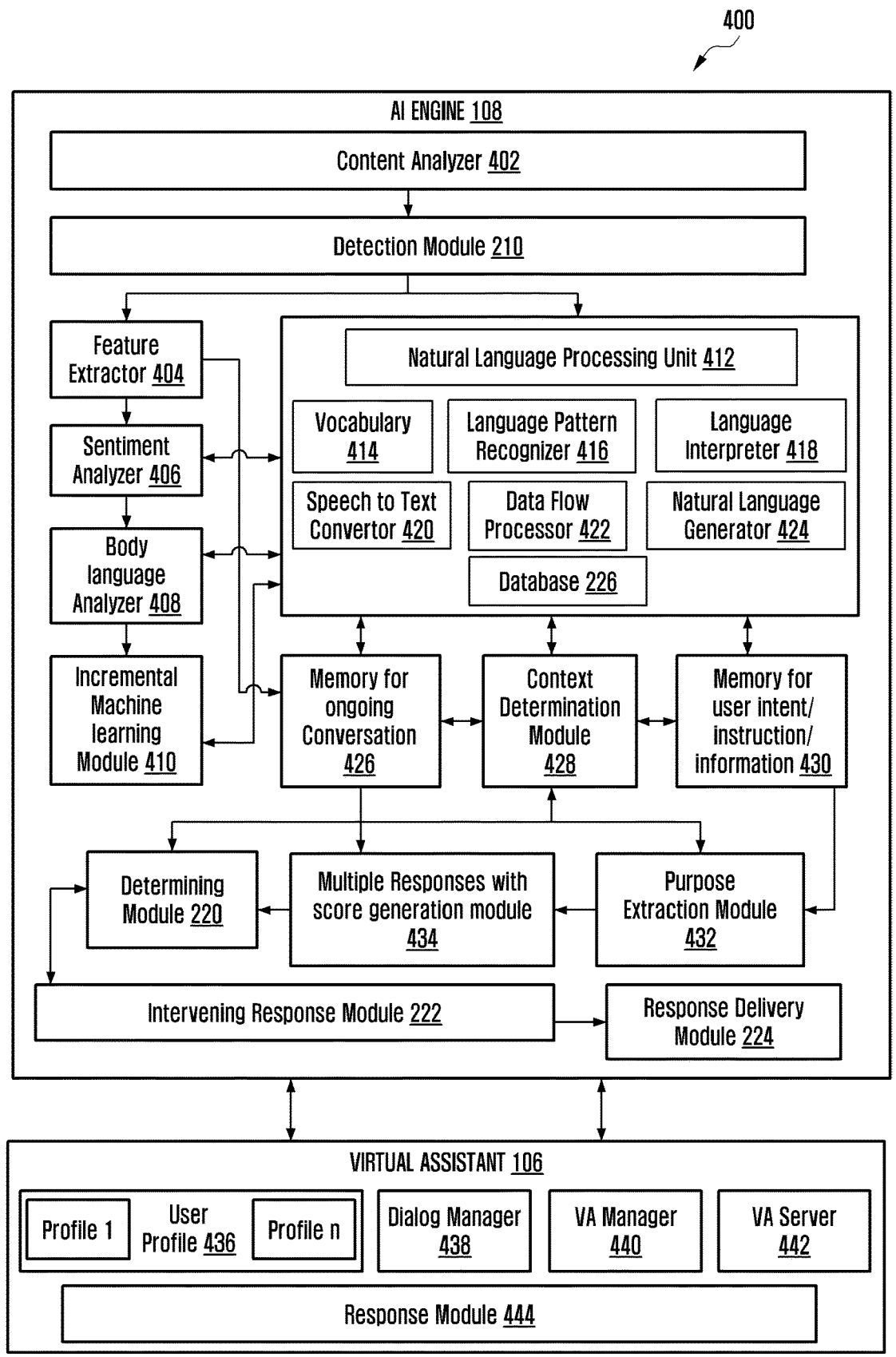
FIG. 4 is a diagram of an AI engine, according to an embodiment of the disclosure.

FIG. 4 is a block diagram 400 of an AI engine 108, according to an embodiment of the disclosure.

Referring to FIG. 4, the AI engine 108 includes additional features, such as a content analyzer 402, a feature extractor 404, a sentiment analyzer 406, a body language analyzer 408, an incremental machine learning module 410, a natural language processing unit 412, a memory for an on-going conversation 426, a context determination module 428, a memory for user intent/instruction/information 430, a purpose extraction module 432, and multiple responses with a score generation module 434. Further, the AI engine 108 is configured to cooperate with a VA 106.

The content analyzer 402 is configured to analyze the content of a conversation. A recognition module 206 (as shown in FIG. 2) may include the content analyzer 402 configured to recognize the conversation between a primary user and a secondary user, and analyze the content of the conversation. Based on the identified content, the recognition module 206 is configured to identify first context data and second context data.

The detection module 210 is configured to detect a certain spoken word or a group of words from the conversation. The detected word(s) is then transmitted to the feature extractor 404 and the natural language processing unit 412.

The feature extractor 404 is configured to extract features of the spoken word(s) including tone, pitch, breadth, style, etc., but is not limited thereto.

The sentiment analyzer 406 is configured to cooperate with the feature extractor 404 to receive the extracted features. The sentiment analyzer 406 is configured to analyze sentiments of the primary user and the secondary user during the conversation. The analyzed sentiments are then stored in the memory for on-going conversation 426. In an embodiment, the memory for on-going conversation 426 may be the second memory 216 (as shown in FIG. 2).

The body language analyzer 408 is configured to cooperate with the sentiment analyzer 406. The body language analyzer 408 is configured to analyze the body language of the primary user and the secondary user during conversation, based on the analyzed sentiments. The body language analyzer 408 helps in generating responses.

The incremental machine learning module 410 is configured to cooperate with the body language analyzer 408. The incremental machine learning module 410 is configured to cluster the primary user and the secondary user based on the stored past conversation details, feedback, and sentiments before and after the conversation. The number of categories of the clusters depends upon the complexity of the NLP technique. These categories may be as many as the number of the ways of clustering the primary user and the secondary user, and the NLP unit 412 may form the final deliverable output for all the possible scenarios. As the number of the categories increases, the incremental machine learning module 410 increases the learning time and effectiveness of the system 100. In an embodiment, the incremental machine learning module 410 is configured to cluster the users based on a pre-defined relationship level between the primary user and the secondary users, conversation details, and the like. The response of the primary user may be processed to determine how effectively and interestingly the secondary user listens to the responses provided by the primary user during the conversation. The incremental machine learning module 410 also determines the knowledge of the primary user. The responses may be used to determine the information related to the secondary user, which the secondary user wants to listen from the primary user, and then may be used as an input to the incremental machine learning module 410. The feedback of the users helps to determine the accuracy of the clustering.

The incremental machine learning module 410 is configured to cooperate with the database 226 (as shown in FIG. 2). The incremental machine learning module 410 extracts primary and secondary users' information, or other relevant information pertaining to the users from the database 226. The incremental machine learning module 410 updates the profiles/information of the users in the database 226 after each conversation, if an update is required.

The natural language processing unit 412 helps in extracting features of spoken words, analyzing sentiments of the primary user and the secondary user during the conversation, analyzing the body language of the primary user and the secondary user during the conversation, and clustering the primary user and the secondary user. In an embodiment, the natural language processing unit 412 is configured to extract features and helps to analyze the sentiments, along with the sentence structure. The natural language processing unit 412 includes a vocabulary 414, a language pattern recognizer 416, a language interpreter 418, a speech to text convertor 420, a data flow processor 422, a natural language generator 424, and the database 226.

The natural language processing unit 412 is configured to provide the most probable intent of the primary user from the live conversation, the first context data and the second context data, and the past conversation details stored in the database 226. The vocabulary 414 includes a certain word or a group of words used in a particular language during the conversation. The language pattern recognizer 416 is configured to recognize a pattern during the conversation, and identify a language based on linguistic skills. The language interpreter 418 is configured to interpret a language based on pitch/tone of the primary/secondary user(s). The speech to text convertor 420 is configured to convert the speech of the primary user (i.e. the information/user intent/additional content) in a textual form. The dialog flow processor 422 is configured to determine conversation context including response history, location and user preferences. The database 226 is configured to store responses, context related data, primary user information, secondary user information, conversation details, and the other information pertaining to the primary/secondary user. The natural language generator 424 is configured to generate one or more responses based on the interpreted language. In an embodiment, the natural language processing unit 414 is configured to find the most probable intent of the conversation, form the response, and decide the tone in which a response is to be delivered, depending upon the intent of the secondary user, sentiments of the secondary user, the information provided by the primary user, and past conversation details with the secondary user. In an embodiment, the natural language processing unit 412 may also check for additional content/well-known information/history in the electronic device 102, if the additional content/well-known information/history is authorized, the natural language processing unit 402 transmits the additional content/well-known information/history to the secondary user.

The context determination module 428 is configured to cooperate with the natural language processing unit 412, the memory for on-going conversation 426, and the memory for user intent/instruction/information 430. The context determination module 428 is configured to determine context from the on-going conversation. The context may include conversation context and purpose context. In an embodiment, context determination of the conversation between the primary user and the secondary user is used for understanding/recognizing the conversation. Further, the context determination module 428 is configured to extract purpose context of the secondary user to receive a response from the primary user or give a response to the primary user. In an embodiment, the context determination module 428 is further configured to extract the purpose context and capability of the primary user to receive a response from the secondary user or give a response to the secondary user. In another embodiment, conversation understanding includes mapping conversation with users and user's context building (i.e., emotion, situation, need, and the like), and the situation awareness. The conversation context and the purpose context determination requires modelling messages and responses, along with training deep RNNs. The determination of conversation context and purpose context helps in making better predictions of the next sentence as a response to the previous sentence in the on-going conversation. In an embodiment, the recognition module 206 (as shown in the FIG. 2) includes the context determination module 428.

The memory for user intent/information/instruction 430 is configured to store data related to the secondary user's intent, information and instruction. The memory for user intent/information/instruction 430 is configured to store past conversation details, where the secondary user's preference/interest related data is stored during a conversation. In one embodiment, the memory for user intent/information/instruction 430 may be the second memory 216 (as shown in FIG. 2).

The purpose extraction module 432 is configured to cooperate with the memory for user intent/information/instruction 430 and the context determination module 428. The purpose extraction module 432 is configured to extract the purpose of the secondary user based on the stored secondary user information.

The AI engine 108 is configured to generate a response with a score. The score is generated by a score generation module 228. In an embodiment, the AI engine 108 is configured to generate multiple responses with multiple scores in a multiple responses with score generation module 434). The multiple responses with score generation module 434 is configured to cooperate with the memory for ongoing conversation 426, the context determination module 428, and the purpose extraction module 432, and is further configured to generate multiple responses based on the determined context and the purpose of the secondary user, and generate a score for each response using the score generation module 228.

In another embodiment, the AI engine 108 includes a score generation module 228. The score generation module 228 is configured to generate a score for each generated response. In an embodiment, the score generation module 228 is configured to compare a current response of the primary user with the generated responses and identify a score of the current response of the primary user. The score generation module 228 uses AI and NLP techniques for generating scores for each response. The determining module 220 is configured to cooperate with the score generation module 228 and the context determination module 428 to receive the generated score and the determined context. The determining module 220 is further configured to analyze the action of primary user in the generated response with the generated score on the purpose context derived from the secondary user, and determine an intervening situation in the conversation based on the analyzed action.

The intervening response module 222 is configured to cooperate with the determining module to receive the determined intervening situation. The intervening response module 222 is configured to select an intervening response from the generated responses for the determined intervening situation.

The response delivery module 224 is configured to cooperate with the intervening response module 222 to receive the intervening response. The response delivery module 224 is further configured to deliver the intervening response to the VA 106 during the determined intervening situation. In an embodiment, the response delivery module 224 is configured to deliver the intervening response to the secondary user.

The VA 106 includes user profiles 436, a dialog manager 438, a VA manager 440, a VA server 442, and a response module 444.

The VA 106 is associated with a primary user. The VA 106 has a user profile 436 of the primary user that includes the primary user's responses in different situations, tone, pitch, style, etc. The VA 106 may have more than one profile, for example, Profile 1, Profile 2, . . . . Profile n, where each profile is associated with a different primary user.

The dialog manager 438 is configured to identify intent of the secondary user, sentiments of the secondary user, responses provided by the primary user to the secondary user, and past conversation details, and generate dialogs as an automated response to the secondary user.

The VA server 442 is configured to store data generated by the VA. In an embodiment, the VA server 442 is configured to store the data which is handled by the VA 106, for future user.

The response module 444 is configured to provide an automatic response on behalf of the primary user based on the intent.

Figure 5:
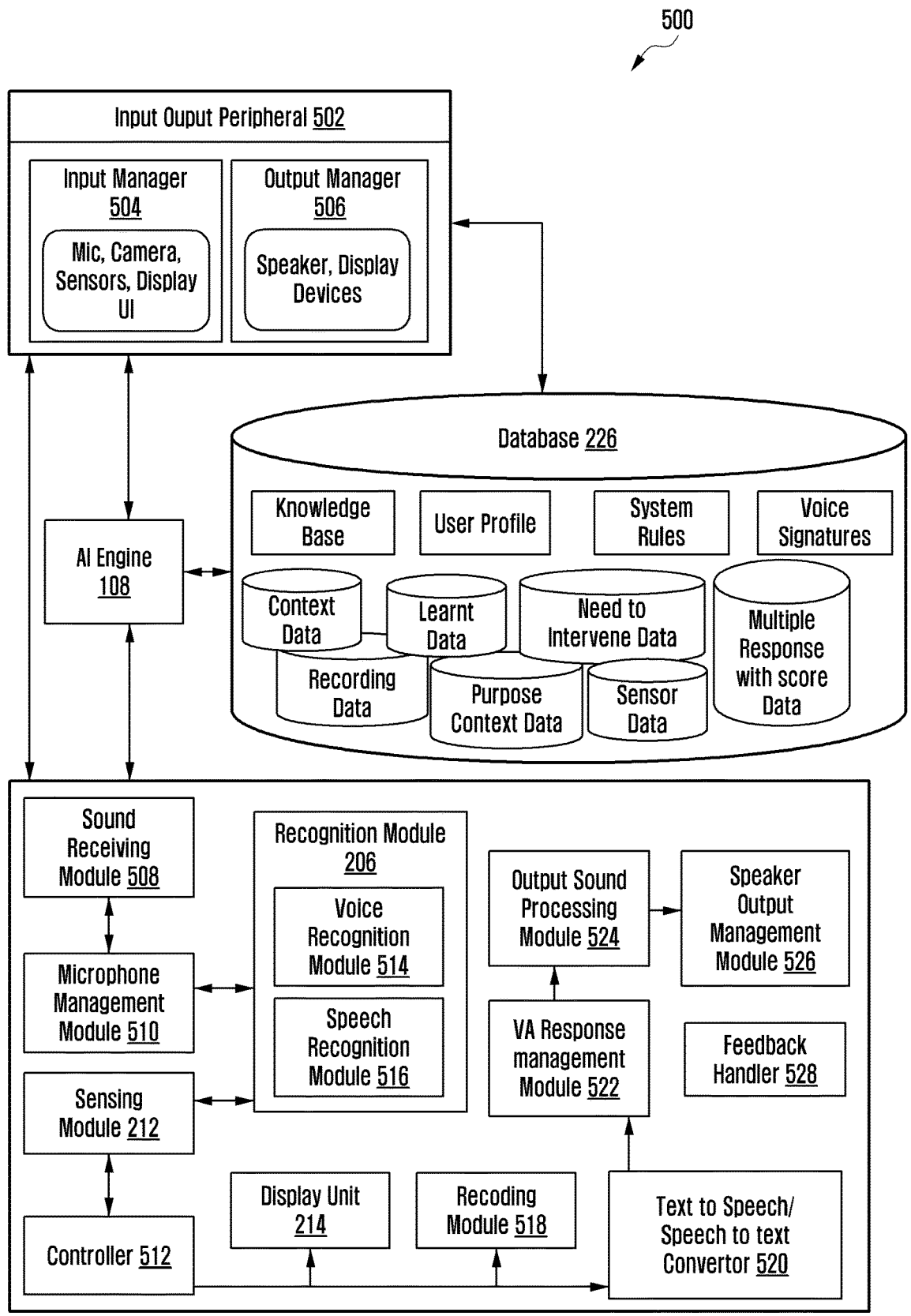
FIG. 5 is a block diagram of an electronic device, according to an embodiment of the disclosure.

FIG. 5 is a block diagram of an electronic device 500, according to an embodiment of the disclosure.

Referring to FIG. 5, various sub-modules of the electronic device 500 (e.g., the electronic device 102) and connectivity of the submodules with other components of the system 100 are illustrated. The electronic device 500 includes an input output peripheral 502, which provides accessibility to the database 226, the AI engine 108, and other sub-modules of the electronic device 500. The input output peripheral 502 includes an input manager 504 and an output manager 506. The input manager 504 is configured to manage one or more inputs received from one or more users. In an embodiment, the input manager 504 includes a mic, a camera, a plurality of sensors, a display user interface (UI), and the like. The output manager 506 is configured to manage one or more generated outputs of the electronic device 500. The output manager 506 is configured to transmit the generated outputs to the one or more users. The output manager 506 includes a speaker, display devices, and the like.

The AI engine 108 is configured to analyze actions of the primary user, determine an intervening situation, select an intervening response, and deliver the intervening response to one or more secondary users, by using the input output peripheral 502. The AI engine 108 includes a database 226, which is configured to store knowledge base data of the primary user, user profiles, system rules, voice signatures, context data, learnt data, data related to need to intervene in conversation, recording data, purpose context data, sensor data, multiple response with score data, and other data generated or received by the electronic device 500.

The electronic device 500 further includes a sound receiving module 508, a microphone management module 510, a recognition module 206, a sensing module 212, a controller 512, a display unit 214, a recording module 518, a text to speech/speech to text convertor 520, a VA response management module 522, an output sound processing module 524, a speaker output management module 526, and a feedback handler 528.

The sound receiving module 508 is configured to receive sound from one or more users in an environment as an input of the electronic device 500. The microphone management module 510 is configured to manage a microphone to receive sound from the users. The sensing module 212 is configured to sense the movements of the electronic device 500, location, presence, audio, body language, and visual information of the electronic device 500 and generate the sensed data. The recognition module 206 is configured to recognize a conversation between a primary user and a secondary user. The recognition module 206 includes a voice recognition module 514 and a speech recognition module 516. The voice recognition module 514 is configured to recognize a voice of the primary user or a secondary user. The speech recognition module 516 is configured to recognize speech from the conversation. The recognition module 206 is configured to recognize conversation from the voice and speech of the two or more persons. The controller 512 is configured to cooperate with the sensing module 212, the display unit 214, the recording module 518, and the text to speech/speech to text converter 520. The controller 512 is further configured to control the functionalities of the sensing module 212, the display unit 214, the recording module 518, and the text to speech/speech to text converter 520. The display unit 214 is configured to display an additional content in the form of an intervening response, and update availability of the additional content to the primary user and the secondary user. The recording module 518 is configured to record the conversation between the primary user and the secondary user, for a future user. The text to speech/speech to text convertor 520 is configured to convert the text of the primary user (i.e. the information/user intent/additional content) into speech or speech of the primary user (i.e. the information/user intent/additional content) into text. The VA response management module 522 is configured to transmit the converted speech/text to the VA to automatically manage the response with the secondary user. The output sound processing module 524 is configured to generate and process an output sound, as a generated response for the secondary user. The speaker output management module 526 is configured to manage the output sound transmitted via a speaker to the secondary user. The feedback handler 528 is configured to handle feedback received from the primary user or the secondary user for the generated output by the VA 106.

Figure 6:
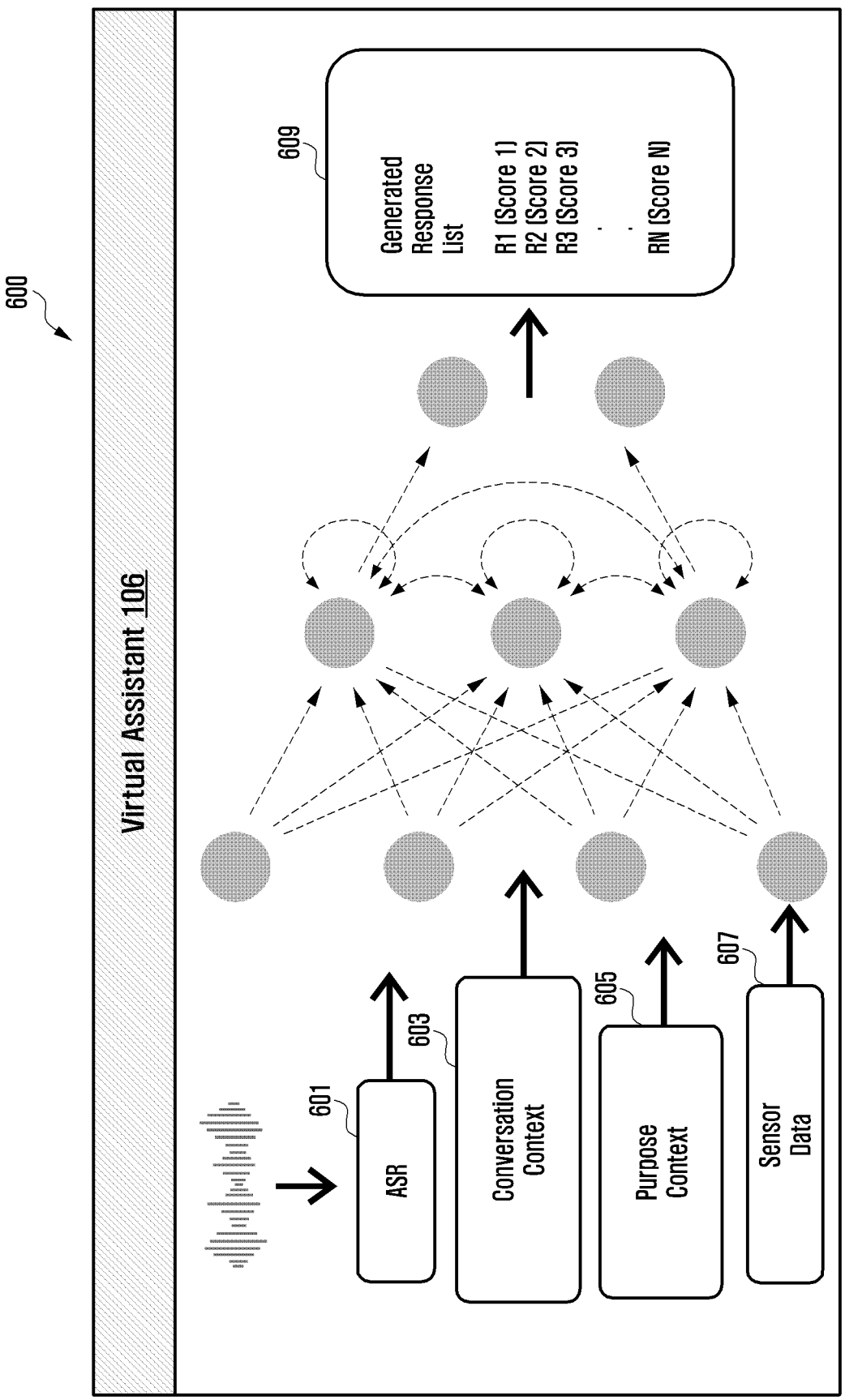
FIG. 6 is a diagram of generating multiple responses to a statement using a deep learning recurrent neural network (RNN), according to an embodiment of the disclosure.

FIG. 6 is a diagram 600 of generating multiple responses to a statement using a deep learning RNN, according to an embodiment of the disclosure.

Referring to FIG. 6, the VA 106 is configured to generate multiple responses to a statement using a deep learning RNN. In an embodiment, the deep learning RNN and NLP techniques with current utterances and recognition of a conversation may generate multiple responses to the statement. The VA 106 is configured to generate multiple responses with a score, by using automatic speech recognition (ASR) 601, conversation context related data 603, purpose context related data 605, and sensor data 607. The VA 106 may generate a set of relevant responses by understanding purpose context related data 605 derived from the secondary user, the conversation context related data 603, ASR 601 and the sensor data 601. The VA 106 is also configured to provide scores for these generated responses based on various parameters. For example, the VA 106 is configured to apply the deep learning RNN technique on the ASR 601, conversation context related data 603, purpose context related data 605, and sensor data 607, and generate a response list 609, such as R1 (Score1), R2 (Score2), R3 (Score3), . . . R4 (Score4). Thus, the VA 106 is configured to generate each response with a score.

The VA 106 may use an adaptive learned AI based multi-parameter-model to generate a set of possible responses (R1 (Score1), R2 (Score2), R3 (Score3), . . . R4 (Score4)). Each statement in the conversation between the primary user and the secondary user updates conversation context related data 603 and purpose context related data 605. The conversation context related data 603 and purpose context related data 605, along with the sensor data 607, are provided to the VA 106 to generate possible responses on behalf of the primary user during an intervening situation. The generated response considers the perspective of both the primary user and the secondary user instead of the perspective of only the primary user. The VA 106 may generate personalized and efficient responses through continuous training. The training may be achieved through feedback of stored data of past conversations and real-time training during a conversation. With training, the primary user or the secondary user may help the VA 106 to identify false positives and false negatives. More specifically, the VA 106 observes the primary user's physical, emotional, intelligence parameters and contemporary conversation behavior, and estimates personalized responses for the primary user that may be used in the intervening situation.

Figure 7:
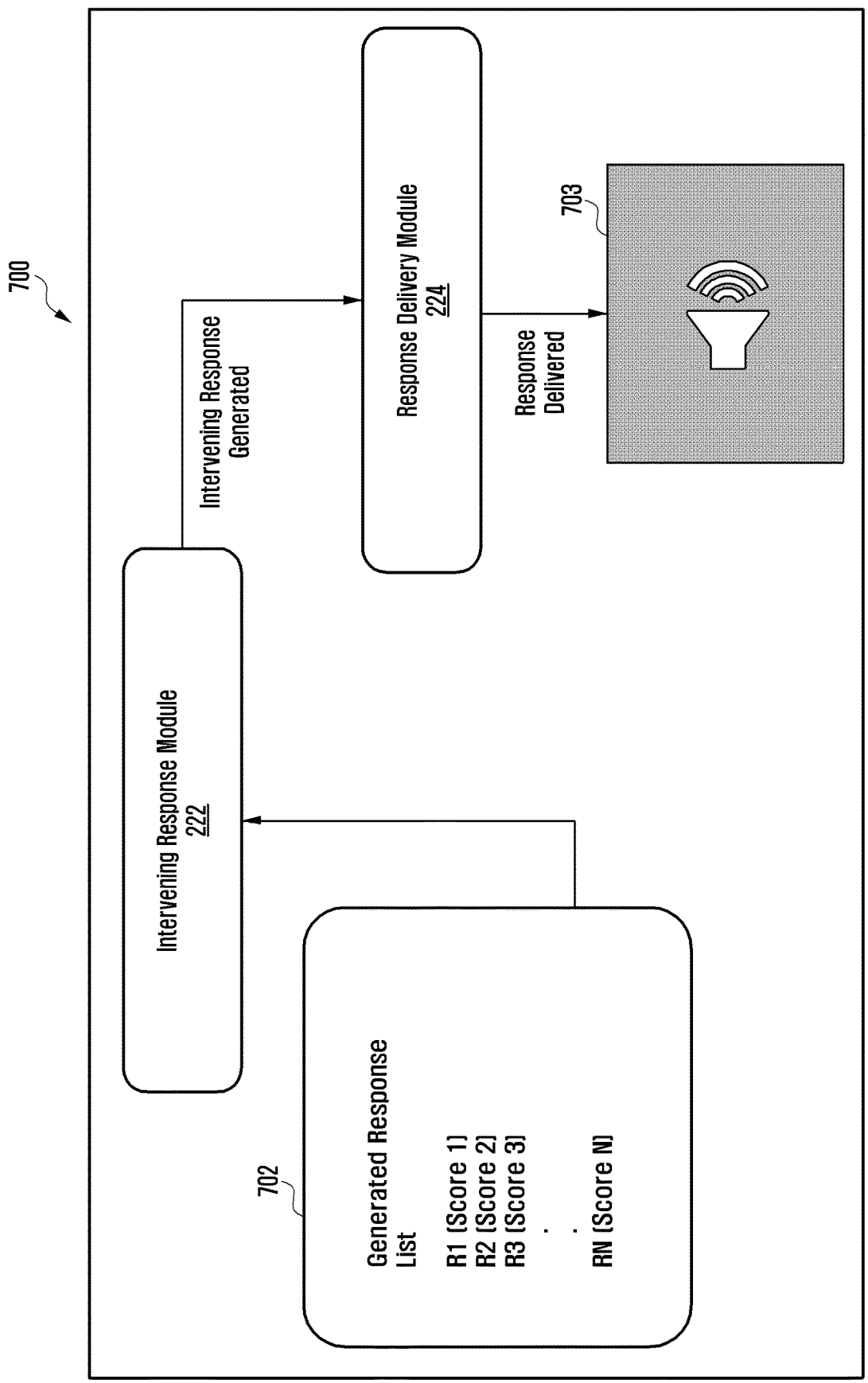
FIG. 7 is a diagram of preparing an intervening response, according to an embodiment of the disclosure.

FIG. 7 is a block diagram 700 illustrating preparation of an intervening response, according to an embodiment of the disclosure.

Referring to FIG. 7, during the conversation between the primary user and the secondary user, the VA 106 generates a set of responses 702. On determining the intervening situation, an intervening response module 222 is configured to generate the intervening response from the set of generated responses 702. The generation of the intervening response depends on the characteristics of the response delivered by the primary user. If a strongest generated response of the VA 106 differs significantly (more than a threshold value) from the primary user's response, then the VA 106 is configured to select a stronger response from the set of generated responses 702 for intervention. Some of the ways of generating the intervening response are as follows:

a) When the score of the primary user's response is below to pre-defined threshold level, then the VA 106 prepares a response with a highest score.

b) When the primary user has not completed the sentence, the VA 106 automatically generates the remaining part of the sentence.

c) When the primary user needs supporting/contradicting facts for his statement, the VA 106 identifies a response with stronger facts/contradicting facts.

d) When a language/communication skill levels of the primary user and the secondary user do not match, the VA 106 prepares a response with an appropriate difficulty level for the secondary user.

e) When the conversation between the primary user and the secondary user is casual, the VA 106 prepares a response content like "laughter sound" for jokes or music during singing.

The VA 106 is configured to generate an intervening response based on at least one of the actions of the primary user, the conversation context related data, and the purpose context related data. The VA 106 delivers the prepared response 703 to the secondary user during the intervening situation, at the right time, by using a response delivery module 224. For example, delivery in response to complex sentence may have more delay, such as a complex mathematical equation; delivery of responses which are answered quickly may have less delay, such as response of "Hi" from the secondary user may be answered quickly; and if the primary user or the secondary user start speaking, then the VA 106 stops speaking immediately.

Figure 8:
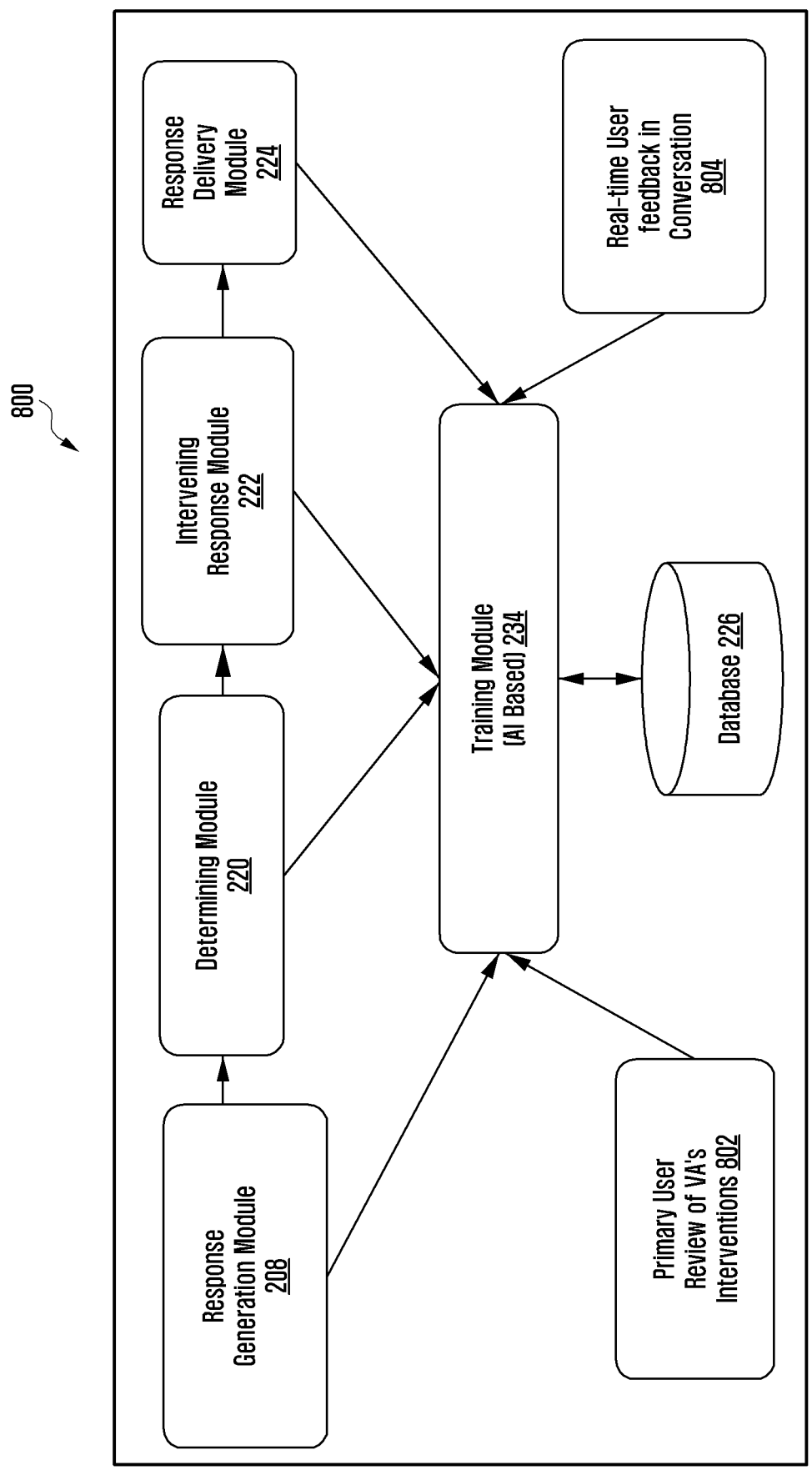
FIG. 8 is a block diagram of personalizing a VA, according to an embodiment of the disclosure.

FIG. 8 is a diagram 800 illustrating personalization of a VA, according to an embodiment of the disclosure.

Referring to FIG. 8, proper feedback enhances expertise of a VA 106 in generating more personalized responses by a response generation module 208, determination of intervening situation by a determining module 220, generation of intervening response by an intervening response module 222, and delivery of intervening response by a response delivery module 224, for improved user experience. The primary/secondary user's feedback on the intervention of the VA 106 provides a decision making capability, which may be fine-tuned and personalized by providing feedback to the VA 106 for interventions. Some of the ways to provide the feedback to the VA 106 are as follows:

a) verbal appreciation of the VA 106 response by the primary user and the secondary user is considered as a positive feedback;

b) verbal criticism of the VA 106 response by the primary user and the secondary user is considered as negative feedback;

c) listening to a complete response by the VA 106 is considered positive feedback; and d) a conversation going forward in a direction with the response provided by the VA 106 is positive feedback.

All conversations in which the VA intervenes 106 are stored in conversation logs of the database 226 as audio/text file and reviewed by the primary user 802 by grading and selection of an appropriate response, or the primary user or the secondary user provide feedback during the conversation in real-time 804. The fine-tuning of decisions may lead to personalization of the VA 106 by an AI based training module 234. Fine-tuning of decisions continues in parallel with all of the stages of the system 100 i.e. from recognizing the conversation to the delivery of an intervening response.

Figure 9:
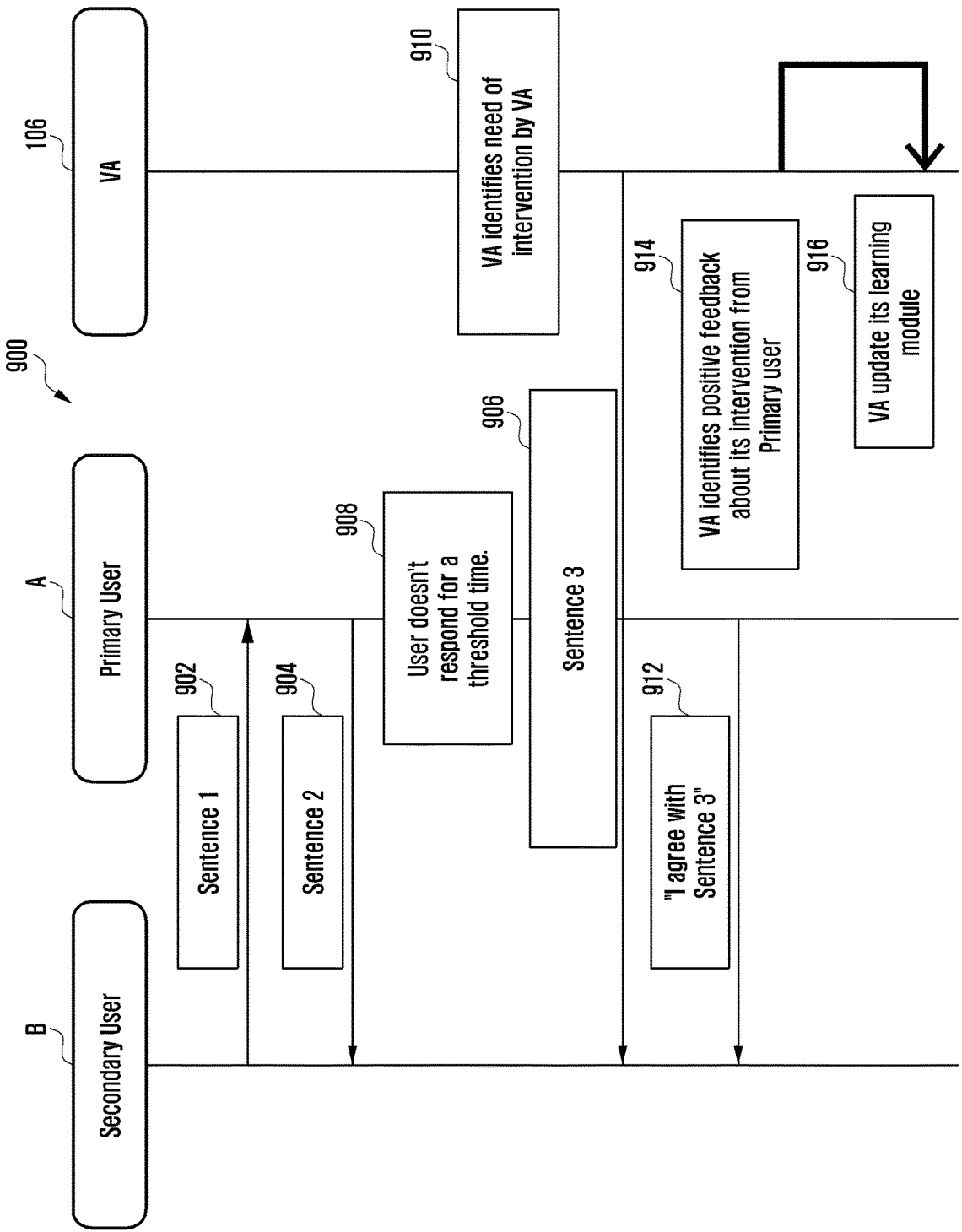
FIG. 9 is a sequence diagram of personalizing a VA, according to an embodiment of the disclosure.

FIG. 9 is a sequence diagram 900 illustrating personalization of a VA, according to an embodiment of the disclosure.

Referring to FIG. 9, a secondary user B sends a message "Sentence 1" 902 to a primary user A. The primary user A responds with "Sentence 2" 904 to the secondary user B. If the primary user A does not respond for a threshold time 908, then the VA 106 identifies a need of intervening in the conversation. In this case, the VA 106 is personalized with the primary user A. The VA 106, on behalf of the primary user A, responds with "Sentence 3" 906 to the secondary user B. The primary user A may add the response "I agree with Sentence 3" 912. In this case, the VA 106 identifies positive feedback about the intervention from the primary user A 914, and, based on the positive feedback, the VA 106 updates learning data in a learning module 916 stored in the database 226.

Figure 10:
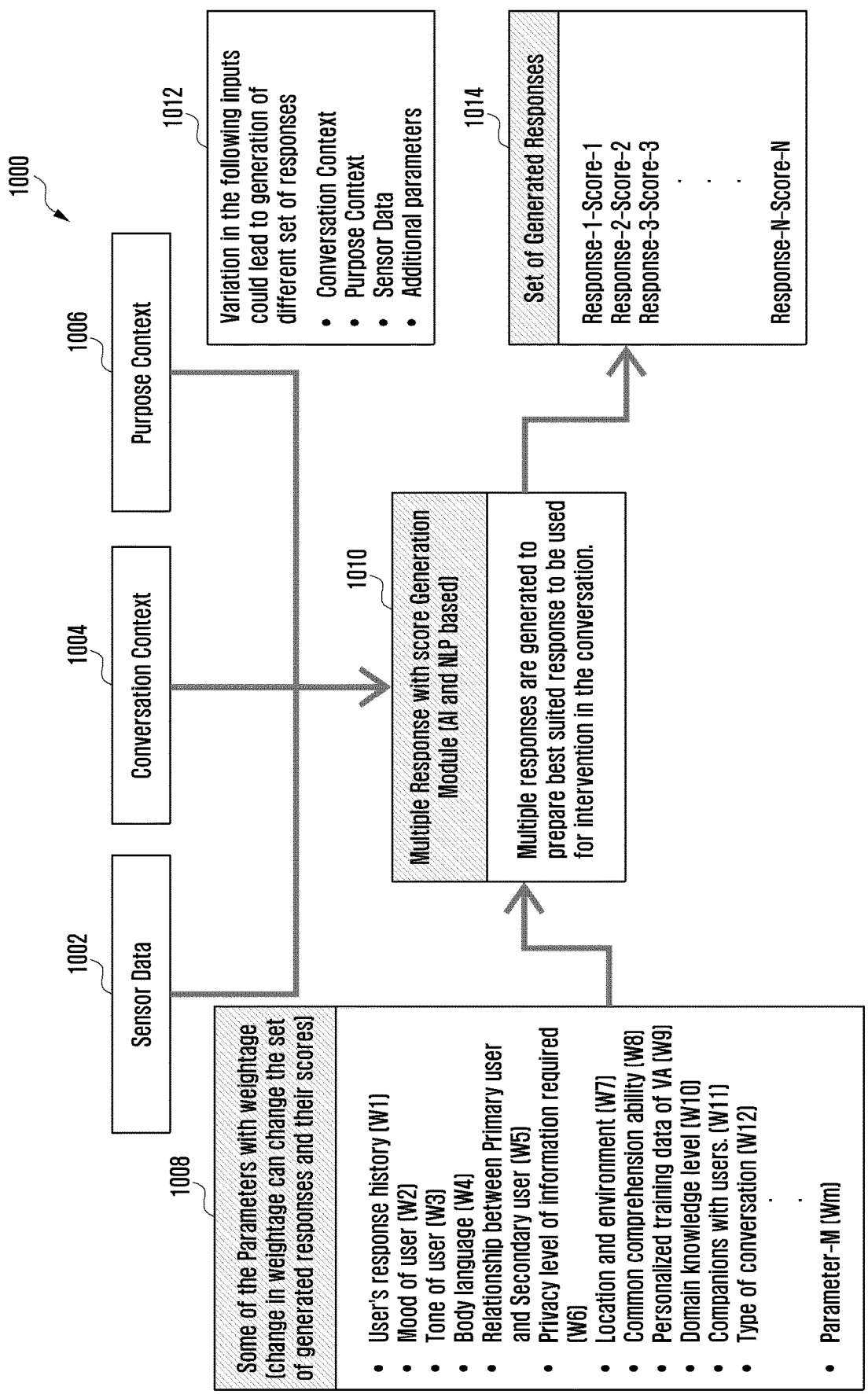
FIG. 10 is a diagram of generating multiple responses, according to an embodiment of the disclosure.

FIG. 10 is a diagram 1000 illustrating a generation of multiple responses, according to an embodiment of the disclosure.

Referring to FIG. 10, a response generation module 224 is configured to generate one or more responses on behalf of the primary user based on sensor data 1002, conversation context related data 1004, and purpose context related data 1006. A score generation module 228 is configured to generate a score for each generated response based on the pre-determined parameters. Some parameters with weightage (W) (where a change in weightage may change the set of generated responses and their scores) include a primary user's response history (W1), mood of the primary user (W2), tone of the primary user (W3), body language of the primary user (W4), relationship between the primary user and the secondary user (W5), privacy level of information required (W6), location and environment (W7), common comprehension ability (W8), personalized training data of the VA 106 (W9), domain knowledge level (W10), companions with the primary user and the secondary user (W1), a type of conversation (W12), and a number of other parameters-M (Wm) 1008. The sensor data 1002, the conversation context related data 1004, the purpose context related data 1006, and the parameters with weightages 1008 are transmitted to a multiple response with a score generation module (AI and NLP based) 1010. In this case, multiple responses are generated to prepare best suited response to be used for intervention in the conversation. The multiple response with a score generation module 1010 uses an adaptive learning AI based multi-parameter-model. The multiple response with a score generation module 1010 uses an RNN language model to generate personalized responses for a given input message or sentence along with conversation context related data and other information. The multiple response with a score generation module 1010 considers the perspective of both the primary user and the secondary user for generation of responses. The multiple response with a score generation module 1010 generates a set of responses. For example, the set of generated responses 1014 are:

Response-1-Score-1
Response-2-Score-2
Response-3-Score-3
.
.
.
Response-N-Score-N With continuous real-time training and feedback by the primary user, more personalized and efficient responses are generated by the VA 106. Variation inputs may lead to generation of a different set of responses 1012. The inputs may include the sensor data 1002, the conversation context related data 1004, the purpose context related data 1006, and the parameters with weightages 1008.

Figure 11:
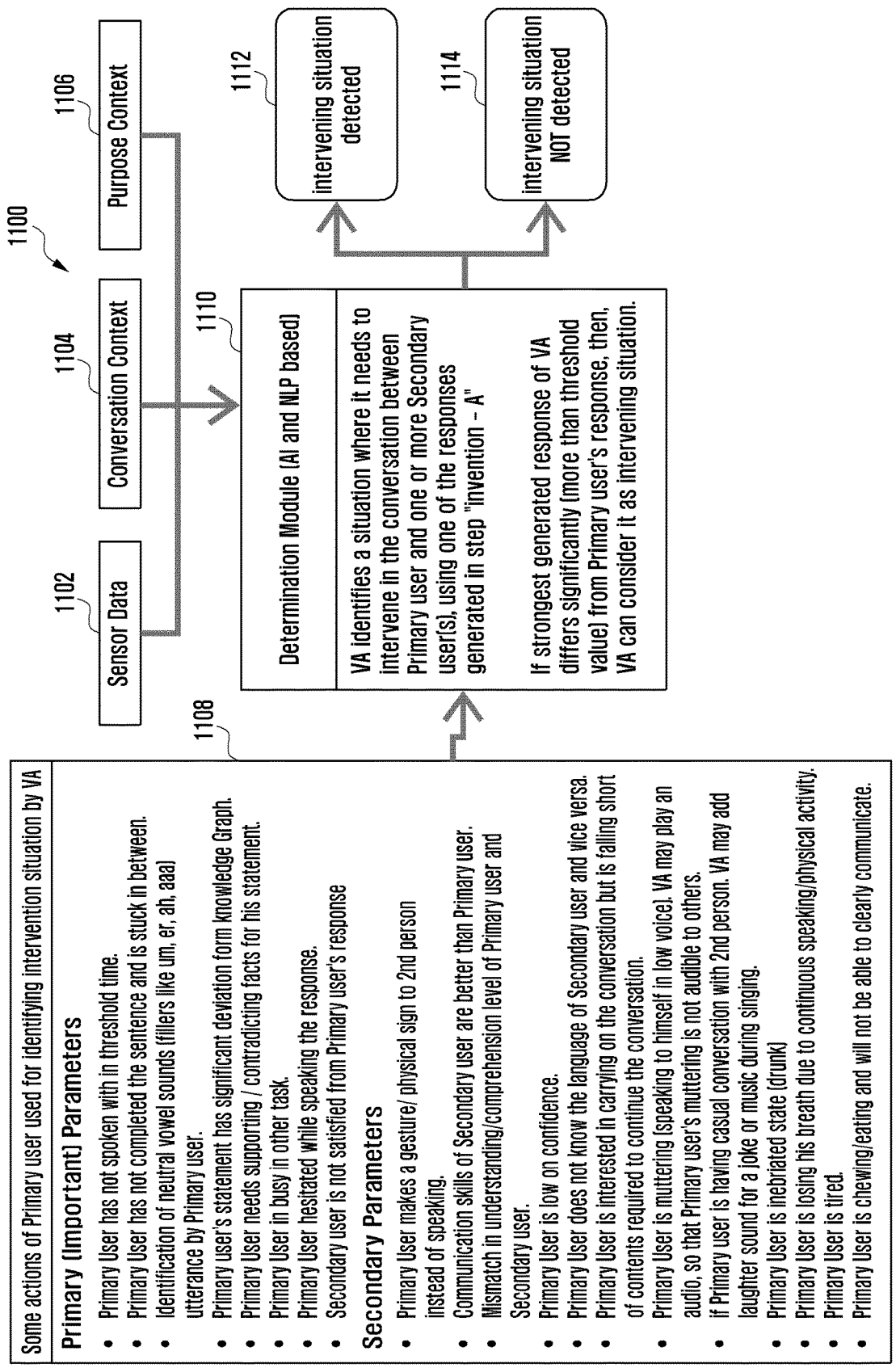
FIG. 11 is a diagram of determining an intervening situation in a conversation, according to an embodiment of the disclosure.

FIG. 11 is a diagram 1100 illustrating a determination of an intervening situation in a conversation, according to an embodiment of the disclosure.

Referring to FIG. 11, a determining module (e.g., the determining module 220 in FIG. 2) is configured to analyze at least one action of the primary user in the generated response, on the purpose context data 1106, and determine an intervening situation in the conversation. The determining module 220 is configured to analyze at least one action of the primary user in the generated response on the sensor data 1102, and conversation context related data 1104. Some actions of the primary user for determining the intervening situation 1108 by the VA 106 includes primary parameters and secondary parameters. The primary parameters include, but are not limited to, the primary user has not spoken within threshold time, the primary user has not completed the sentence and is stuck in between, identification of neutral vowel sounds (fillers like "um," "er," "ah," "aaa" etc.) utterance by the primary user, the primary user's statement has a significant deviation from a knowledge graph, the primary user needs supporting/contradicting facts for his statement, the primary user is busy in another task, the primary user hesitated while speaking the response, and the secondary user is not satisfied from the primary user's response. The secondary parameters include, but are not limited to, the primary user makes a gesture/physical sign to the secondary user instead of speaking, communication skills of the secondary user are better than the primary user, there is a mismatch in understanding/comprehension level of the primary user and the secondary user, the primary user is low in confidence, the primary user does not know the language of the secondary user and vice versa, the primary user is interested in carrying on the conversation but is falling short of contents required to continue the conversation, the primary user is muttering (speaking to himself in a low voice), where the VA 106 may play an audio, so that the primary user's muttering is not audible to the secondary user, if the primary user is having a casual conversation with the secondary user, the VA 106) may add laughter sound for a joke or music during singing, the primary user is in an inebriated state (e.g., is drunk), the primary user is losing his breath due to continuous speaking/physical activity, the primary user is tired, and the primary user is chewing/eating and not able to clearly communicate.

The sensor data 1102, the conversation context related data 1104, the purpose context related data 1106, and the analyzed actions 1108 are then transmitted to the determining module 220, which is an AI and NLP based module. The VA 106 identifies a situation 1110 by suing the determining module 220, where the VA 106 needs to intervene in the conversation between the primary user and one or more secondary user(s), using one of the responses generated by the response generation module 208 of the electronic device 102. If a strongest generated response of the VA 106 differs significantly (more than a threshold value) from the primary user's response, then, the VA 106 may consider it as an intervening situation. The determining module 220 uses an adaptive learned AI based multi-parameter-model to analyze the primary user's action to determine the existence of an intervening situation in the live conversation.

If the intervening situation is detected 1112 by the determining module 220, the VA 106 may interfere in the conversation. However, if the intervening situation is not detected 1114, the VA 106 should not interfere in the situation.

Figure 12:
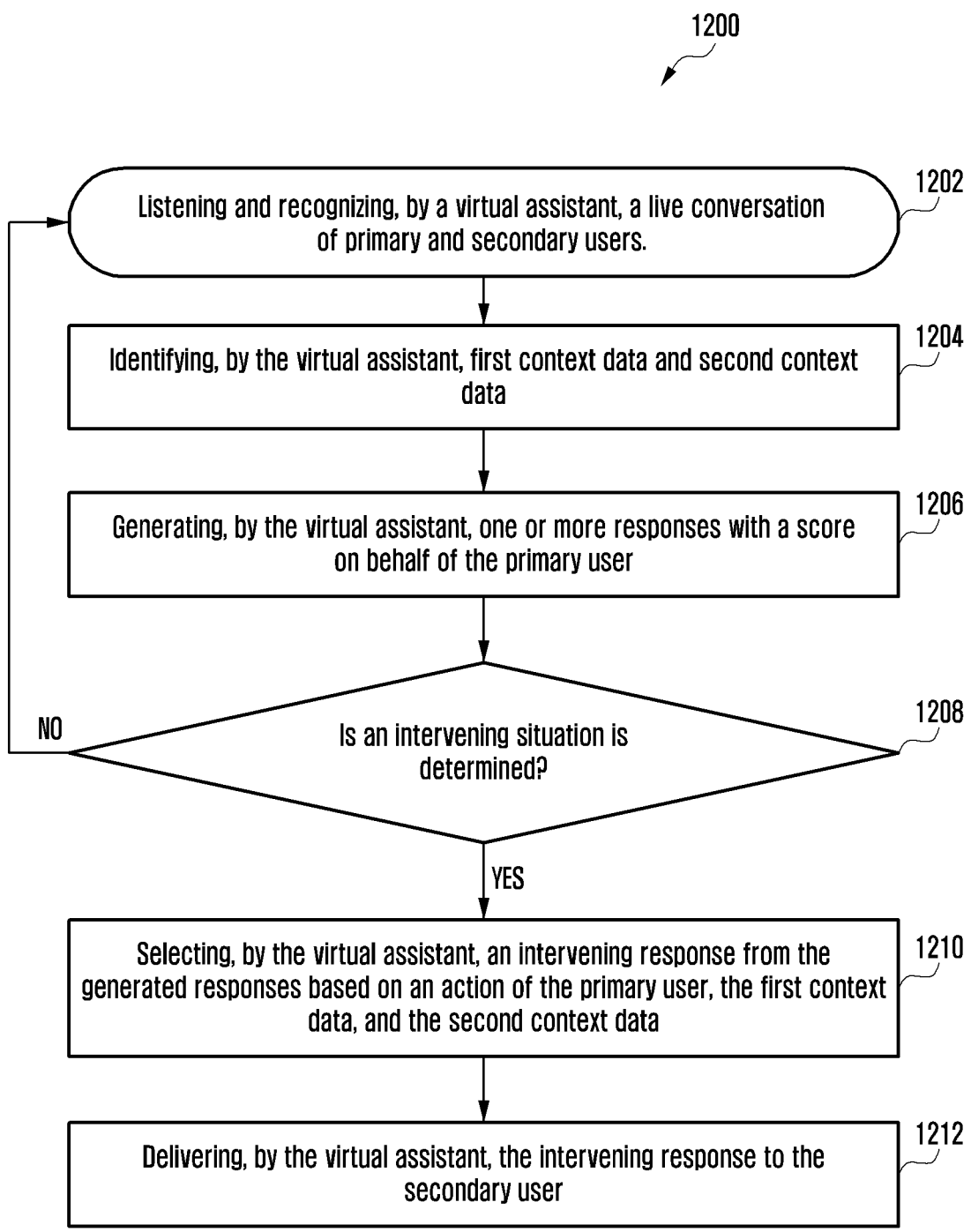
FIG. 12 is a flowchart of a method of delivering an intervening response, according to an embodiment of the disclosure.

FIG. 12 is a flow diagram 1200 of a method for delivering an intervening response, according to an embodiment of the disclosure.

Referring to FIG. 12, the flow diagram 1200 starts at step 1202, listening and recognizing, by the VA 106, a live conversation of a primary user and a secondary user. A VA 106 is configured to listen and recognize a live conversation of the primary user and the secondary user. At step 1204, identifying, by the VA 106, first context data and second context data. In an embodiment, the VA 106 is configured to first context data and second context data for the primary user and the secondary user based on the recognized conversation. At step 1206, generating, by the VA 106, one or more responses with a score on behalf of the primary user. In an embodiment, the VA 106 is configured to generate one or more responses with a score on behalf of the primary user. At step 1208, checking whether an intervening situation is determined. In an embodiment, the VA 106 is configured to check whether the intervening situation is determined or not. If the intervening situation is not determined, the VA 106 goes to and repeats the steps from step 1202. If the intervening situation is detected, selecting, by the VA 106, an intervening response from the generated responses based on an action of the primary user, the first context data, and the second context data, as shown at step 1210. In an embodiment, the VA 106 is configured to select an intervening response from the generated responses based on an action of the primary user, the first context data, and the second context data. At step 1212, delivering, by the VA 106, the intervening response to the secondary user. In an embodiment, the VA 106 is configured to deliver the intervening response to the secondary user.

Figure 13:
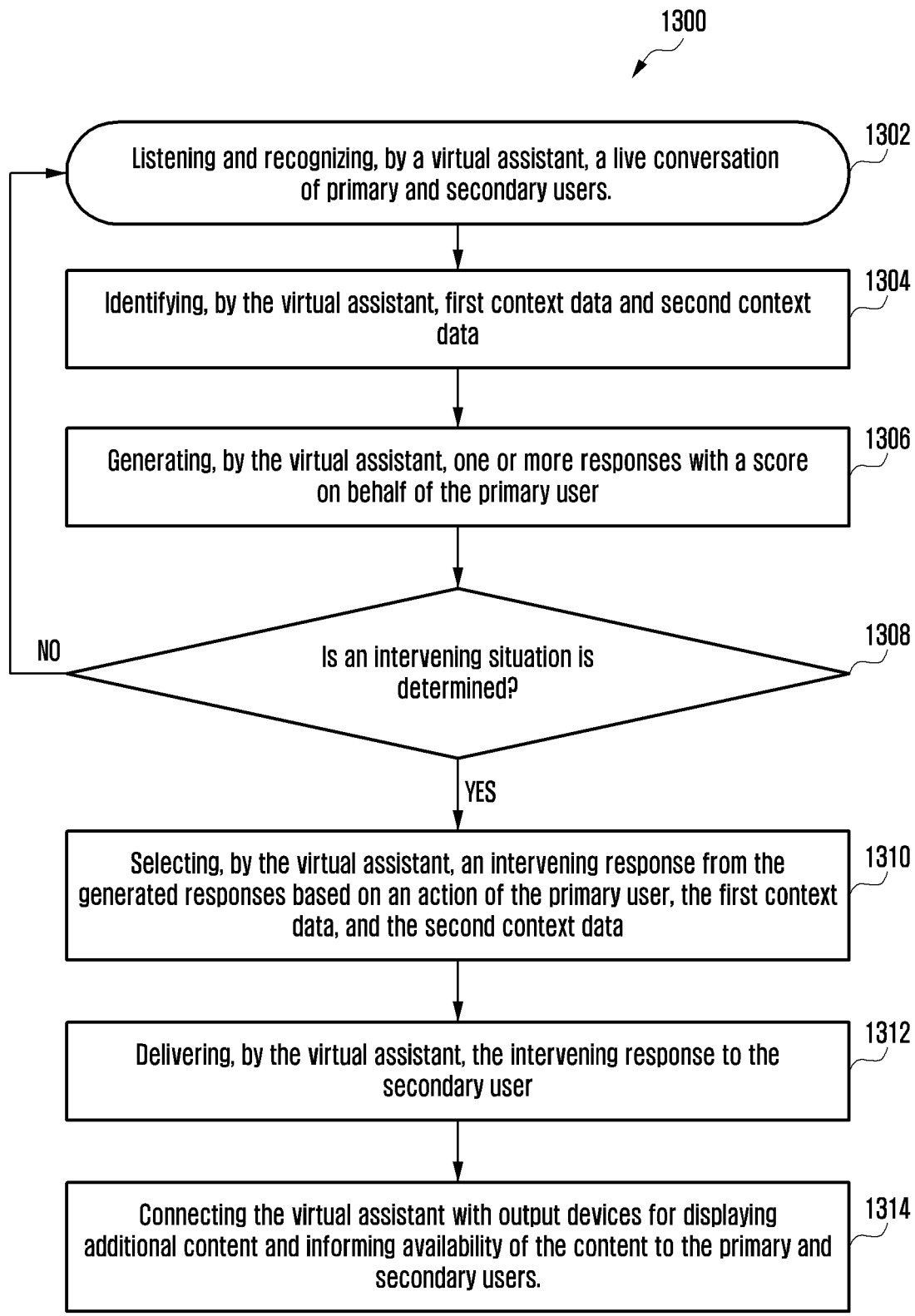
FIG. 13 is a flowchart of a method of displaying additional content on output devices, according to an embodiment of the disclosure.

FIG. 13 is a flow diagram 1300 of a method for displaying additional content on output devices, according to an embodiment of the disclosure.

Referring to FIG. 13, the flow diagram 1300 starts at step 1302, listening and recognizing, by a VA 106, a live conversation of a primary user and a secondary user. In an embodiment, the VA 106 is configured to listen and recognize a live conversation of primary and secondary users. At step 1304, identifying, by the VA 106, first context data and second context data. In an embodiment, the VA 106 is configured to first context data and second context data for the primary user and the secondary user based on the recognized conversation. At step 1306, generating, by the VA 106, one or more responses with a score on behalf of the primary user. In an embodiment, the VA 106 is configured to generate one or more responses with a score on behalf of the primary user. At step 1308, checking whether an intervening situation is determined. The VA 106 is configured to check whether the intervening situation is determined or not. If the intervening situation is not determined, the VA 106 goes to and repeats the steps from step 1302. If the intervening situation is detected, selecting, by the VA 106, an intervening response from the generated responses based on an action of the primary user, the first context data, and the second context data, as shown at step 1310. In an embodiment, the VA 106 is configured to select an intervening response from the generated responses based on an action of the primary user, the first context data, and the second context data. At step 1312, delivering, by the VA 106, the intervening response to the secondary user. In an embodiment, the VA 106 is configured to deliver the intervening response to the secondary user. At step 1314, connecting the VA 106 with output devices for displaying additional content and informing availability of the content to the primary user and the secondary user. In an embodiment, the VA 106 is configured to connect with output devices, such as a display screen, to display additional content and inform availability of the content to the primary and the secondary users.

Figure 14:
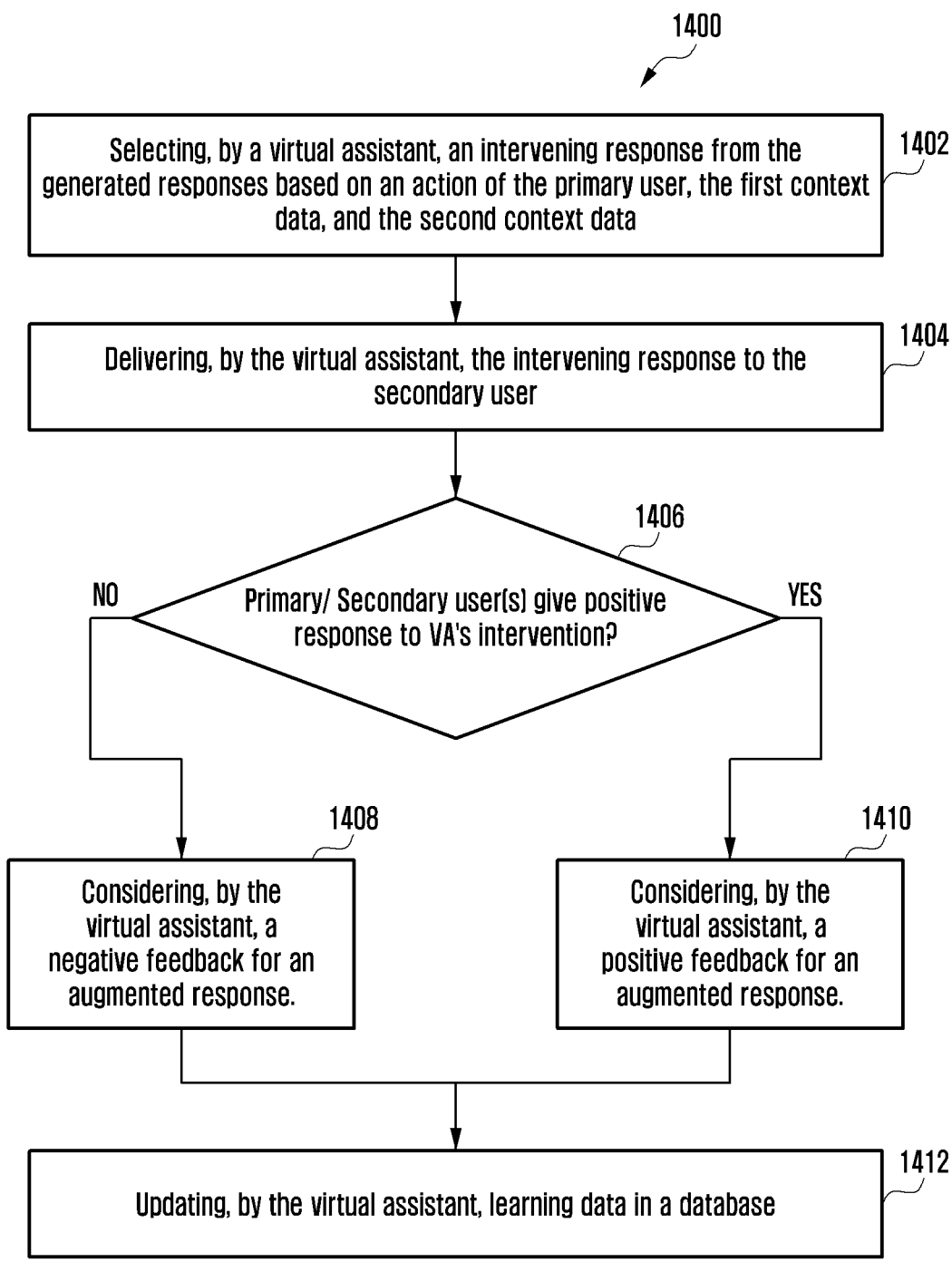
FIG. 14 is a flowchart of a method of updating learning data, according to an embodiment of the disclosure.

FIG. 14 is a flow diagram 1400 of a method for updating learning data, according to an embodiment of the disclosure.

Referring to FIG. 14, the flow diagram 1400 starts at step 1402, selecting, by the VA 106, an intervening response from the generated responses based on an action of the primary user, the first context data, and the second context data. The VA 106 is configured to select an intervening response from the generated responses based on an action of the primary user, the first context data, and the second context data. At step 1404, delivering, by the VA 106, the intervening response to the secondary user. The VA 106 is configured to deliver the intervening response to the secondary user. At step 1406, checking whether primary/secondary user(s) give a positive response to the VA's 106 intervention. The VA 106 is configured to check whether the primary/secondary user(s) give a positive response to the intervention. If the primary/secondary user(s) does/do not give the positive response, considering, by the VA 106, a negative feedback for an augmented response 1408. In an embodiment, the VA 106 is configured to consider the feedback as a negative feedback. If the primary/secondary user(s) give the positive response, considering, by the VA 106, a positive feedback for an augmented response 1410. The VA 106 is configured to consider the feedback as a positive feedback. At step 1412, updating, by the VA 106, learning data in the database 226. In an embodiment, the VA 106 is configured to update learning data in the database 226 based on the positive/negative feedback.

Figure 15:
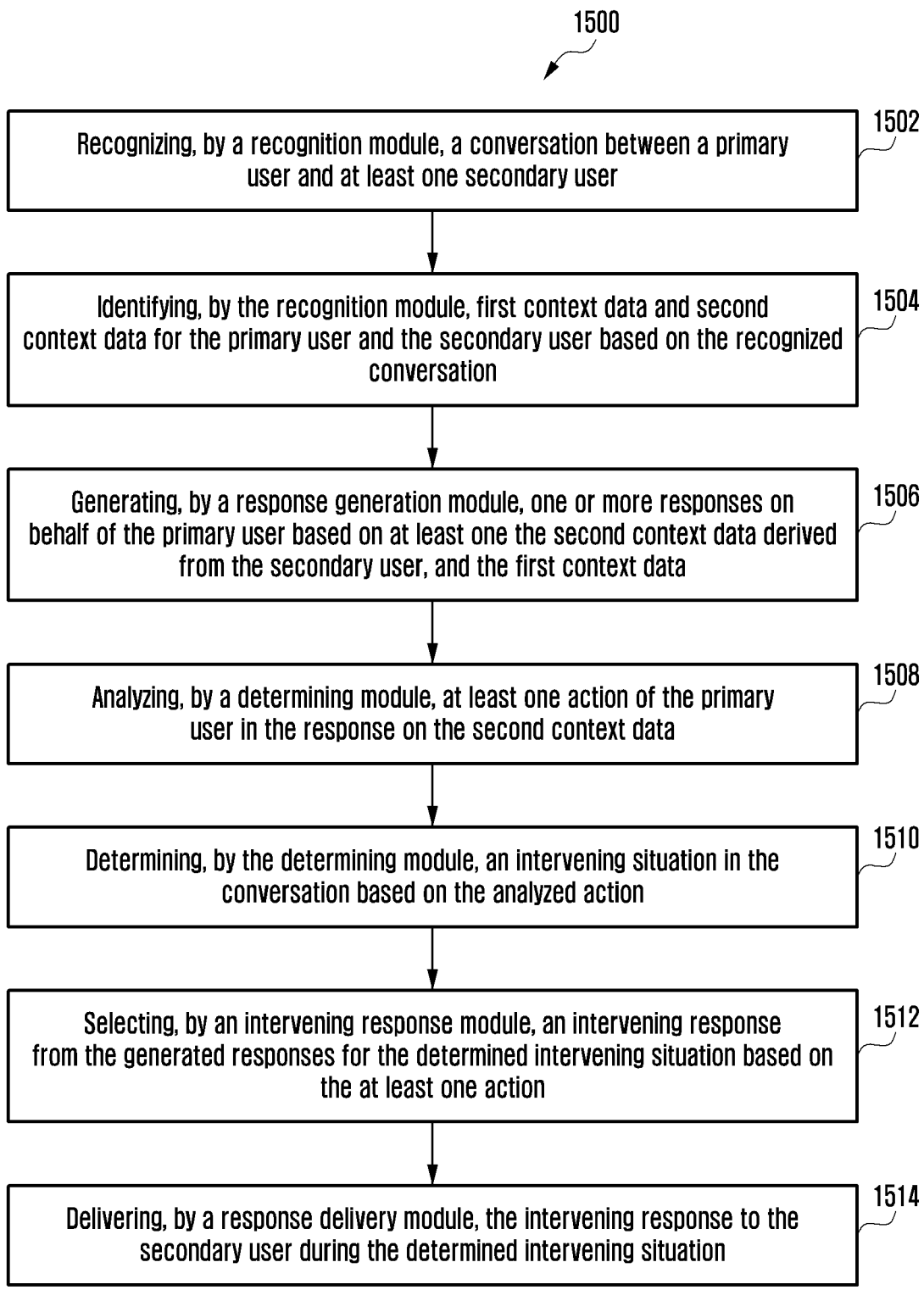
FIG. 15 is a flowchart of a method of providing assistance in a live conversation, according to an embodiment of the disclosure.

FIG. 15 is a flowchart 1500 of a method for providing assistance in a live conversation, according to an embodiment of the disclosure.

Referring to FIG. 15, the flowchart 1500 starts at step 1502, recognizing, by the recognition module 206, a conversation between a primary user and at least one secondary user. The recognition module 206 is configured to recognize a conversation between a primary user and at least one secondary user. At step 1504, identifying, by the recognition module 206, first context data and second context data for the primary user and the secondary user based on the recognized conversation. In an embodiment, the recognition module 206 is configured to identify first context data and second context data for the primary user and the secondary user based on the recognized conversation. At step 1506, generating, by the response generation module 208, one or more responses on behalf of the primary user based on at least one the second context data derived from the secondary user, and the first context data. The response generation module 208 is configured to generate one or more responses on behalf of the primary user based on at least one the second context data derived from the secondary user, and the first context data. At step 1508, analyzing, by a determining module 220, at least one action of the primary user in the response on the second context data. The determining module 220 is configured to analyze at least one action of the primary user in the response on the second context data. At step 1510, determining, by the determining module 220, an intervening situation in the conversation based on the analyzed action. The determining module 220 is configured to determine an intervening situation in the conversation based on the analyzed action. At step 1512, selecting, by the intervening response module 222, an intervening response from the generated responses for the determined intervening situation based on the at least one action. The intervening response module 222 is configured to select an intervening response from the generated responses for the determined intervening situation based on the at least one action. At step 1514, delivering, by the response delivery module 224, the intervening response to the secondary user during the determined intervening situation. The response delivery module 224 is configured to deliver the intervening response to the secondary user during the determined intervening situation.

Figure 16:
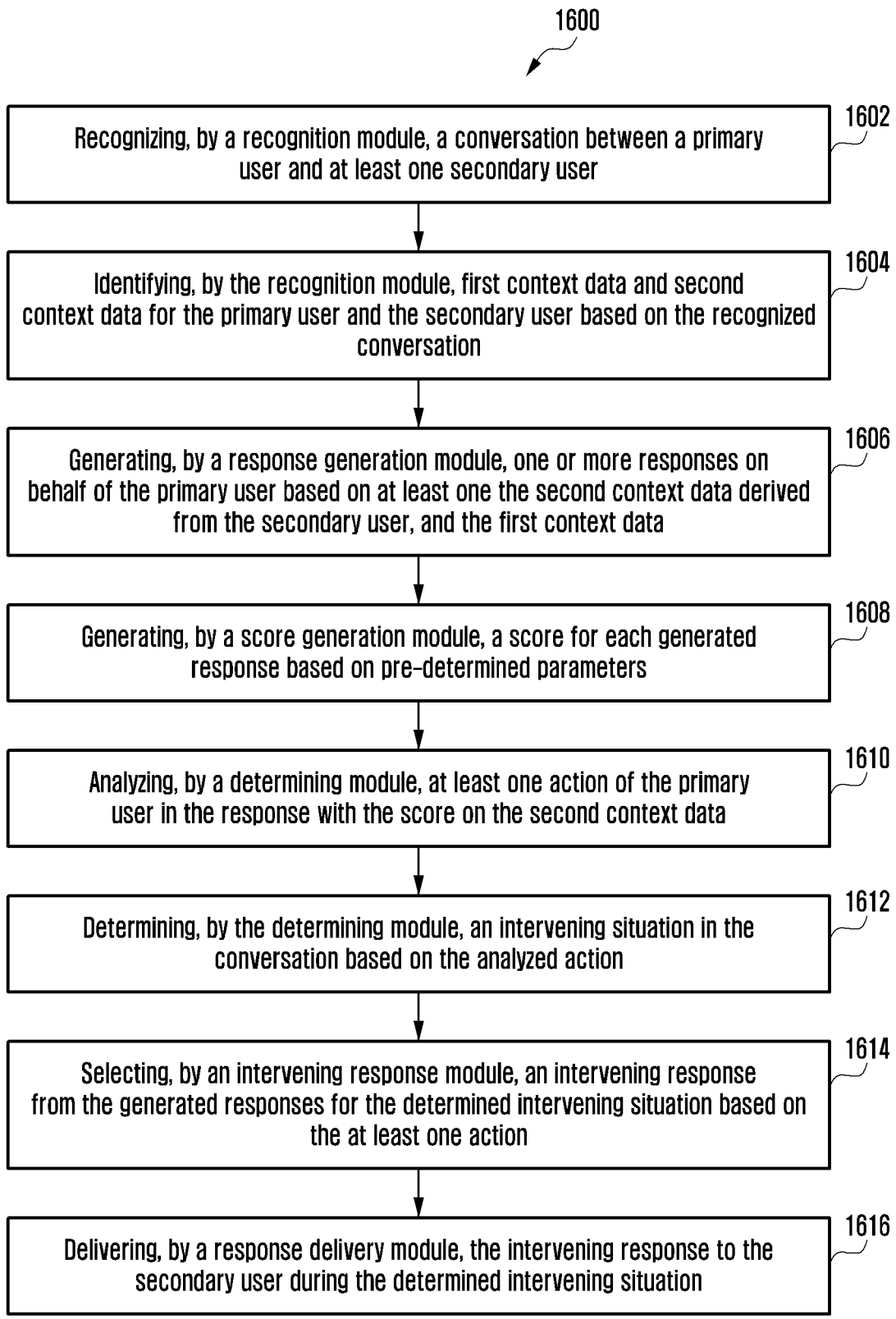
FIG. 16 is a flowchart of a method of providing assistance in a live conversation using scores, according to an embodiment of the disclosure.

FIG. 16 is a flowchart 1600 of a method for providing assistance in a live conversation using scores, according to an embodiment of the disclosure.

Referring to FIG. 16, the flowchart 1600 starts at step 1602, recognizing, by the recognition module 206, a conversation between a primary user and at least one secondary user. The recognition module 206 is configured to recognize the conversation between a primary user and at least one secondary user. At step 1604, identifying, by the recognition module 206, first context data and second context data for the primary user and the secondary user based on the recognized conversation. In an embodiment, the recognition module 206 is configured to identify first context data and second context data for the primary user and the secondary user based on the recognized conversation. At a step 1606, generating, by the response generation module 208, one or more responses on behalf of the primary user based on at least one the second context data derived from the secondary user, and the first context data. The response generation module 208 is configured to generate one or more responses on behalf of the primary user based on at least one the second context data derived from the secondary user, and the first context data. At step 1608, generating, by the score generation module 228, a score for each generated response based on pre-determined parameters. In an embodiment, the score generation module 228 is configured to generate a score for each generated response based on pre-determined parameters. At step 1610, analyzing, by the determining module 220, at least one action of the primary user in the response with the score on the second context data. The determining module 220 is configured to analyze at least one action of the primary user in the response with the score on the second context data. At step 1612, determining, by the determining module 220, an intervening situation in the conversation based on the analyzed action. The determining module 220 is configured to determine an intervening situation in the conversation based on the analyzed action. At step 1614, selecting, by an intervening response module 222, an intervening response from the generated responses for the determined intervening situation based on the at least one action. In an embodiment, the intervening response module 222 is configured to select an intervening response from the generated responses for the determined intervening situation based on the at least one action. At step 1616, delivering, by the response delivery module 224, the intervening response to the secondary user during the determined intervening situation. The response delivery module 224 is configured to deliver the intervening response to the secondary user during the determined intervening situation.

Figure 17:
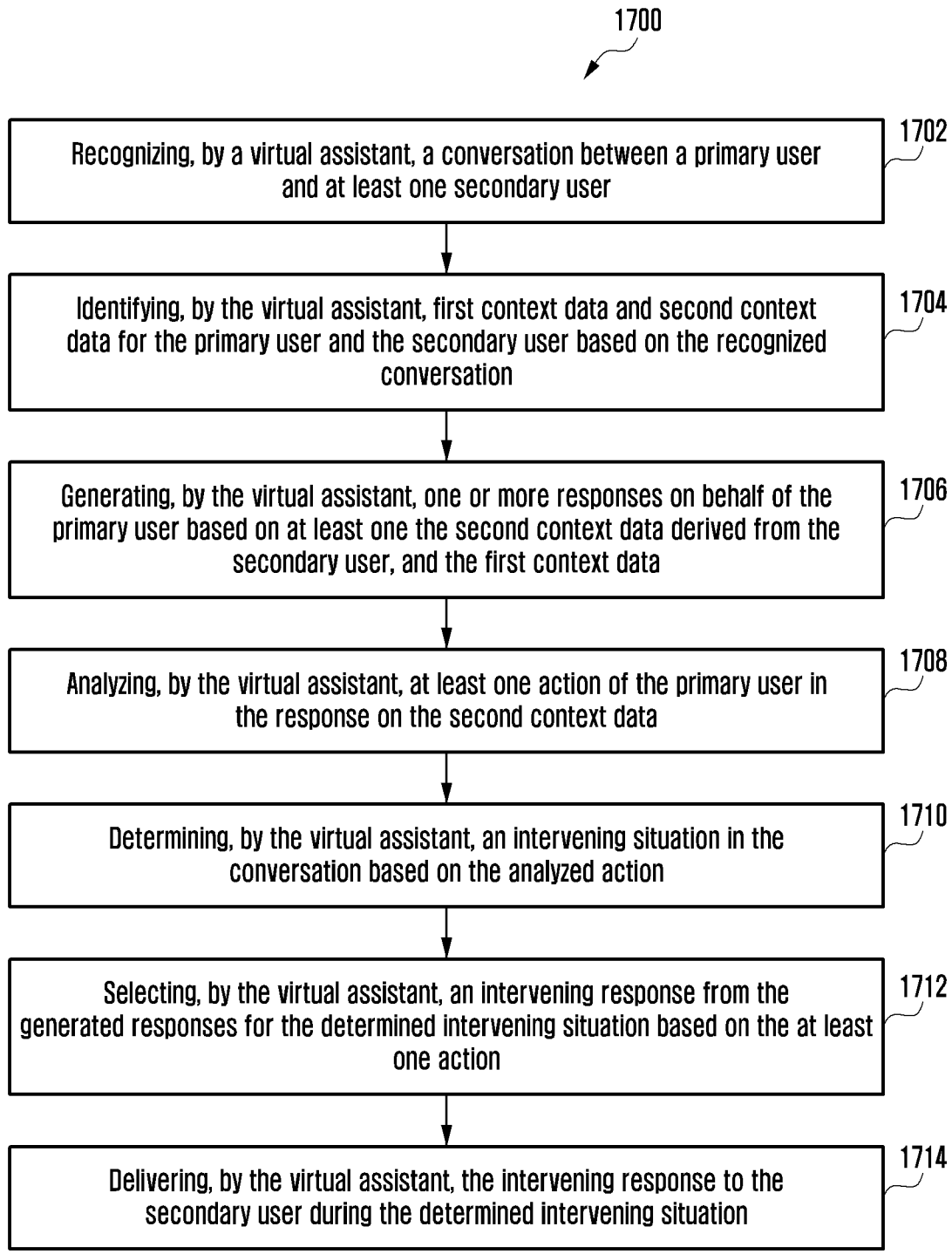
FIG. 17 is a flowchart of a method of providing assistance in a live conversation by a virtual assistance, according to an embodiment of the disclosure.

FIG. 17 is a flowchart 1700 of a method for providing assistance in a live conversation by a virtual assistance, according to an embodiment of the disclosure.

Referring to FIG. 17, the flowchart 1700 starts at step 1702, recognizing, by the VA 106, a conversation between a primary user and at least one secondary user. The VA 106 is configured to recognize a conversation between a primary user and at least one secondary user. At step 1704, identifying, by the VA 106, first context data and second context data for the primary user and the secondary user based on the recognized conversation. The VA 106 is configured to identify first context data and second context data for the primary user and the secondary user based on the recognized conversation. At step 1706, generating, by the VA 106, one or more responses on behalf of the primary user based on at least one the second context data derived from the secondary user, and the first context data. The VA 106 is configured to generate one or more responses on behalf of the primary user based on at least one the second context data derived from the secondary user, and the first context data. At step 1708, analyzing, by the VA 106, at least one action of the primary user in the response on the second context data. In an embodiment, the VA 106 is configured to analyze at least one action of the primary user in the response on the second context data. At step 1710, determining, by the VA 106, an intervening situation in the conversation based on the analyzed action. The VA 106 is configured to determine an intervening situation in the conversation based on the analyzed action. At step 1712, selecting, by the VA 106, an intervening response from the generated responses for the determined intervening situation based on the at least one action. The VA 106 is configured to select an intervening response from the generated responses for the determined intervening situation based on the at least one action. At step 1714, delivering, by the VA 106, the intervening response to the secondary user during the determined intervening situation. The VA 106 is configured to deliver the intervening response to the secondary user during the determined intervening situation.

Figure 18:
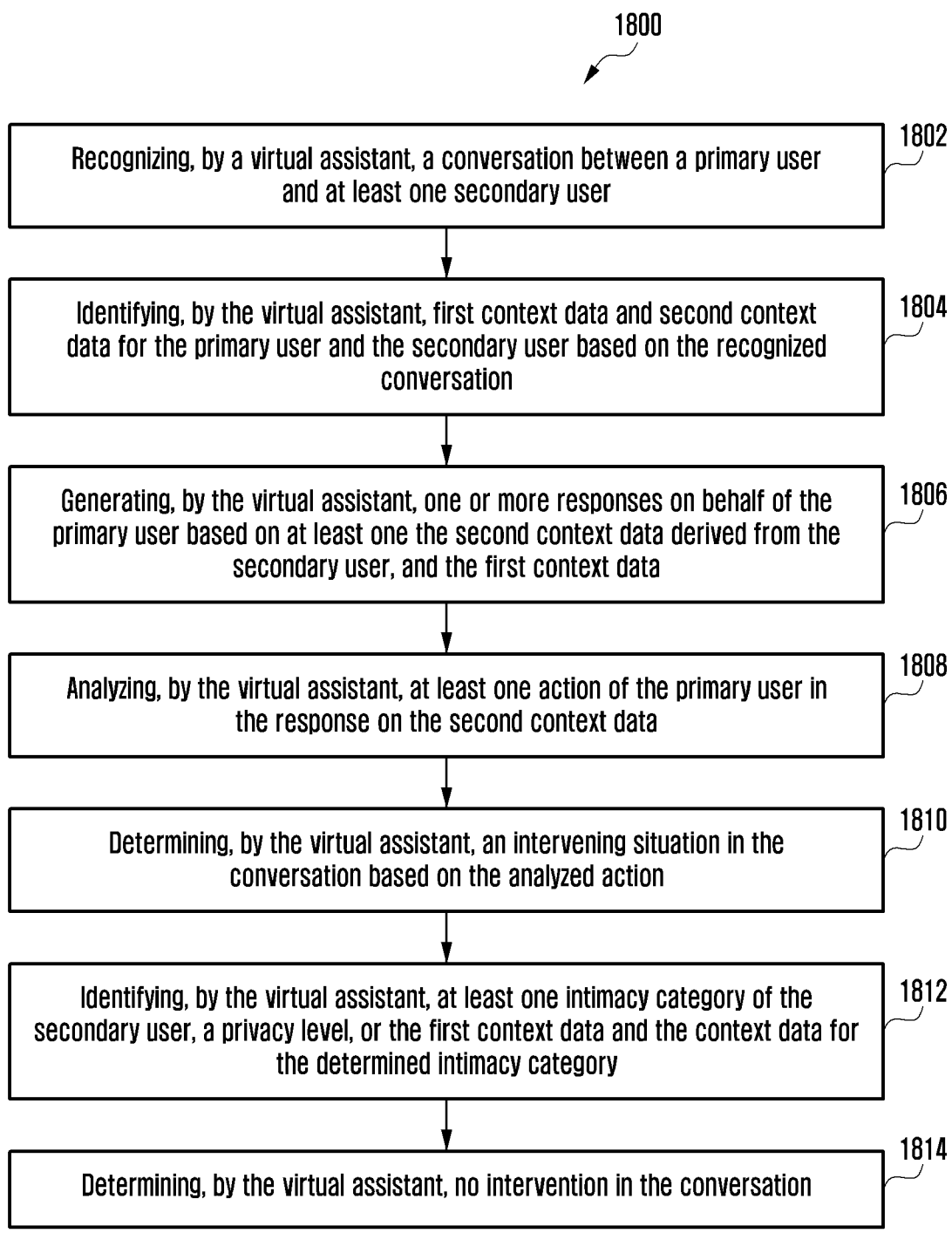
FIG. 18 is a flowchart of a method of not intervening by a VA, according to an embodiment of the disclosure.

FIG. 18 is a flowchart 1800 of a method for not intervening by a VA, according to an embodiment of the disclosure.

Referring to FIG. 18, the flowchart 1800 starts at step 1802, recognizing, by the VA 106, a conversation between a primary user and at least one secondary user. The VA 106 is configured to recognize a conversation between a primary user and at least one secondary user. At step 1804, identifying, by the VA 106, first context data and second context data for the primary user and the secondary user based on the recognized conversation. The VA 106 is configured to identify first context data and second context data for the primary user and the secondary user based on the recognized conversation. At step 1806, generating, by the VA 106, one or more responses on behalf of the primary user based on at least one the second context data derived from the secondary user, and the first context data. The VA 106 is configured to generate one or more responses on behalf of the primary user based on at least one the second context data derived from the secondary user, and the first context data. At step 1808, analyzing, by the VA 106, at least one action of the primary user in the response on the second context data. The VA 106 is configured to analyze at least one action of the primary user in the response on the second context data. At step 1810, determining, by the VA 106, an intervening situation in the conversation based on the analyzed action. The VA 106 is configured to determine an intervening situation in the conversation based on the analyzed action. At step 1812, identifying, by the VA 106, at least one intimacy category of the secondary user, a privacy level, or the first context data and the context data for the determined intimacy category. The VA 106 is configured to identify at least one intimacy category of the secondary user, a privacy level, or the first context data and the context data for the determined intimacy category. At step 1814, determining, by the VA 106, no intervention in the conversation. The VA 106 is configured to determine no intervention in the conversation. Table 2 below illustrates different parameters to judge the intimacy category with examples.

TABLE 2

| Parameters for AI Model to judge intimacy category | Example/comment |
|---|---|
| Voice and face recognition to identify a secondary user | Correct identification of an individual is required to identify intimacy level. |
| Available social media/public data of the primary user and the secondary user. | Friend list in Facebook, connections on LinkedIn, etc. |
| Personalized training and reviewing of the VA 106 interventions by the primary user. | User explicitly telling the VA 106 about the user's relationship with the secondary user, while reviewing conversation. |
| Using NLP on conversation data of the primary user to identify content and social relations. | The primary user calls someone as "Mom", "Boss", "My dear friend", "My love". |
| The primary user's previous conversation with secondary user. | Relationships and private information shared between the primary user and the secondary user may be fetched from previous conversations. |
| Category of private information used in conversation with the secondary user. | If the primary user is disclosing private personal data, which is, as of now, known only to his close family members, then the secondary user will be considered as an intimate family member by the AI model. |
| Content/topic of conversation. | A user usually discusses work related matters with office friends. |
| Amount and frequency of conversation with a secondary user. | A user spends more time in conversation with intimate people. |
| Body Language, Tone, Style, Language, Dialect, Slangs used in conversation. | Usually a person uses only a couple of typical different conversational styles with different people in different situations. E.g.: Funny with friends, casual with family members, formal with colleagues. The VA 106 may identify these typical styles of primary user. The VA 106 may ask the primary user about which intimacy level a particular style is used. |

The intimacy category between the primary user and the secondary user determines the characteristics of conversation between them. The primary user's style and conversation content changes based on the intimacy category. The intimate conversations contain private information, interests, dreams, goals, fears, inside jokes etc. Each intimacy level is associated with a secondary user and a set of private information that may be used in conversation. The VA 106 may adopt this behavior of people. The VA 106 may use a different style and private information for a different intimacy category conversation. The VA 106 may use the adaptive learned AI based multi-parameter-model with the NLP technique, to determine an intimacy category with a secondary user and the private information that may be used in their conversation.

An intervening response of the VA 106 may be different for a different intimacy category. The VA 106 may also use the private data, which is mapped to the intimacy category. Table 3 below illustrates a list of parameters which determine the style, content and range of an intervening response.

TABLE 3

| | |
|---|---|
| Intimacy category | The VA 106 uses private information, which is mapped to an intimacy category of a conversation. For example:<br>1. VA's response will be different for different intimacy categories like family, friend, job, neighbors, gym etc.<br>2. VA's response may contain private information related to the intimacy category with a secondary user. No private information will be disclosed to strangers.<br>3. VA's response may be more frequent/elaborative for close intimate friends and less frequent/small for strangers.<br>4. If the primary user is in a conversation with an intimate secondary user and a stranger joins the conversation, then private information will not be shared in the conversation. |
| Personalized training | The VA 106 may identify a range and content of intervention more efficiently and precisely through continuous training and personalization of an AI model of the VA 106 by the primary user.<br>1. While reviewing past interventions, a user indicates like/dislike for some specific interventions.<br>2. The primary user tells the VA 106 that "If I have given a reply while talking to Mr. S1, S2, S2 and Ms. S4, don't interrupt."<br>3. The primary user gives a command to the VA 106, "An intervening response should not exceed 50 words". |

TABLE 3-continued

| | |
|---|---|
| Time available between responses | If a response of users is quick in a conversation, then the VA 106 will intervene with small and crisp sentences. |
| Average length of user response in conversation | If length of responses is long in a conversation, the VA 106 will intervene with long sentences. |
| Confidence score of response generated by VA. | High confidence score leads to frequent interruptions. |
| Frequency of participant's responses in ongoing conversation. | Number and length of interventions by the VA 106 will be proportional to frequency and length of participant's responses. |
| Intimacy category | The VA 106 will use private information, which is mapped to an intimacy category of a conversation.<br>1. VA's response will be different for different intimacy categories like family, friend, job, neighbors, gym etc.<br>2. VA's response may contain private information related to the intimacy category with the secondary user. No private information will be disclosed to strangers.<br>3. VA's response may be more frequent/elaborative for close intimate friends and less frequent/small for strangers.<br>4. If the primary user is in a conversation with an intimate secondary user and a stranger joins the conversation, then private information will not be shared in the conversation. |
| Personalized training | The VA 106 may identify a range and content of intervention more efficiently and precisely through continuous training and personalization of an AI model of the VA 106 by the primary user.<br>1. While reviewing past interventions, a user indicates like/dislike for some specific interventions.<br>2. Primary user tells the VA 106 that "If I have given reply while talking to Mr. S1, S2, S3 and Ms. S4, don't interrupt."<br>3. A primary user gives a command to the VA 106, "An intervening response should not exceed 50 words". |

FIGS. 19-35 illustrate different use-case scenarios depicting providing assistance in a live conversation, according to an embodiment of the disclosure.

Figure 19:
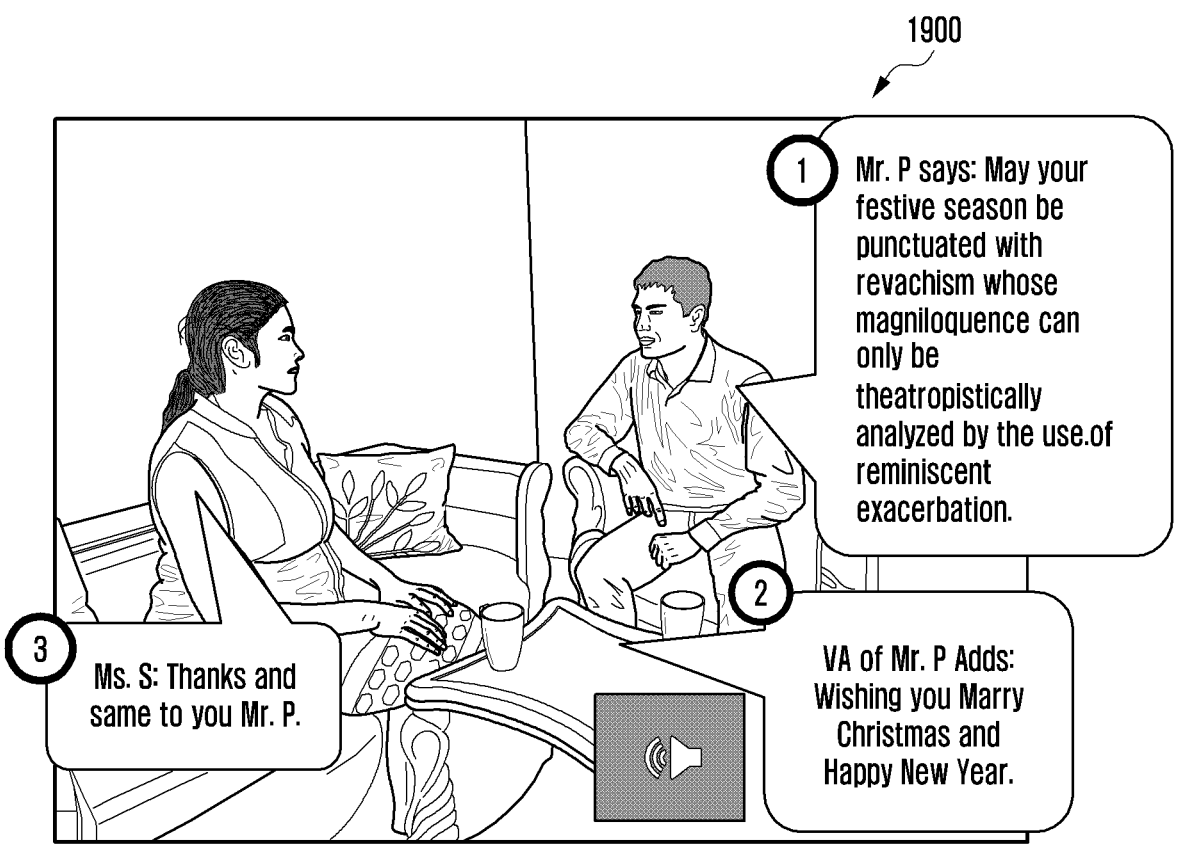
FIGS. 19-35 are illustrations of different use-case scenarios in which assistance is provided in a live conversation, according to embodiments of the disclosure.

FIG. 19 illustrates a use-case scenario 1900 depicting the VA 106 simplifying a response from a user.

Referring to FIG. 19, Mr. P is famous for using very difficult and obscure English words. Mr. P is speaking to the host in his style. In this case, the VA 106 of Mr. P is helping the host to understand what Mr. P said. Mr. P extends wishes to the host. But the host has not responded. Mr. P is expecting the host to extend wishes back to him. The VA 106 of Mr. P identifies that Mr. P is expecting wishes back from the host as a courtesy. The host has not responded within a threshold time, and a vocabulary understanding level of the host is less than a vocabulary level used by Mr. P. In this case, the VA 106 of Mr. P rephrases the wishes in a simple sentence and speaks the wishes in the conversation. For example, Mr. P says, "May your festive season be punctuated with revanchism whose magniloquence can only be theatropistically analyzed by the use of reminiscent exacerbation", at (1). The VA 106 of Mr. P adds "Wishing you Merry Christmas and Happy New Year", at (2). Then, Ms. S wishes him back as "Thanks and same to you Mr. P" at (3).

Figure 20:
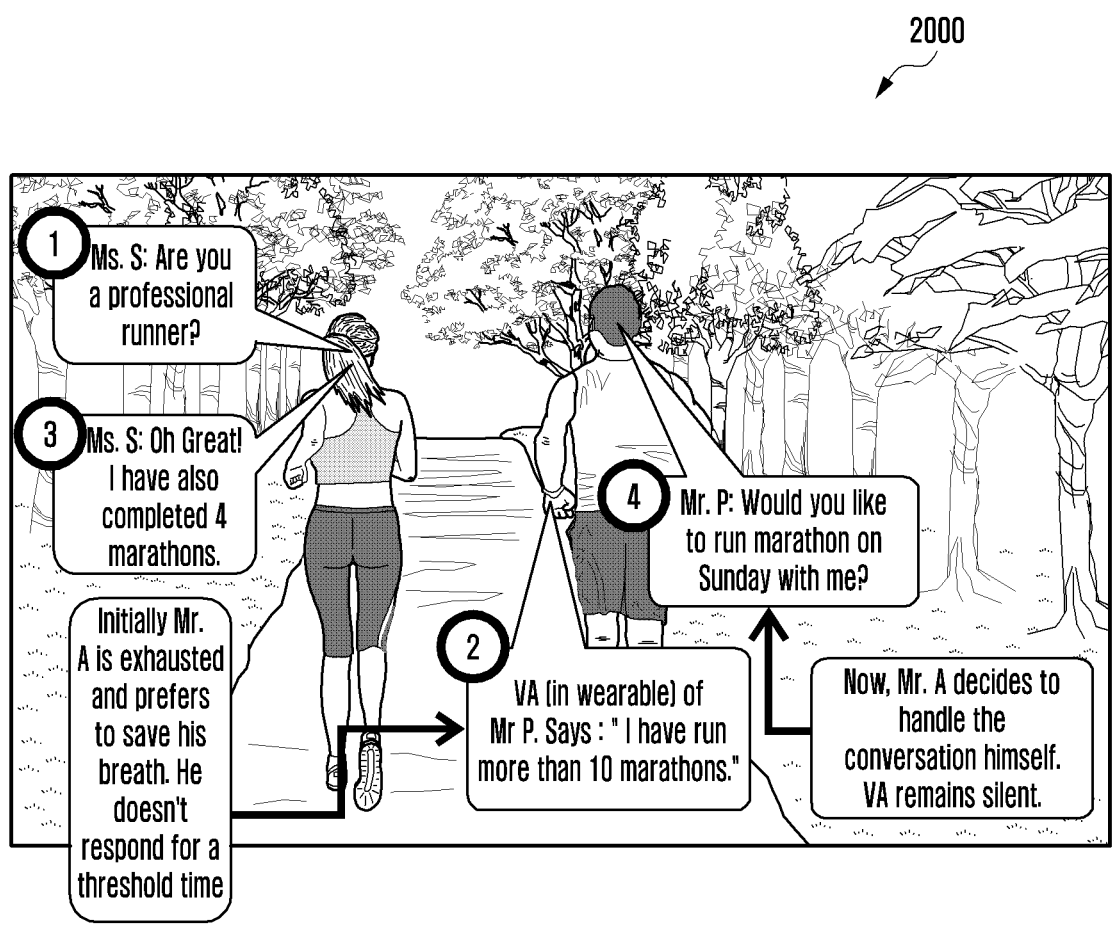

FIG. 20 illustrates a use-case scenario 2000 depicting the VA 106 talking on behalf of a user.

Referring to FIG. 20, Mr. P is running. Ms. S asks him something. The VA 106 of Mr. P identifies that Mr. P is out of breath, and he cannot respond immediately. Mr. P has not responded within a threshold time. The public domain information of Mr. P is required to handle the conversation with Ms. S. The VA 106 responds to Ms. S on behalf of Mr. P. Later, Ms. S shares some information. Mr. P gains interest in the conversation, so he continues the conversation by speaking within a threshold time. The VA 106 of Mr. P identifies that a statement of Mr. P is strong enough and the VA 106 need not intervene. For example, Ms. S to Mr. P "Are you a professional runner", at (1). Initially, Mr. P is exhausted and prefers to save his breath. He does not respond for a threshold time. The VA 106 of Mr. P says, "I have run more than 10 marathons", at (2). Ms. S replies "Oh, Great! I have also completed 4 marathons", at (3). Now, Mr. P decides to handle the conversation himself, and in this situation, the VA 106 remains silent. Mr. P says to Ms. S, "Would you like to run a marathon on Sunday with me", at (4).

Figure 21:
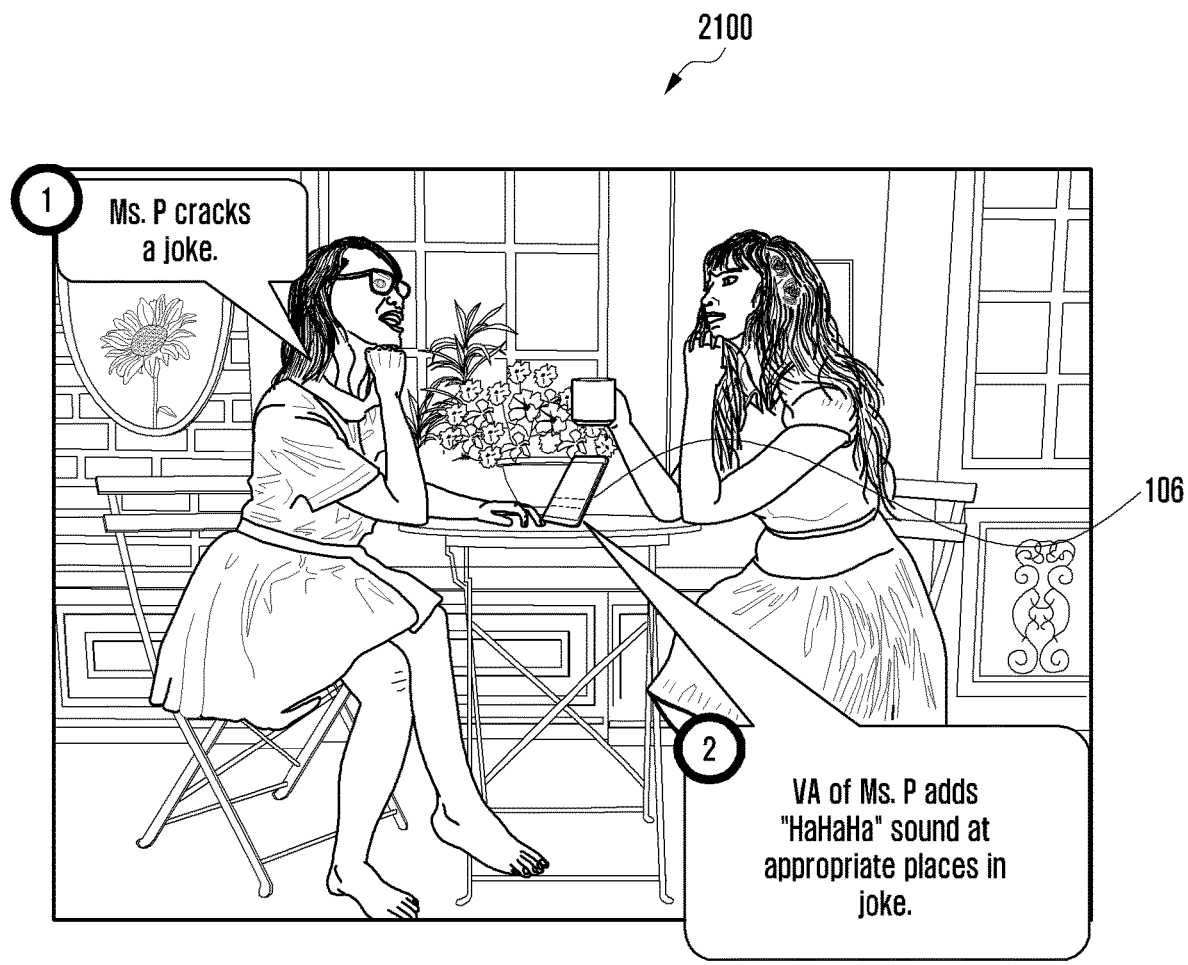

FIG. 21 illustrates a use-case scenario 2100 depicting the VA 106 adding audio content in a conversation.

Referring to FIG. 21, the VA 106 may create appropriate ambiance for a conversation as per the conversation context. Similar to sound augmentation in a movie/cinema, the VA 106 may add an interesting and supporting sound in a real life conversation to make them more entertaining and effective. For example, Ms. P is talking to her friend. Ms. P cracks a joke, at block (1). Everybody laughs. The VA 106 of Ms. P identifies that Ms. P cracked a joke. The VA 106 adds a laughter sound in the conversation, for example, a "HaHaHa" sound, at (2).

Figure 22:
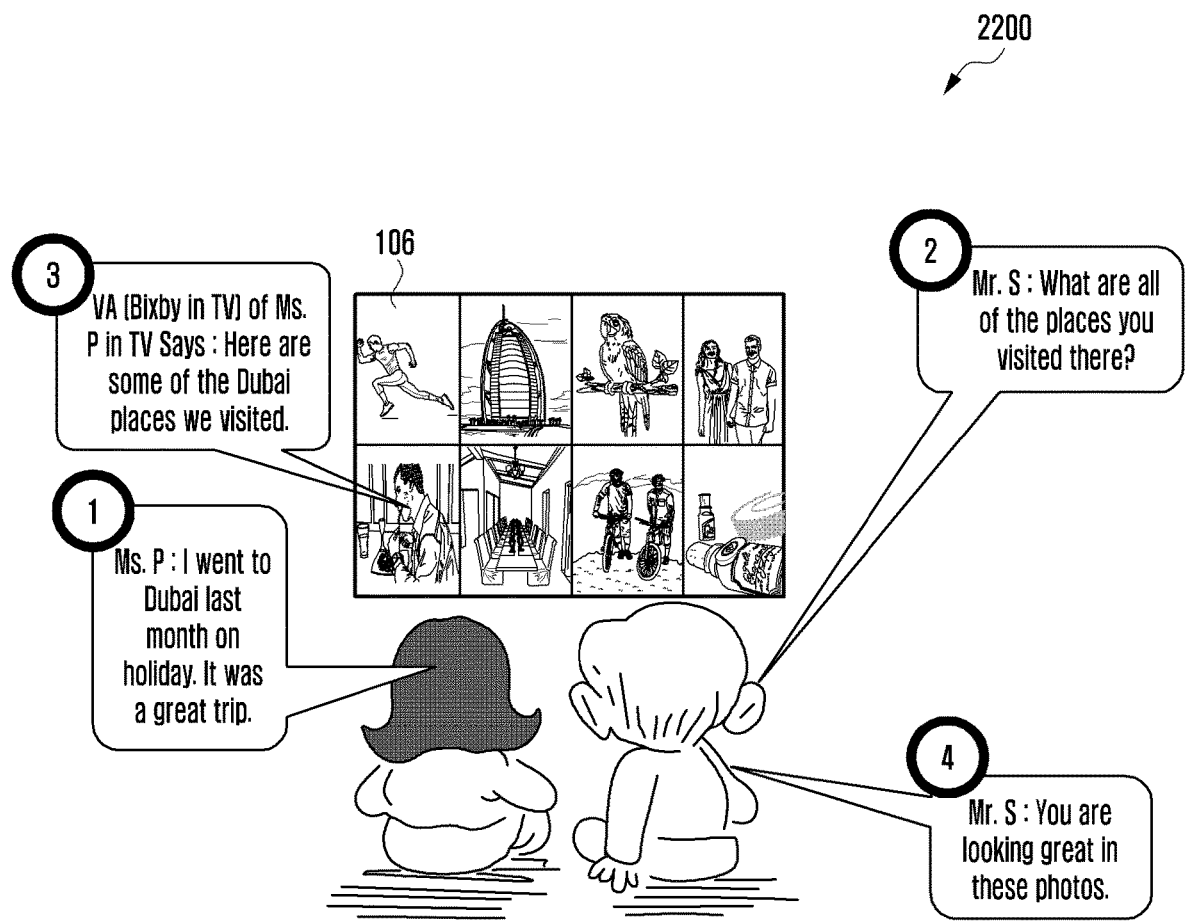

FIG. 22 illustrates a use-case scenario 2200 depicting the VA 106 using connected devices for enhancing a user experience of a conversation.

Referring to FIG. 22, Ms. P tells her friend Mr. S that she visited Dubai for a holiday. The VA 106 identifies that Ms. P is telling Mr. S about her Dubai trip. Ms. P and Mr. S are friends. Mr. S wants to know more about Ms. P's Dubai trip. The VA 106 filters images of Ms. P's Dubai trip based on her relationship level with Mr. S and displays them on a television. The VA 106 (in the television) also intervenes in the conversation to inform that images of Dubai trip have been displayed on the television. For example, Ms. P says to Mr. S that "I went to Dubai last month on holiday. It was a great trip.", at (1). At (2), Mr. S replies to Ms. P "What are all of the places you visited there?", at (2). The VA 106 configured into the television of Ms. P says, "Here are some of the Dubai places we visited", as at (3). At (4), Mr. S replies "You are looking great in these photos".

Figure 23:
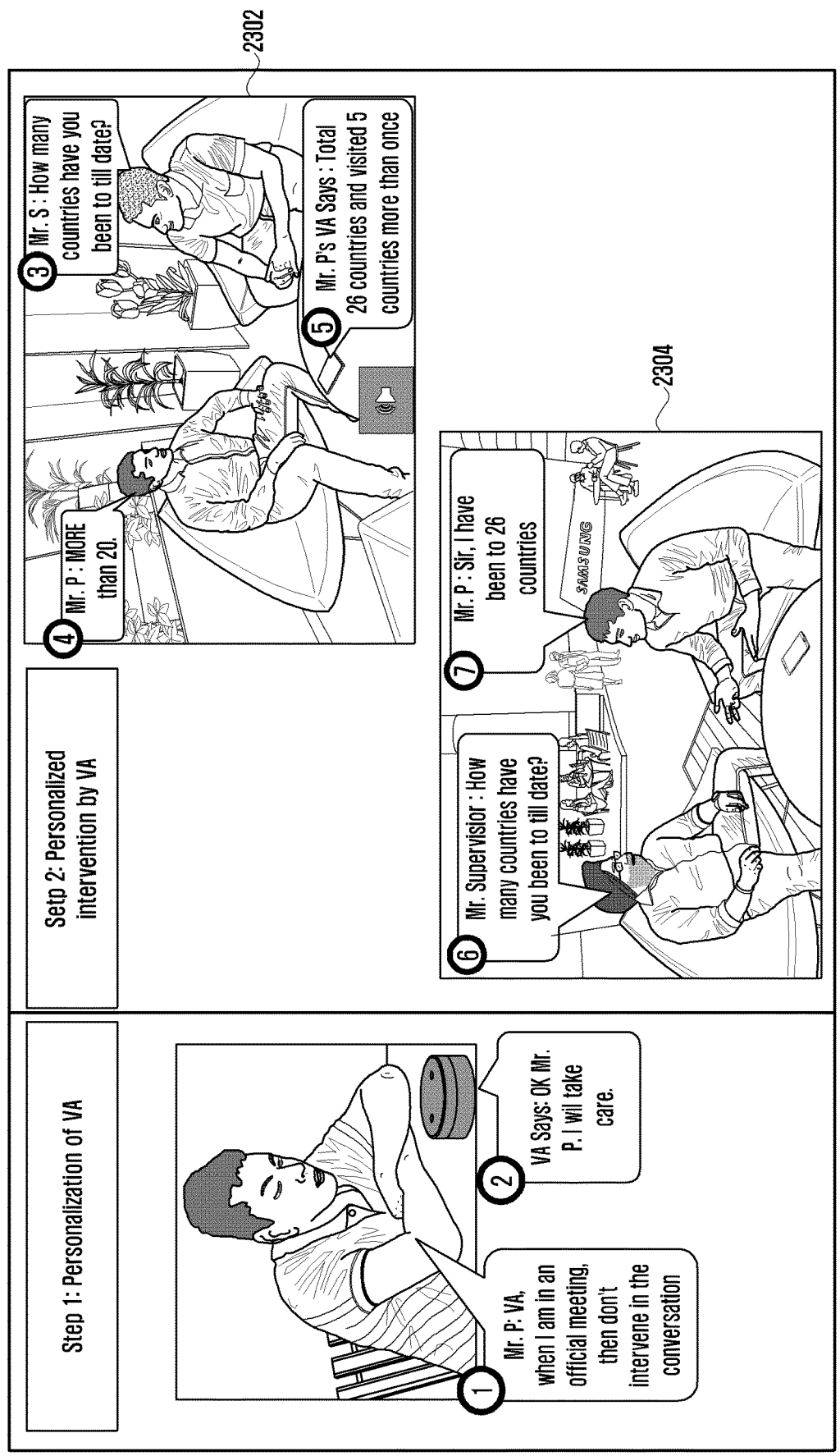

FIG. 23 illustrates a use-case scenario 2300 depicting personalization of a VA 106.

Referring to FIG. 23, at a step 1, personalization of the VA is performed. For example, Mr. P does not want his VA 106 to intervene in official in-person conversations. Thus, Mr. P provides feedback to the VA 106 that the VA 106 should not intervene in official-conversations. The VA 106 provides confirmation of accepting the feedback. At (1), Mr. P says to the VA 106, "VA, when I am in an official meeting, then don't intervene in the conversation". At a (2), the VA 106 replies, "OK, Mr. P. I will take care". At a step 2: the VA 106 performs personalized intervention. In a first scenario 2302, Mr. P is having tea with his friend. This is not an official meeting. The VA 106 intervenes in the conversation, whenever required. For example, at (3), Mr. S to Mr. P. "How many countries have you been to till date?" At (4), Mr. P replies that "More than 20". The VA 106 of Mr. P intervenes and replies "Total 26 countries and visited S countries more than once", at (5). In a second scenario 2304, Mr. P is having an official meeting with his supervisor. The VA 106 detects that Mr. P is in an official meeting. Using information from personalization, the VA 106 determines that the VA 106 should not intervene in this conversation. The VA 106 does not intervene in the conversation. For example, at (6) of 2304, Mr. Supervisor says, "How many countries have you been to till date?" At (7) of 2304, Mr. P says, "Sir, I have been to 26 countries".

Figure 24:
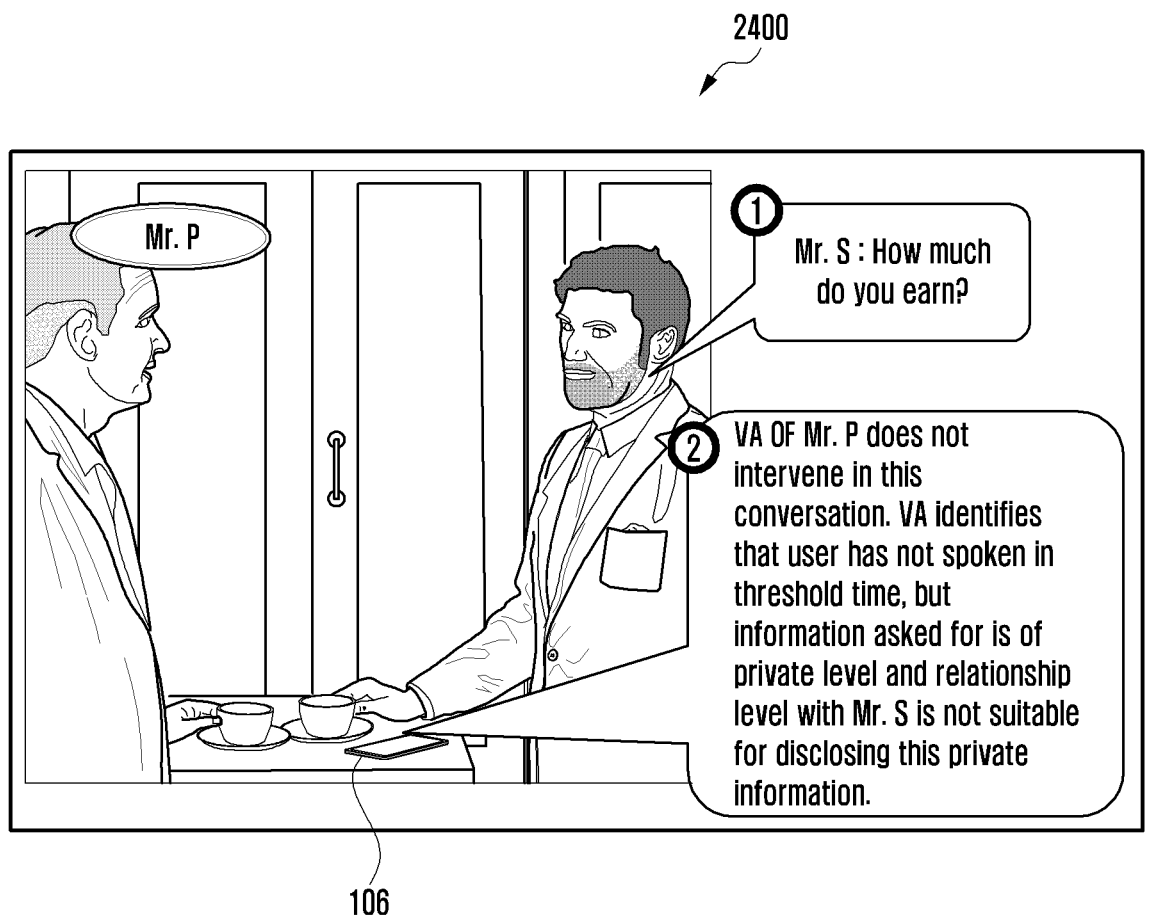

FIG. 24 illustrates a use-case scenario 2400 depicting a VA 106 not disclosing private information.

Referring to FIG. 24, Mr. P (primary user) and Mr. S (secondary user) are strangers. They are having a casual conversation. During the conversation. Mr. S asks for personal information from Mr. P. Mr. P does not respond within a threshold time. The VA 106 of Mr. P has the information. The VA 106 does not intervene in the conversation to add the information because information required to intervene in the conversation is private and the relationship level of Mr. P and Mr. S is not suitable to disclose the private information. For example, at (1), Mr. S asks Mr. P "How much do you earn?" At (2), the VA 106 of Mr. P does not intervene in this conversation. The VA 106 identifies that Mr. P has not spoken in a threshold time, but the information requested is of a private level and the relationship level with Mr. S is not suitable for disclosing this private information.

Figure 25:
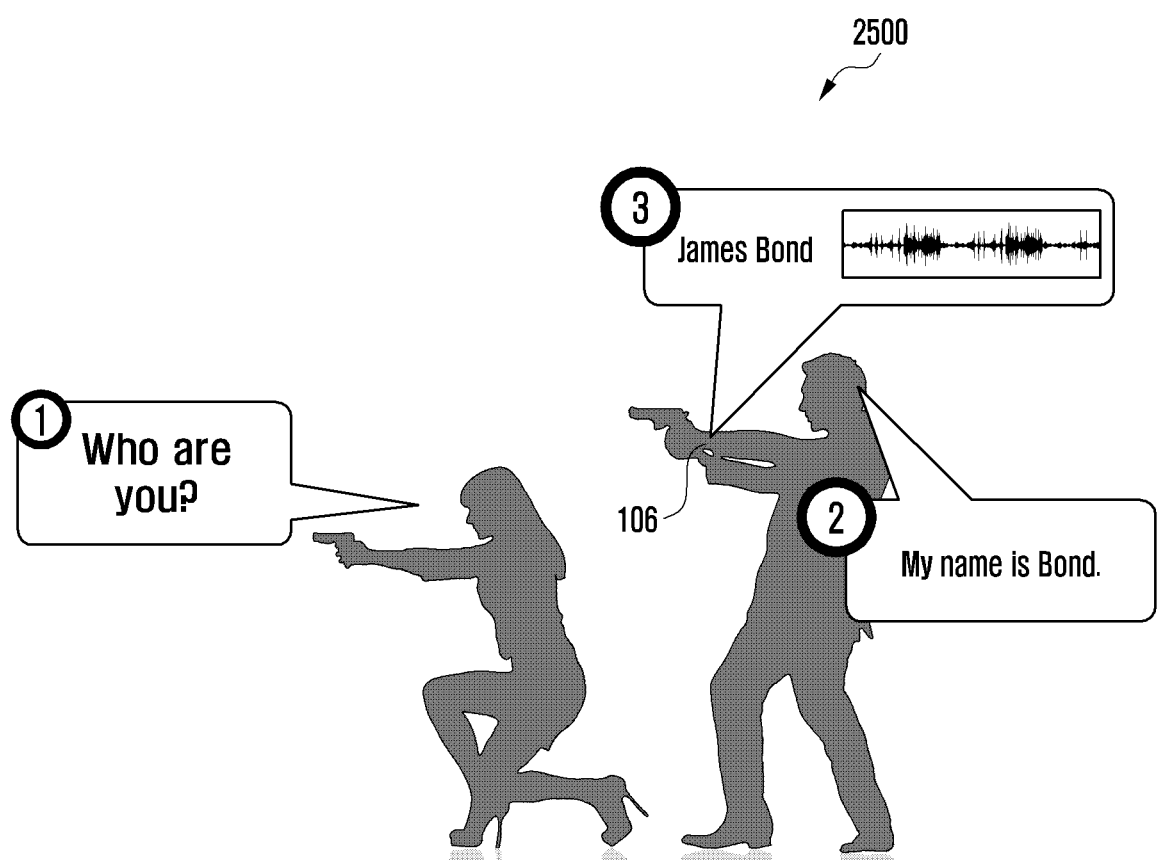

FIG. 25 illustrates a use-case scenario 2500 depicting the VA 106 adds a style statement.

Referring to FIG. 25, at (1), Ms. S asks Mr. P "Who are you". At (2), Mr. P replies "My name is Bond". During the conversation, the VA 106 of Mr. P adds a style statement "James Bond" with signature music of James Bond, at (3).

Figure 26:
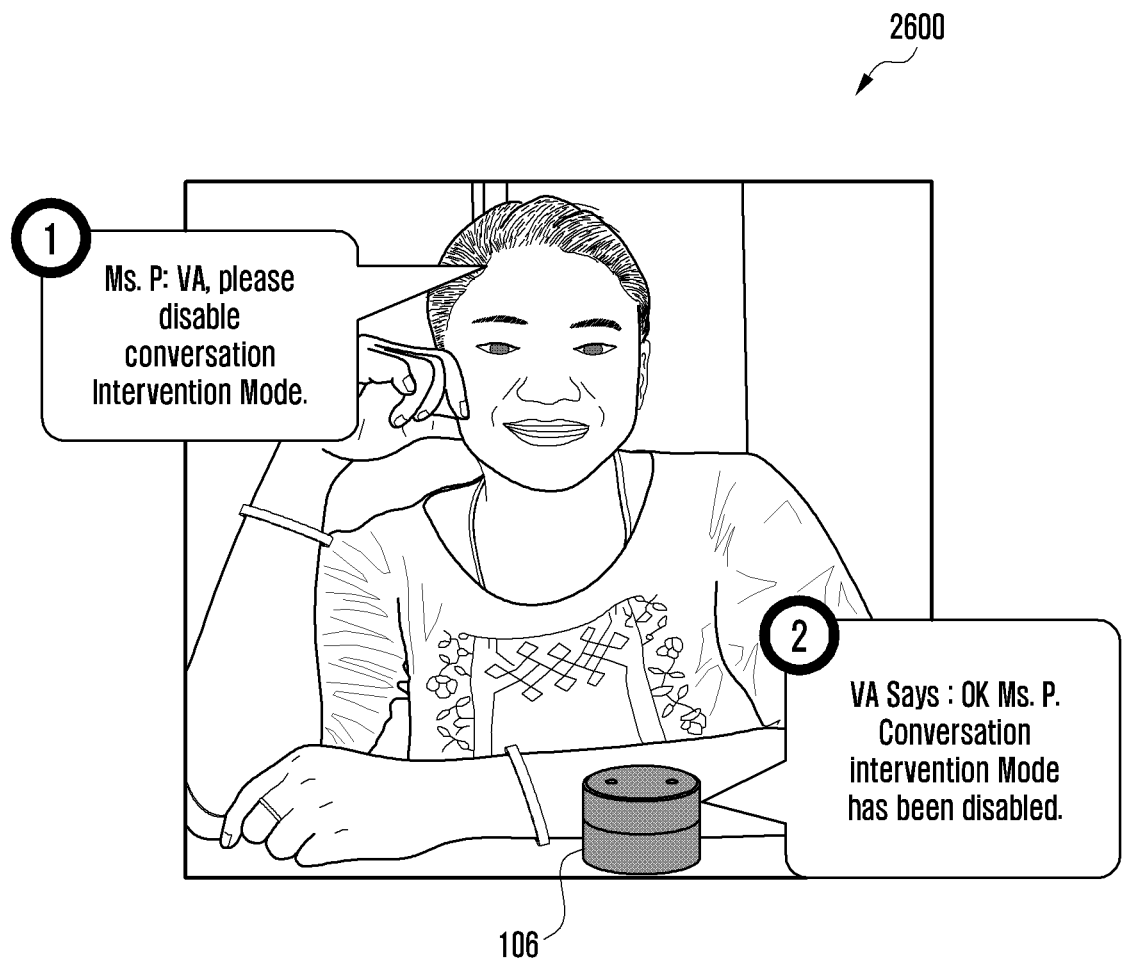

FIG. 26 illustrates a use-case scenario 2600 depicting the VA 106 determines a mode, whether to intervene. In an embodiment, the system 100 is configured to provide a conversation intervention mode for the VA 106.

Referring to FIG. 26, a user may enable or disable the mode to control the VA's 106 intervention during an in-person conversation of the primary user with one or more secondary users. If the user turns off the conversation intervention mode, then the VA 106 will not intervene in the user's conversation on its own. Controlling the conversation intervention mode may be achieved by providing an option in user settings of the VA 106. The conversation intervention mode may be controlled in the following ways:

1. A primary user may enable/disable the conversation intervention mode through a voice command to the VA 106 and a graphical user interface (UI) selection.

2. If the primary user has enabled the conversation intervention mode, and more options are provided to the primary user to enable/disable the conversation intervention mode based on, but not limited to, different situations, such as:

Secondary user: The primary user enables the conversation intervention mode for a set of secondary users.

Location of the primary user: The conversation intervention mode is auto enabled when the primary user reaches home.

Time of conversation: The primary user disables conversation mode between a specific time, for example, 9 AM to 11 AM.

Topic of conversation: The primary user disables a conversation mode for conversations related to financial matters.

Moreover, the conversation intervention mode may be automatically enabled/disabled when a condition set by the user is met.

3. If the primary user has enabled the conversation intervention mode, the primary user may control the frequency of interventions by the VA 106 on a scale from no intervention to talkative. Various levels may be created based on a confidence score of intervening situations calculated by an AI model. Some of the frequency levels of interventions may be as follows:

Talkative level: The talkative level is a high support mode of the VA 106. Even at a low confidence score, the VA 106 will intervene.

Intermediate level: The intermediate level is an intermediate support mode of the VA 106. Even at an average confidence score, the VA 106 will intervene.

Reserved level: The reserved level is a minimum support mode of the VA 106. Only at a high confidence score will the VA 106 intervene.

No Intervention level: The VA 106 will not intervene.

For example, at (1), Ms. P says "VA, please disable conversation intervention mode". At (2), the VA 106 says "OK M. P. Conversation intervention mode has been disabled".

Figure 27:
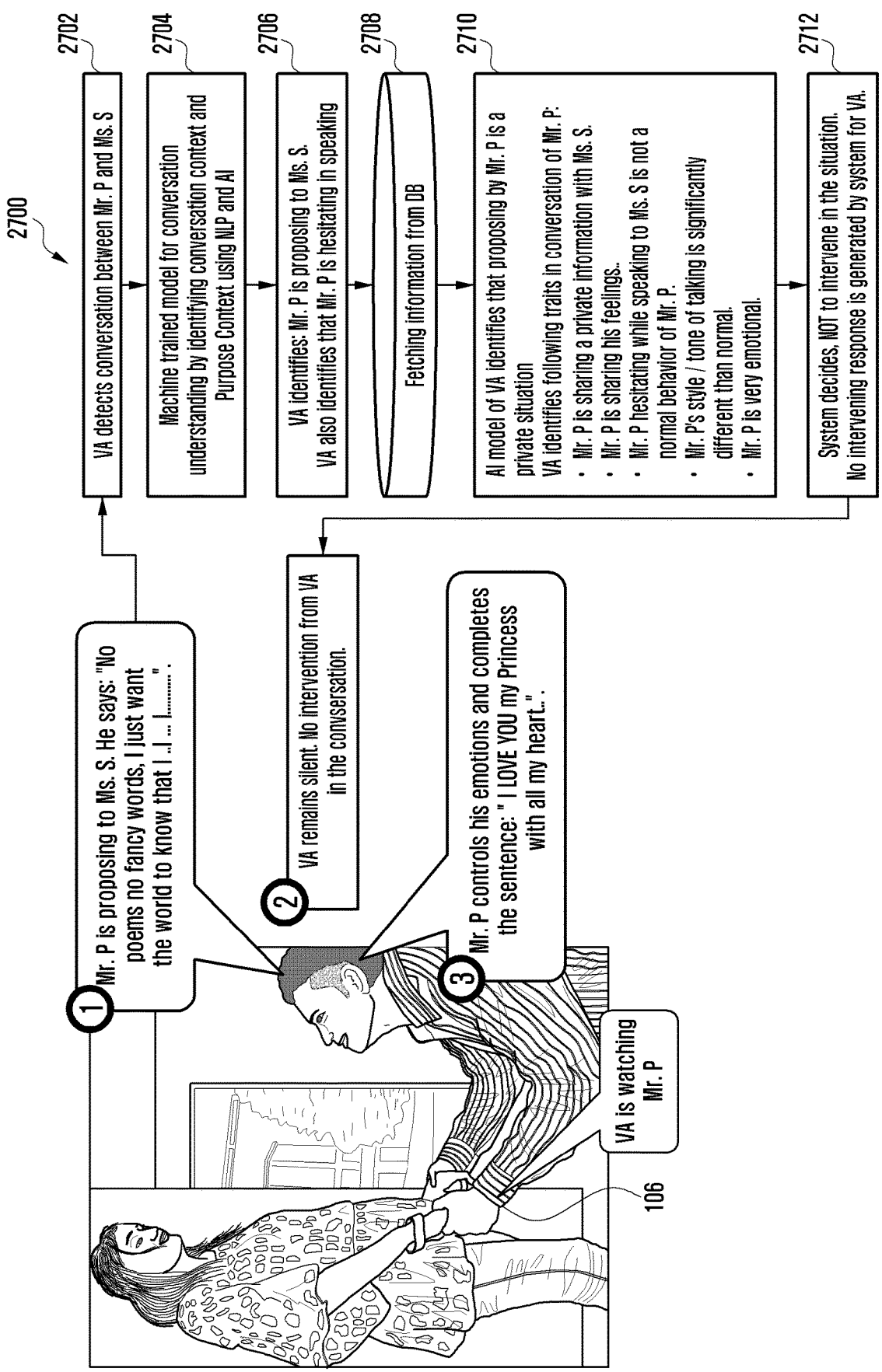

FIG. 27 illustrates a use-case scenario 2700 depicting no intervention by the VA 106 in case of private information.

Referring to FIG. 27, Mr. P is proposing to Ms. S. Mr. P says "No poems no fancy words, I just want the world to know that I . . . I . . . I . . .", at (1). At (2), the VA 106 remains silent, and there is no intervention from the VA 106 in the conversation. At (3), Mr. P controls his emotions and completes the sentence "I LOVE YOU my Princess with all my heart". Here, the VA 106 is watching Mr. P. At step 2702, the VA 106 detects a conversation between Mr. P and Ms. S. At step 2704, the VA 106 uses a machine trained model for conversation understanding by identifying conversation context and purpose context using NLP and AI techniques. At step 2706, the VA 106 identifies that Mr. P is proposing to Ms. S. The VA 106 also identifies that Mr. P is hesitating in speaking. At step 2708, the VA 106 fetches information from the database 226. At step 2710, the AI model of the VA 106 identifies that proposing by Mr. P is a private situation. The VA 106 identifies following traits in the conversation of Mr. P: Mr. P is sharing a private information with Ms. S, Mr. P is sharing his feelings, Mr. P hesitating while speaking to Ms. S is not a normal behavior of Mr. P, Mr. P's style/tone of talking is significantly different than normal, and Mr. P is very emotional. At step 2712, the system 100 having the VA 106 decides not to intervene in the situation, and no intervening response is generated by the system 100 for the VA 106.

Figure 28:

FIG. 28 illustrates a use-case scenario 2800 depicting a VA 106 sharing private information to a doctor.

Referring to FIG. 28, Mrs. P is consulting a doctor for medical issues she faced last night. Mrs. P provides details of the health issues. The VA 106 of Mrs. P identifies that she has missed sharing important information with the doctor. An AI model of the VA 106 identifies that a discussion of medical issues by Mrs. P, with a doctor is a private situation. In this case, the VA 106 is intervening in the conversation with private information of Mrs. P, because of the presence of the traits below:

The VA 106 detects that the purpose of this conversation is treatment of problems faced by Mrs. P last night.

Mrs. P has shared some private medical information with the doctor.

The VA 106 detects that Mrs. P has missed sharing some important private information (fever last night), which will be helpful for the doctor.

The VA 106 detects that the current conversation falls into a "medical intimacy category".

Private information missed by Mrs. P (fever) is related to the "medical intimacy category".

The VA 106 detects that similar private medical information has already been disclosed by Mrs. P to the doctor.

For example, at (1), the doctor says to Mrs. P "Hello Mrs. P. How are you?" At (2) Mrs. P replies to the doctor "Hello Doctor, I had a severe headache and back pain last night. I was feeling very uncomfortable". At a block (3), the VA 106 of Mrs. P adds "Last night, fever was also detected. Maximum body temperature was 101.5° F.", during the conversation.

Figure 29:
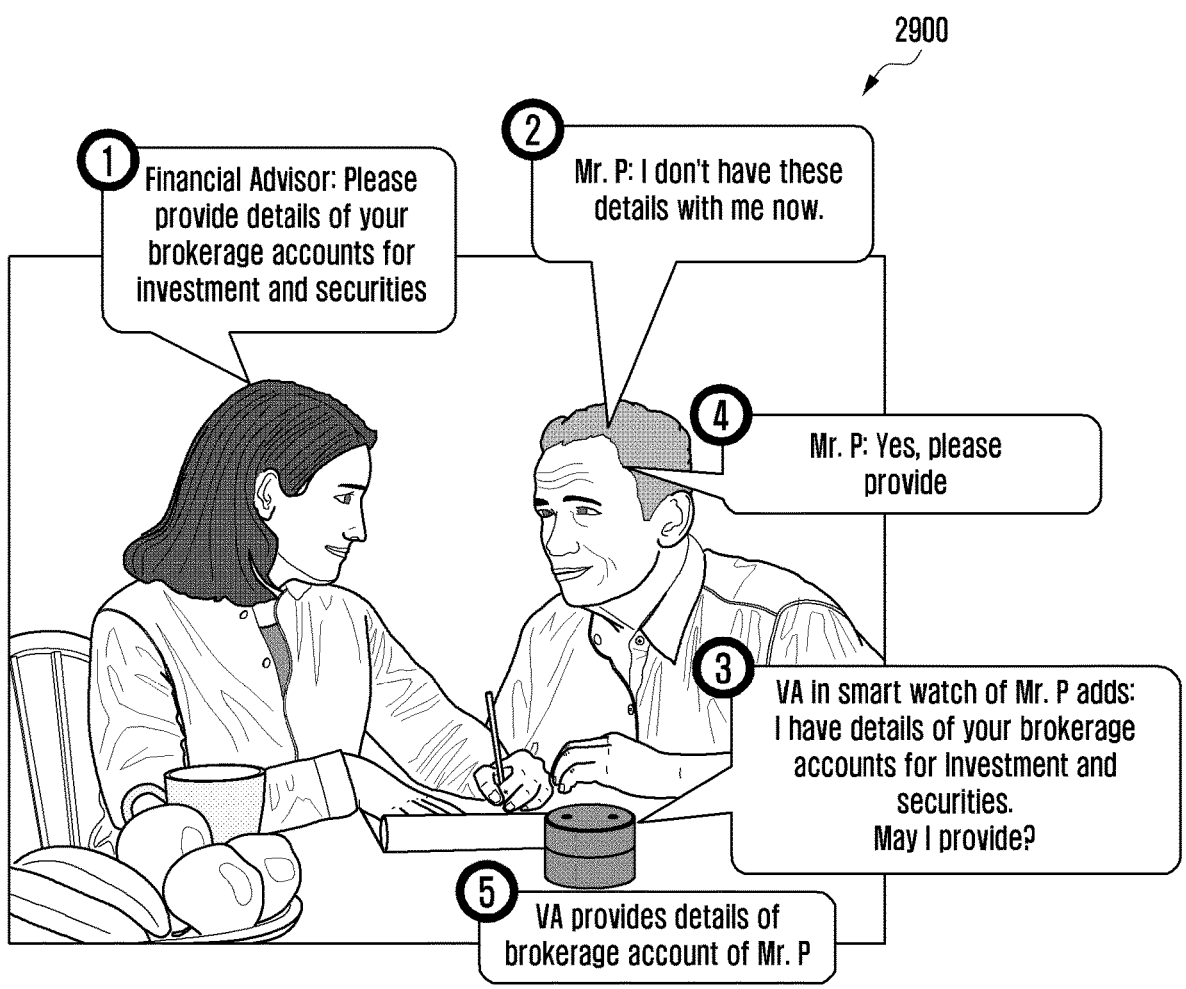

FIG. 29 illustrates a use-case scenario 2900 depicting a VA 106 asks for permission to share private information.

Referring to FIG. 29, a financial advisor of Mr. P has requested Mr. P to provide details of his brokerage accounts for investment and securities. Mr. P does not have the required information with him. The AI model of the VA 106 identifies that a discussion with a financial advisor is a private situation. In this case, the VA 106 is asking for permission from the primary user before disclosing the primary user's private financial information due to the presence of traits below:

The VA 106 detects that the purpose of this conversation is to get financial advice from the advisor.

The VA 106 detects that Mr. P is unable to provide the required information and the VA 106 has the required information in a database.

The VA 106 determines that this information is critical private financial information.

The VA 106 determines that explicit user consent should be obtained before disclosing the private financial information.

At (1), the financial advisor asks Mr. P, "Please provide details of your brokerage accounts for investment and securities". At (2), Mr. P replies to the financial advisor, "I don't have these details with me now". At (3), the VA 106 in a smart watch of Mr. P adds, "I have details of your brokerage account for investment and securities. May I provide?" At (4), Mr. P gives permission to the VA 106 by saying, "Yes, please provide". At (5), the VA 106 provides details of a brokerage account of Mr. P.

Figure 30:
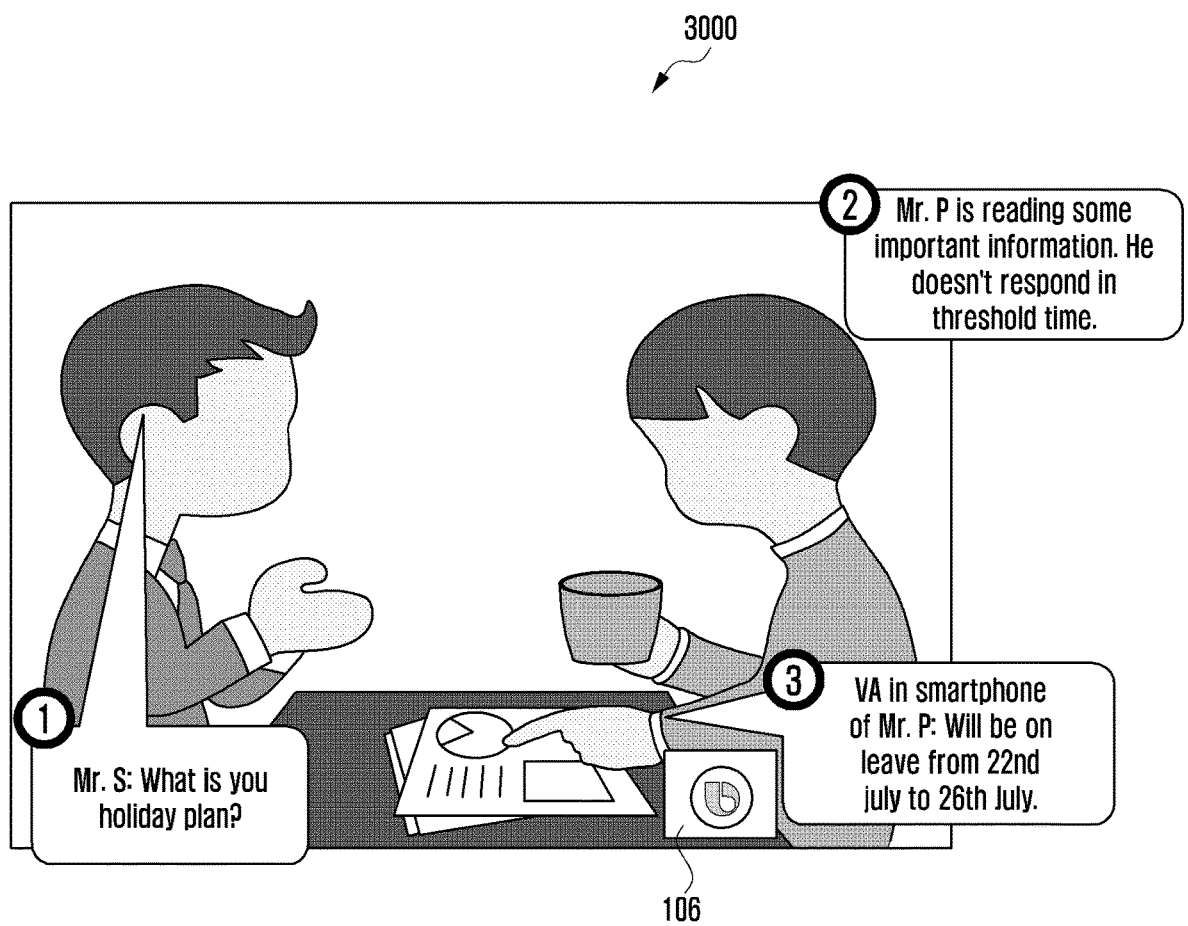

FIG. 30 illustrates a use-case scenario 3000 depicting a VA 106 shares information based on a determined intimacy category.

Referring to FIG. 30, Mr. P (a primary user) is in an office. His colleague asks him about his leave plan. Mr. P is busy reading some information and could not respond within a threshold time. The data, purpose context of conversation, identification of a secondary user, current conversation data, location of the conversation (office), tone and style of conversation, and previous conversation data (Mr. P disclosed similar information to Mr. S), but not limited thereto, helps the system 100 to determine the intimacy category of the current conversation as professional. The system 100 generates a response with private information, which is suitable for determined the intimacy category (for example, professional). The VA 106 intervenes in the conversation with the generated response. For example, at (1), Mr. S asks Mr. P, "What is your holiday plan?". At (2), Mr. P is reading some important information. He does not respond in a threshold time. At (3), the VA 106 in the smartphone of Mr. P replies that "Will be on leave from $22^{nd}$ July to $26^{th}$ July", on behalf of Mr. P.

Figure 31:
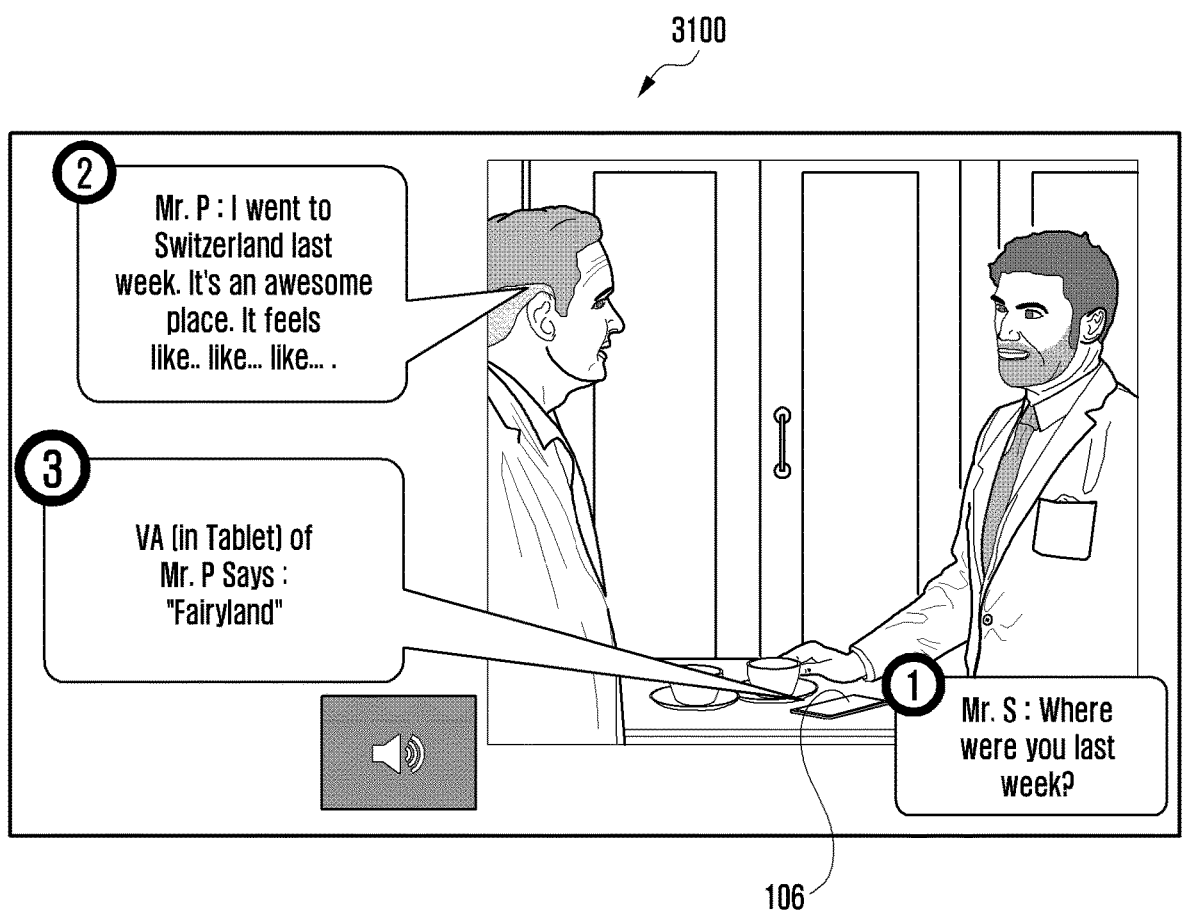

FIG. 31 illustrates a use-case scenario 3100 depicting generation of an intervening response and delivering the intervening response at an appropriate time.

Referring to FIG. 31, a VA 106 is configured to generate an intervening response based on at least one of the actions of the primary user, the conversation context, and purpose context. Then, the VA 106 delivers the prepared response to the secondary user during the intervening situation, at the appropriate time. In an embodiment, delivery in response to a complex sentence will have more delay, for example, a complex mathematical equation; delivery of responses which are answered quickly will have less delay, for example, a response of "Hi" from the secondary user will be answered quickly, and if the primary user or the secondary user starts speaking, then the VA 106 stops speaking immediately. For example, Mr. P and Mr. S are friends, and they are having a casual talk. At (1), Mr. S asks Mr. P "Where were you last week?" At (2), Mr. P replied to Mr. S, "I went to Switzerland last week. It's an awesome place. It feels like . . . like . . . like . . . ,". At (3) the VA 106 of Mr. P intervenes and says, "Fairyland".

Figure 32:
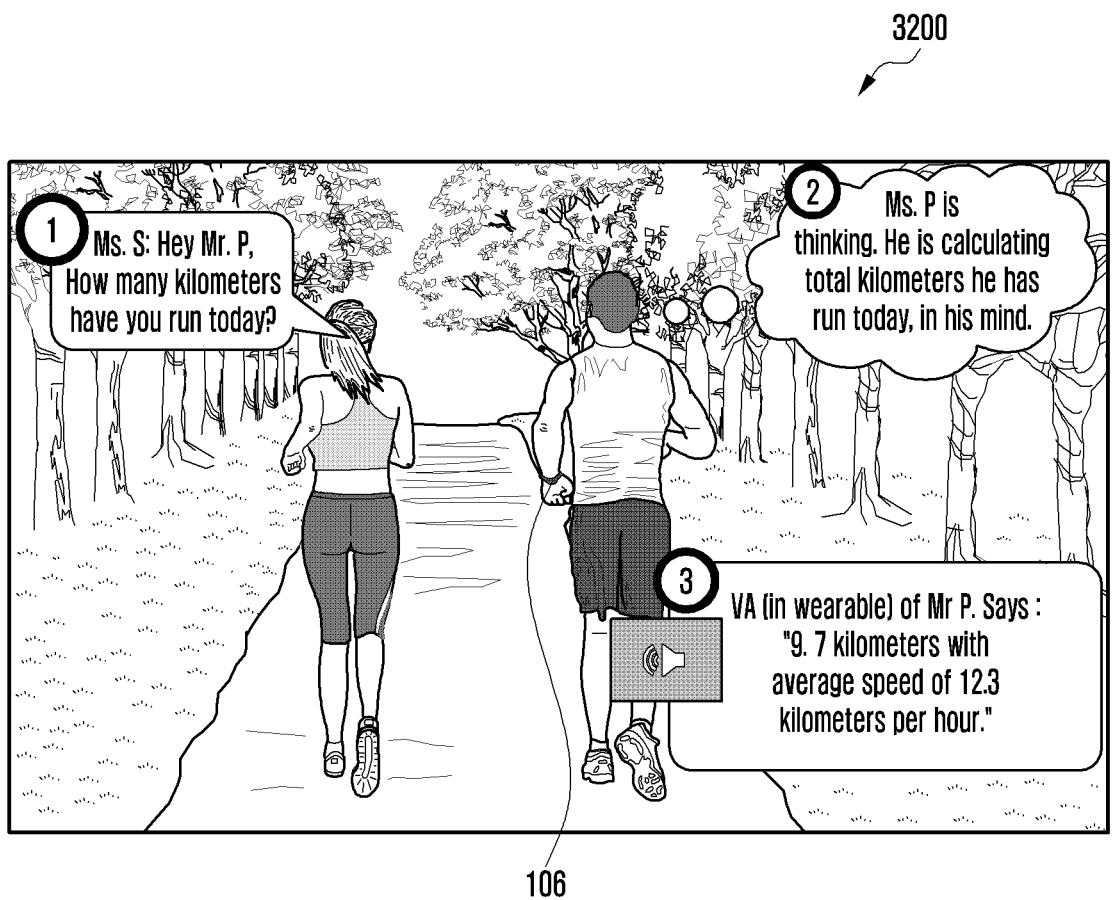

FIG. 32 illustrates a use-case scenario 3200 depicting identifying an intervening situation in the conversation.

Referring to FIG. 32, the VA 106 identifies an intervening situation in the conversation by analyzing at least one action of the primary user on the purpose context. The VA 106 detects that Mr. P has not replied for a threshold time, information needed for Mr. P's response is of a public level, the VA 106 has more accurate information than Mr. P (primary user), Mr. P is exhausted, Ms. S (secondary user) is expecting a response from Mr. P. Thus, the VA 106 decides to intervene in the conversation. For example, at (1), Ms. S says, "Hey Mr. P. How many kilometers have you run today?" At (2), Mr. P is thinking. He is calculating total kilometers he has run today, in his mind. At (3), VA 106 (in wearable) of Mr. P, says "9.7 kilometers with average speed of 12.3 kilometers per hour".

A correct intervening situation must be determined to ensure the VA 106 does the following:

intervenes when its support is required;

does not intervene when its support is not required;

gives enough time to a user to frame a response and speak it;

does not disclose any private information during an intervention;

provide a proper response that could be added during an intervention; and provide a great user experience.

Figure 33:
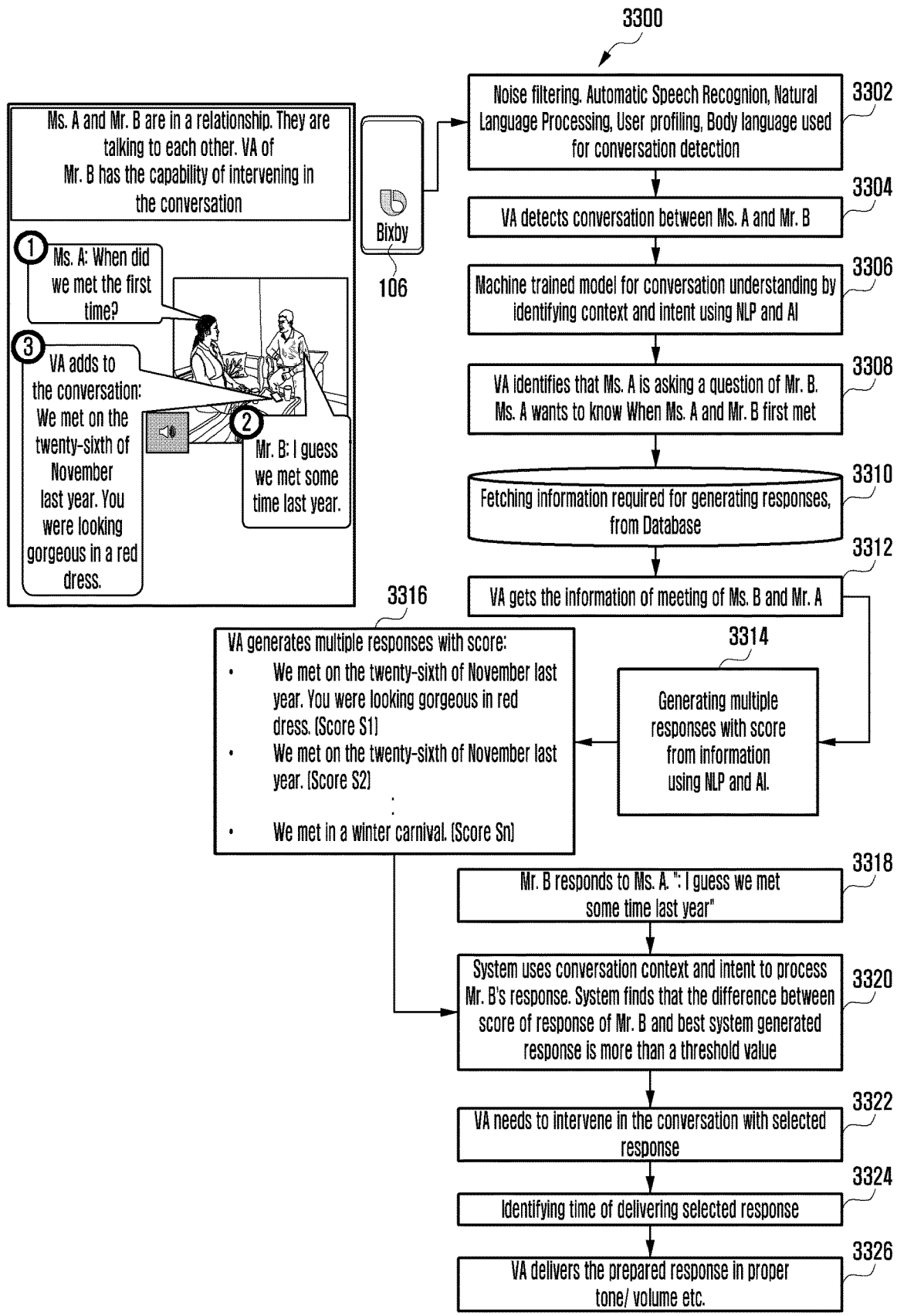

FIG. 33 illustrates a use-case scenario 3300 depicting a VA 106 intervening in a live conversation.

Referring to FIG. 33, Ms. A and Mr. B are in a relationship. They are talking to each other. The VA 106 of Mr. B has the capability of intervening in the conversation. At (1), Ms. A says, "When did we met the first time?". At (2), Mr. B says, "I guess we met some time last year". At (3), the VA 106 adds to the conversation by saying "We met on the twenty-sixth of November last year. You were looking gorgeous in a red dress." In an embodiment, at step 3302, noise filtering, automatic speech recognition, natural language processing, user profiling, and body language are used for conversation recognition. At step 3304, the VA 106 detects a conversation between Ms. A and Mr. B. At step 3306, a machine trained model is used for conversation understanding, by identifying context and intent using NLP and AI techniques. At step 3308, the VA 106 identifies that Ms. A is asking a question of Mr. B. Ms. Ms. A wants to know when Ms. A and Mr. B first met. At step 3310, information required for generating responses is fetched from a database 226. At step 3312, the VA 106 gets the information of meeting of Ms. A and Mr. B. At step 3314, the VA 106 generates multiple responses with score from information using NLP and AI.

At step 3316, the VA 106 generates multiple responses with score as follows:
We met on the twenty-sixth of November last year. You were looking gorgeous in a red dress. (Score S1)
We met on the twenty-sixth of November last year. (Score S2)
.
.
We met in a winter carnival. (Score Sn)

At step 3318, Mr. B responds to Ms. A "I guess we met some time last year". At step 3320, the system 100 uses conversation context and intent to process Mr. B's response. The system 100 finds that the difference between the score of response of Mr. B and best system generated response is more than a threshold value. At step 3322, the VA 106 needs to intervene in the conversation with selected response. At step 3324, identifying time of delivering selected response. At step 3326, the VA 106 delivers the prepared response in proper tone/volume etc.

Figure 34:
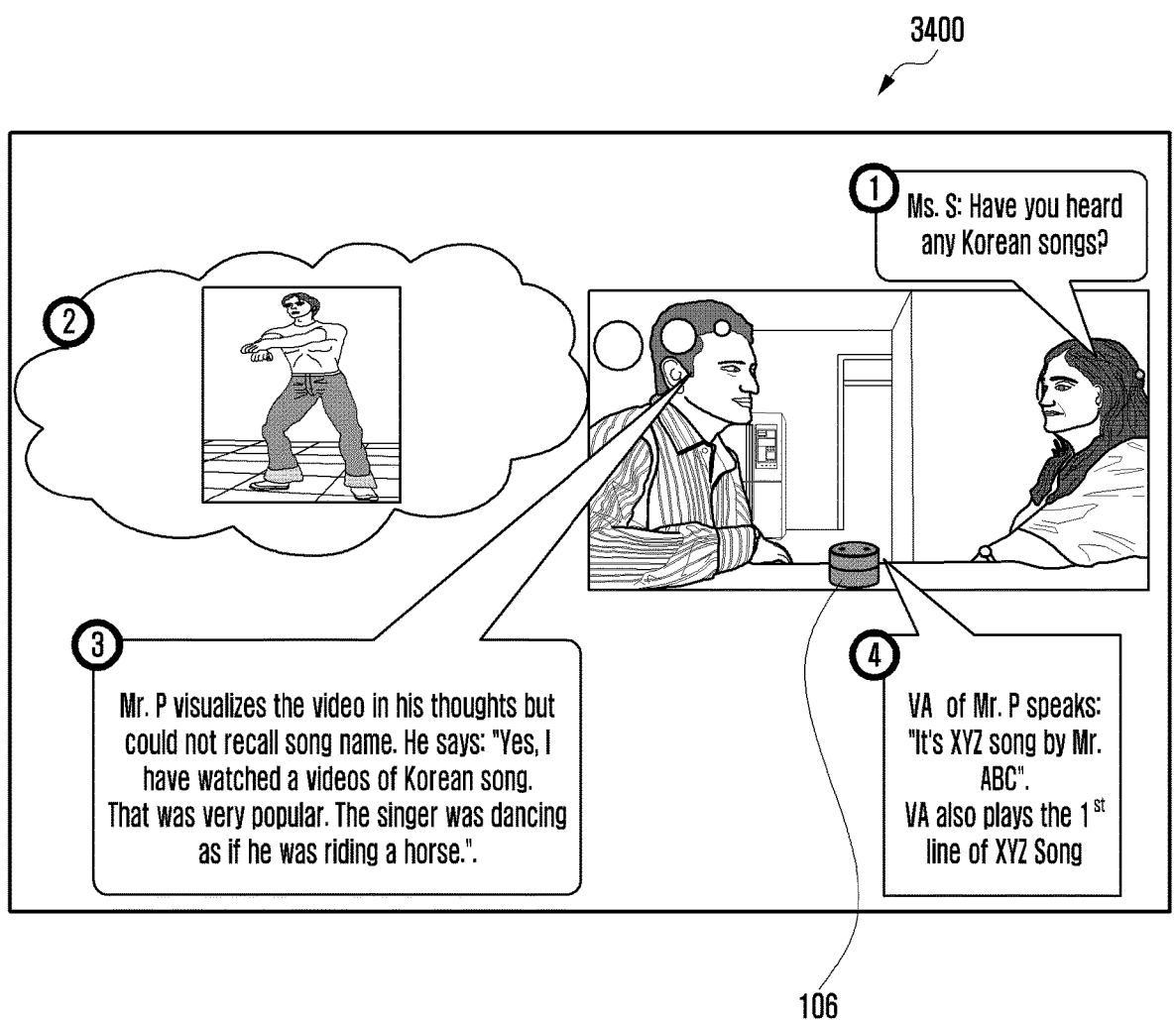

FIG. 34 illustrates a use-case scenario 3400 depicting a VA 106 handling an in-person communication of a primary user, with one or multiple secondary users, without explicit command from the primary user.

Referring to FIG. 34, at (1), the VA 106 identifies that there is a conversation between Ms. S and Mr. P from a statement of Ms. S. "Have you heard any Korean songs?" The VA 106 also identifies that the purpose of Ms. S is to know about Korean songs heard by Mr. P. At (3), Mr. P visualizes a video (as shown at (2)) in his thought, but could not recall a song name. He says, "Yes, I have watched a video of a Korean song. That was very popular. The singer was dancing as if he was riding a horse". The VA 106 uses conversation context and personal history of Mr. P to prepare a list of videos of Korean songs seen by Mr. P. From a statement of Mr. P, the VA 106 identifies that, Mr. P's response is incomplete and weak as compared to the VA 106 generated responses. The VA 106 confirms it as an intervening situation and decides to intervene. From the statement of Mr. P, the VA 106 identifies that Mr. P is talking about a "very popular song". The singer in the song was dancing as if he was riding a horse. Based on the inputs from Mr. P, the VA 106 filters the prepared list. The VA 106 determines that Mr. P is talking about "XYZ" song by Mr. ABC. The VA 106 prepares the intervening response. "It's XYZ song by Mr. ABC". It also prepares audio of a first line of the song ready to be played for a better user experience. The VA 106 delivers a prepared response, followed by an audio clip of the song, at (4).

Figure 35:
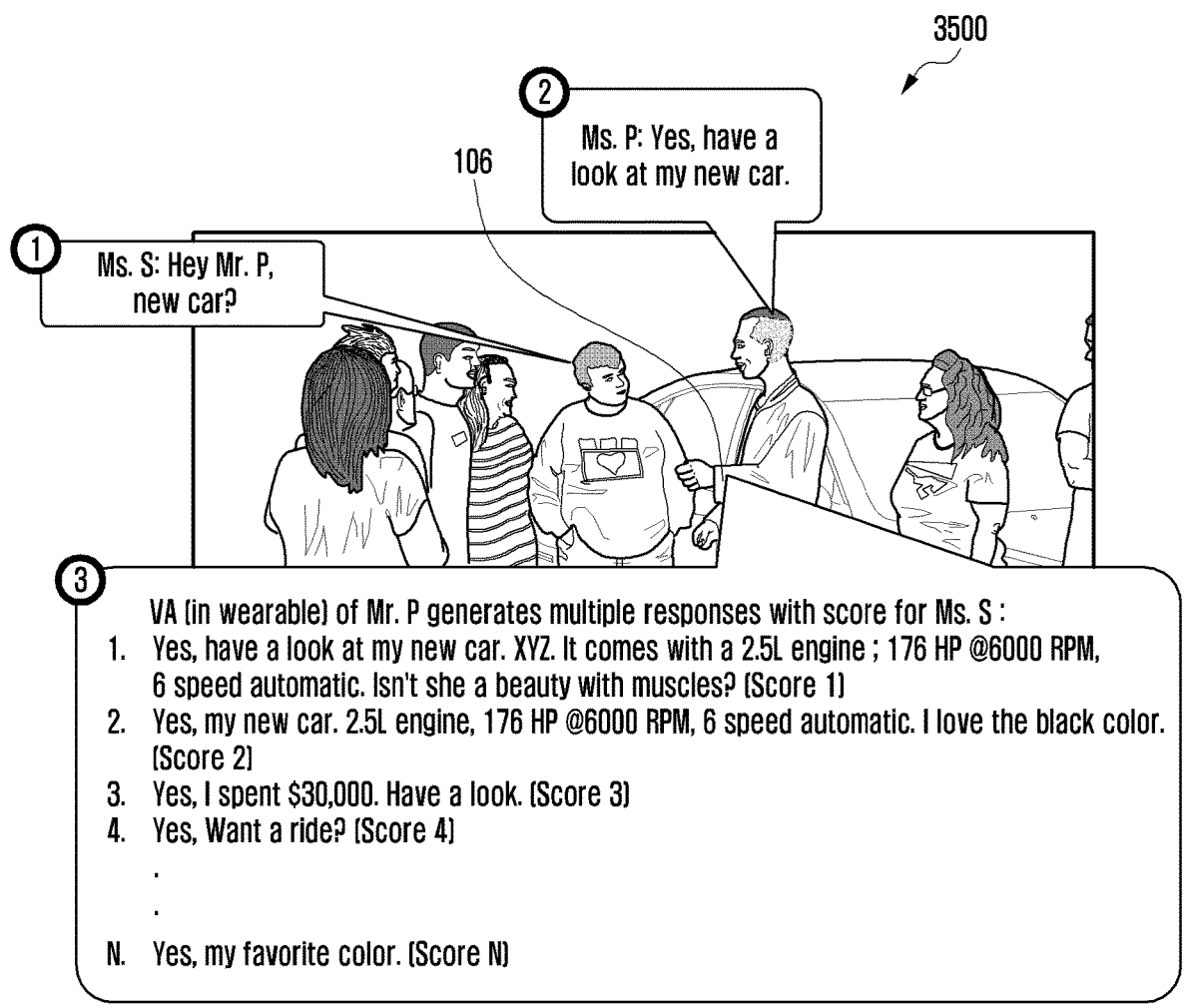

FIG. 35 illustrates a use-case scenario 3500 depicting a generation of multiple responses by a VA 106.

Referring to FIG. 35, Ms. S (secondary user) and Mr. P (primary user) are friends. The conversation between Ms. S and Mr. P has been identified by the VA 106 (in wearable of Mr. P). The VA 106 generates multiple possible personalized responses on behalf of Mr. P based on current and past conversation context, purpose context, sensor data and various other inputs from personalized data such as personal history, category of conversation, relationship level between the primary user and the secondary user, privacy level of required information, mood of user, common interests etc. At (1), Ms. S says to Mr. P, "Hey Mr. P, new car?". At (2), Mr. P responds to Mr. S, "Yes, have a look at my new car". At (3), the VA 106 (in wearable) of Mr. P generates multiple responses with score for Ms. S as follows:
1. Yes, have a look at my new car. XYZ. It comes with 2.5 L engine 176 HP @6000 RPM 6 speed automatic. Isn't she a beauty with muscles? (Score 1)
2 Yes, my new car. 2.5 L engine 176 HP @6000 RPM, 6 speed automatic. I love the black color. (Score 2)
3. Yes. I spent $30,000. Have a look. (Score 3)
4. Yes. Want a ride? (Score 4)
.
.
N. Yes, my favorite color. (Score N)

Principles of the disclosure are described above. Those skilled in the art will be able to devise various arrangements that, although not explicitly described herein, embody the principles of the disclosure. Furthermore, all examples recited herein are principally intended expressly to be only for explanatory purposes to facilitate understanding of the principles of the disclosure and the concepts of the disclosure to furthering the art and are to be construed as being without limitation to such specifically recited examples and conditions. While the present disclosure has been shown and described with reference to certain embodiments thereof, it will be understood by those skilled in the art that various changes in form and details may be made therein without departing from the scope of the present disclosure as defined by the appended claims and their equivalents.

What is claimed is:
1. A method for operating an electronic device, the method comprising:
recognizing a conversation between a primary user and a secondary user by using at least one of a noise filtering technique, a speech recognition technique, a natural language processing technique, user profiling, and gestures of the primary user and the secondary user;
identifying first context data and second context data for the primary user and the secondary user from the conversation by using at least one of a deep learning recurrent neural network (RNN) technique, an artificial intelligence (AI) technique, and a natural learning processing (NLP) technique;
generating responses to be replied to the second user on behalf of the primary user based on at least one of the second context data derived from the secondary user, and the first context data;
generating scores corresponding to each of the generated responses based on pre-determined parameters with weights by using the AI and NLP techniques, the parameters including the primary user's response history, mood of the primary user, tone of the primary user, body language of the primary user, relationship between the primary user and the secondary user, privacy level of information required, location and environment, common comprehension ability, personalized training data of a virtual assistant communicatively coupled with the electronic device, and a type of the conversation;

analyzing at least one action of the primary user during the conversation;

determining an intervening situation in the conversation based on the analyzed at least one action, the intervening situation including a situation in which the primary user has not spoken within a threshold time, a situation in which the primary user has not completed a sentence, a situation in which the primary user utters neutral vowel sounds, a situation in which the primary user's statement has a significant deviation from a knowledge graph, a situation in which the primary user needs supporting and contradicting facts for his statement, a situation in which the primary user is busy in another task, a situation in which the primary user hesitated while speaking a response, and a situation in which the secondary user is not satisfied from the primary user's response;

selecting a response with a highest score among the generated responses as an intervening response based on the determined intervening situation; and delivering the intervening response to the secondary user during the determined intervening situation.

2. The method of claim 1, wherein the first context data includes conversation context related data.

3. The method of claim 1, wherein the second context data includes purpose context related data.

4. The method of claim 1, wherein delivering the intervening response comprises delivering the intervening response at a dynamic time interval.

5. The method of claim 1, further comprises storing, in a database, pre-determined parameters, learning data, generated responses, intervening responses, context related data, primary user information, secondary user information, pre-defined relationship level between the primary user and the at least one secondary users, intimacy categories, and past conversation details.

6. The method of claim 1, further comprising training the generated responses using learning data, and creating a privacy level for the primary user based on trained responses.

7. The method of claim 1, wherein generating responses comprises at least one response including at least one of words, sentences, audio, video, environment settings, and augmented/virtual reality content.

8. The method of claim 1, wherein delivering the intervening response comprises delivering the intervening response at a dynamic time interval to the secondary user.

9. An electronic device comprising:
a memory configured to store first pre-defined rules; and
a processor configured to cooperate with the memory and generate device processing commands based on the first pre-defined rules,
wherein the processor is further configured to:
recognize a conversation between a primary user and a secondary user by using at least one of a noise filtering technique, a speech recognition technique, a natural language processing technique, user profiling, and gestures of the primary user and the secondary user;
identify first context data and second context data for the primary user and the secondary user from the conversation by using at least one of a deep learning recurrent neural network (RNN) technique, an artificial intelligence (AI) technique, and a natural learning processing (NLP) technique;

generate responses to be replied to the second user on behalf of the primary user based on at least one of the second context data derived from the secondary user, and the first context data;

generate scores corresponding to each of the generated responses based on pre-determined parameters with weights by using the AI and NLP techniques, the parameters including the primary user's response history, mood of the primary user, tone of the primary user, body language of the primary user, relationship between the primary user and the secondary user, privacy level of information required, location and environment, common comprehension ability, personalized training data of a virtual assistant communicatively coupled with the electronic device, and a type of the conversation;

analyzing at least one action of the primary user during the conversation;

determine an intervening situation in the conversation based on the analyzed at least one action, the intervening situation including a situation in which the primary user has not spoken within a threshold time, a situation in which the primary user has not completed a sentence, a situation in which the primary user utters neutral vowel sounds, a situation in which the primary user's statement has a significant deviation from a knowledge graph, a situation in which the primary user needs supporting and contradicting facts for his statement, a situation in which the primary user is busy in another task, a situation in which the primary user hesitated while speaking a response, and a situation in which the secondary user is not satisfied from the primary user's response;

select a response with a highest score among the generated responses as an intervening response based on the determined intervening situation; and deliver the intervening response to the secondary user during the determined intervening situation.

10. The electronic device of claim 9, wherein the processor is further configured to deliver the intervening response at a dynamic time interval.

11. The electronic device of claim 9, wherein the processor is further configured to deliver the intervening response at a dynamic time interval determined in real-time.

12. The electronic device of claim 9, wherein the processor is further configured to store pre-determined parameters, learning data, generated responses, intervening responses, context related data, primary user information, secondary user information, pre-defined relationship level between the primary user and the at least one secondary users, intimacy categories, and past conversation details.

13. The electronic device of claim 12, wherein the processor is further configured to train the generated responses using the learning data, and create a privacy level for the primary user based on the trained at least one response.

14. The electronic device claim 9, wherein the processor is configured to deliver the intervening response at a dynamic time interval to the secondary user.

15. The electronic device of claim 9, further comprising a display for displaying an additional content in a form of the intervening response, and update availability of the additional content to the primary user the and the secondary user.

* * * * *